(12) United States Patent
Jensen et al.

(10) Patent No.: US 7,041,617 B2
(45) Date of Patent: May 9, 2006

(54) CATALYST COMPOSITIONS AND POLYOLEFINS FOR EXTRUSION COATING APPLICATIONS

(75) Inventors: Michael D. Jensen, Bartlesville, OK (US); Max P. McDaniel, Bartlesville, OK (US); Joel L. Martin, Bartlesville, OK (US); Elizabeth A. Benham, Spring, TX (US); Randy Muninger, Dewey, OK (US); Gary Jerdee, Orange, TX (US); Ashish M. Sukhadia, Bartlesville, OK (US); Qing Yang, Bartlesville, OK (US); Matthew G. Thorn, Bartlesville, OK (US)

(73) Assignee: Chevron Phillips Chemical Company, L.P., The Woodlands, TX (US)

( * ) Notice: Subject to any disclaimer, the term of this patent is extended or adjusted under 35 U.S.C. 154(b) by 10 days.

(21) Appl. No.: 10/755,083

(22) Filed: Jan. 9, 2004

(65) Prior Publication Data

US 2005/0153830 A1    Jul. 14, 2005

(51) Int. Cl.
*B01J 31/38*   (2006.01)
*B01J 37/22*   (2006.01)
*C08F 4/52*    (2006.01)
*C08F 4/76*    (2006.01)

(52) U.S. Cl. .............. 502/113; 502/119; 502/227; 502/231; 526/119; 526/118; 526/116

(58) Field of Classification Search ........ 502/129, 502/118, 103, 231, 113, 119, 227; 526/118, 526/119, 116, 113, 114
See application file for complete search history.

(56) References Cited

U.S. PATENT DOCUMENTS

| | | | | |
|---|---|---|---|---|
| 4,937,299 A * | 6/1990 | Ewen et al. | ............. | 526/119 |
| 4,939,217 A | 7/1990 | Stricklen | | |
| 5,422,325 A * | 6/1995 | Jejelowo et al. | ............. | 502/104 |
| 5,576,259 A | 11/1996 | Hasegawa et al. | | |
| 5,719,241 A * | 2/1998 | Razavi et al. | ............. | 526/119 |
| 5,773,106 A | 6/1998 | DeGroot et al. | | |
| 5,786,291 A * | 7/1998 | Speca et al. | ............. | 502/104 |
| 5,807,938 A | 9/1998 | Kaneko et al. | | |
| 5,817,590 A | 10/1998 | Hasegawa et al. | | |
| 5,847,059 A * | 12/1998 | Shamshoum et al. | ........ | 526/116 |
| 5,863,853 A | 1/1999 | Vaugham et al. | | |
| 5,891,814 A * | 4/1999 | Richeson et al. | ............. | 442/401 |
| 6,180,731 B1 * | 1/2001 | Rohde et al. | ............. | 526/113 |
| 6,197,900 B1 * | 3/2001 | Seelert et al. | ............. | 526/114 |
| 6,207,606 B1 * | 3/2001 | Lue et al. | ............. | 502/113 |
| 6,207,774 B1 | 3/2001 | Hasegawa et al. | | |
| 6,300,451 B1 | 10/2001 | Mehta et al. | | |
| 6,376,415 B1 * | 4/2002 | McDaniel et al. | ......... | 502/113 |
| 6,380,328 B1 | 4/2002 | McConville et al. | | |
| 6,388,017 B1 * | 5/2002 | McDaniel et al. | ......... | 525/240 |
| 6,395,666 B1 * | 5/2002 | McDaniel et al. | ............. | 502/87 |
| 6,492,472 B1 * | 12/2002 | Lue et al. | ............. | 526/114 |
| 6,512,019 B1 * | 1/2003 | Agarwal et al. | ............. | 521/134 |
| 6,518,385 B1 | 2/2003 | Chai | | |
| 6,541,413 B1 * | 4/2003 | Razavi et al. | ............. | 502/152 |
| 6,583,227 B1 * | 6/2003 | Mehta et al. | ............. | 525/240 |
| 6,613,852 B1 * | 9/2003 | McDaniel et al. | ......... | 526/160 |
| 6,667,274 B1 * | 12/2003 | Hawley et al. | ............. | 502/415 |
| 6,753,390 B1 * | 6/2004 | Ehrman et al. | ............. | 526/113 |
| 6,831,141 B1 * | 12/2004 | McDaniel et al. | ......... | 526/129 |
| 6,833,338 B1 * | 12/2004 | McDaniel et al. | ......... | 502/104 |
| 6,875,828 B1 * | 4/2005 | Kuo et al. | ............. | 526/114 |
| 2002/0143123 A1 * | 10/2002 | Dekmezian et al. | ........ | 526/119 |
| 2003/0105237 A1 * | 6/2003 | Winter et al. | ............. | 525/240 |
| 2003/0130443 A1 * | 7/2003 | Suhm et al. | ............. | 526/65 |
| 2003/0236364 A1 * | 12/2003 | McCullough et al. | ........ | 526/68 |
| 2004/0006186 A1 * | 1/2004 | Jensen et al. | ............. | 526/133 |
| 2004/0048990 A1 * | 3/2004 | Brinen et al. | ............. | 526/114 |

FOREIGN PATENT DOCUMENTS

| | | |
|---|---|---|
| EP | 0619325 A1 | 10/1994 |
| EP | 0643084 A2 | 3/1995 |
| EP | 0743327 A2 | 11/1996 |
| EP | 0927201 B1 | 7/1999 |
| EP | 0989141 A1 | 3/2000 |
| EP | 0619325 B1 | 8/2001 |
| EP | 1312625 A1 | 5/2003 |
| WO | WO 96/12762 A1 | 5/1996 |
| WO | WO 99/35174 A1 | 7/1999 |
| WO | WO 01/62847 A1 | 8/2001 |
| WO | WO 04055061 A1 | 7/2004 |

OTHER PUBLICATIONS

International Search Report and Written Opinion, PCT/US02/000278, Aug. 2, 2005, 14 pages.
Anneli Malmberg, et al., "Long-Chain Branched Polyethene Polymerized by metallocene Catalysts . . . " Macromolecules vol. 31, No. 24, Dec. 1, 1998, pp. 8448-8454.

* cited by examiner

*Primary Examiner*—David W. Wu
*Assistant Examiner*—Rip A. Lee
(74) *Attorney, Agent, or Firm*—Womble Carlyle Sandridge & Rice, PLLC

(57) ABSTRACT

This invention relates to the field of olefin polymerization catalyst compositions, and methods for the polymerization and copolymerization of olefins, including polymerization methods using a supported catalyst composition. In one aspect, the present invention encompasses a catalyst composition comprising the contact product of a first metallocene compound, a second metallocene compound, at least one chemically-treated solid oxide, and at least one organoaluminum compound. The new resins were characterized by useful properties in impact, tear, adhesion, sealing, extruder motor loads and pressures at comparable melt index values, and neck-in and draw-down.

30 Claims, 17 Drawing Sheets

CATALYST COMPOSITIONS AND POLYOLEFINS FOR EXTRUSION COATING APPLICATIONS

TECHNICAL FIELD OF THE INVENTION

This invention relates to the field of organometal compositions, olefin polymerization catalyst compositions, methods for the polymerization and copolymerization of olefins using a catalyst composition, and polyolefins.

BACKGROUND OF THE INVENTION

It is known that mono-1-olefins ($\alpha$-olefins), including ethylene, can be polymerized with catalyst compositions employing titanium, zirconium, vanadium, chromium or other metals, impregnated on a variety of support materials, often in the presence of cocatalysts. These catalyst compositions may be useful for both homopolymerization of ethylene, as well as copolymerization of ethylene with comonomers such as propylene, 1-butene, 1-hexene, or other higher $\alpha$-olefins. Therefore, there exists a constant search to develop new olefin polymerization catalysts, catalyst activation processes, and methods of making and using catalysts, that will provide enhanced catalytic activities and polymeric materials tailored to specific end uses.

One type of transition metal-based catalyst system comprises metallocene compounds, which have shown promise in tailoring polymer properties. However, there remain significant challenges in developing catalysts that can provide custom-made polymers with a specific set of desired properties. What are needed are new catalyst compositions and methods of making the catalyst compositions that afford high polymerization activities, and will allow polymer properties to be maintained within the desired specification ranges.

SUMMARY OF THE INVENTION

This invention encompasses catalyst compositions, methods for preparing catalyst compositions, methods for polymerizing olefins, and ethylene polymers and copolymers. In the course of examining metallocene-based olefin polymerization catalysts, it was discovered that a dual-metallocene catalyst system provided a useful combination of polyolefin properties, such as melt index, density, polydispersity, long chain branching, rheological properties, and the like. In one aspect, for example, the catalysts and methods of this invention can provide polyethylene resins using a low-pressure, loop-slurry manufacturing platform which attain processing and property characteristics which are suitable for extrusion coating applications.

In one aspect, the present invention encompasses a catalyst composition comprising the contact product of a first metallocene compound, a second metallocene compound, at least one chemically-treated solid oxide, and at least one organoaluminum compound. In this aspect, this invention encompasses a composition of matter, a catalyst composition for polymerizing olefins, a method of preparing a catalyst composition, a method of using a catalyst composition, new polymers and copolymers ethylene, and the like, in each case encompassing a first metallocene compound, a second metallocene compound, at least one chemically-treated solid oxide, and at least one organoaluminum compound.

In another aspect, this invention encompasses a catalyst composition comprising the contact product of a single metallocene compound, at least one chemically-treated solid oxide, and at least one organoaluminum compound. In this aspect, this invention encompasses a composition of matter, a catalyst composition for polymerizing olefins, a method of preparing a catalyst composition, a method of using a catalyst composition, new polymers and copolymers ethylene, and the like, in each case encompassing a single metallocene compound, at least one chemically-treated solid oxide, and at least one organoaluminum compound.

In one aspect, the present invention comprises a dual-metallocene catalyst composition, wherein the first metallocene compound can comprise a bis(cyclopentadienyl-type ligand) complex of Ti, Zr, or Hf; the second metallocene compound can comprise a bis(cyclopentadienyl-type ligand) complex of Ti, Zr, or Hf; at least one chemically-treated solid oxide component; and at least one organoaluminum compound. In still another aspect of this invention, the first metallocene compound can comprise an ansa-metallocene, and the second metallocene compound can comprise an ansa-metallocene.

In one aspect, the catalyst composition of the present invention comprises the contact product of a first metallocene compound, a second metallocene compound, at least one chemically-treated solid oxide, and at least one organoaluminum compound, wherein:

a) the first metallocene compound is selected from an ansa-metallocene having the following formula:

wherein $(X^1)$ and $(X^2)$ are jointly selected from a fluorenyl and a cyclopentadienyl, a fluorenyl and an indenyl, or two fluorenyls, any one of which can be substituted, unsubstituted, partially saturated, or any combination thereof; or

wherein $(X^1)$ and $(X^2)$ are jointly selected from two indenyls, any one of which can be substituted, unsubstituted, partially saturated, or any combination thereof;
wherein $M^1$ is selected from Ti, Zr, or Hf;
wherein $(X^1)$ and $(X^2)$ are connected by a substituted or unsubstituted bridging group comprising:
  i) one atom selected from carbon, silicon, germanium, or tin, bonded to both $(X^1)$ and $(X^2)$; or
  ii) two contiguous carbon atoms in a chain, one end of which is bonded to $(X^1)$ and the other end of which is bonded to $(X^2)$; and
wherein $(X^3)$; $(X^4)$; each substituent on the substituted cyclopentadienyl, the substituted indenyl, and the substituted fluorenyl; and each substituent on the substituted bridging group is independently selected from a hydrocarbyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 20 carbon atoms; a halide; or hydrogen;

b) the second metallocene compound is an ansa-metallocene having the following formula:

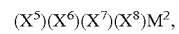

wherein M2 is selected from Ti, Zr, or Hf;
wherein $(X^5)$ and $(X^6)$ are independently selected from a cyclopentadienyl or a substituted cyclopentadienyl;

wherein ($X^5$) and ($X^6$) are connected by a substituted or unsubstituted bridging group comprising:
  i) one atom selected from carbon, silicon, germanium, or tin, bonded to both ($X^5$) and ($X^6$); or
  ii) two contiguous carbon atoms in a chain, one end of which is bonded to ($X^5$) and the other end of which is bonded to ($X^6$); and
wherein when ($X^5$) or ($X^6$) is a substituted cyclopentadienyl, the substituted cyclopentadienyl is substituted with up to four substituents, in addition to the bridging group;
wherein ($X^7$); ($X^8$); each substituent on the substituted cyclopentadienyl; and each substituent on the substituted bridging group is independently selected from a hydrocarbyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 20 carbon atoms; a halide; or hydrogen; and c) the chemically-treated solid oxide comprises a solid oxide treated with an electron-withdrawing anion.

In another aspect of this invention, the first metallocene compound can comprise an ansa-metallocene having the following formula:

$$(X^1)(X^2)(X^3)(X^4)M^1,$$

wherein $M^1$ is selected from Zr or Hf;

wherein ($X^1$) and ($X^2$) are jointly selected from a fluorenyl and a cyclopentadienyl or two fluorenyls, any one of which can be substituted or unsubstituted;

wherein ($X^1$) and ($X^2$) are connected by a bridging group selected from >$CR^1_2$, >$SiR^1_2$, or —$CR^1_2CR^1_2$—, wherein $R^1$ in each instance is independently selected from a linear, branched, substituted, or unsubstituted hydrocarbyl group, any one of which having from 1 to about 20 carbon atoms; halide; or hydrogen;

wherein any substituent on ($X^1$), ($X^2$), or $R^1$ is independently selected from a hydrocarbyl group, an oxygen group, a sulfur group, a nitrogen group, any one of which having from 1 to about 20 carbon atoms; or hydrogen; and wherein ($X^3$) and ($X^4$) are independently selected from alkoxide or aryloxide having from 1 to about 20 carbon atoms, halide, or hydride.

In yet another aspect of this invention, the first metallocene compound can comprise an ansa-metallocene having the following formula:

$$\text{rac-}(X^1)(X^2)(X^3)(X^4)Zr;$$

wherein ($X^1$) and ($X^2$) are jointly selected from two indenyls, any one of which can be substituted or unsubstituted;

wherein ($X^1$) and ($X^2$) are connected by a bridging group selected from >$CR^1_2$, >$SiR^1_2$, or —$CR^1_2CR^1_2$—, wherein $R^1$ in each instance is independently selected from a linear, branched, substituted, or unsubstituted hydrocarbyl group, any one of which having from 1 to about 20 carbon atoms; or hydrogen;

wherein any substituent on ($X^1$), ($X^2$), or $R^1$ is independently selected from a hydrocarbyl group, an oxygen group, a sulfur group, a nitrogen group, any one of which having from 1 to about 20 carbon atoms; or hydrogen; and wherein ($X^3$) and ($X^4$) are independently selected from alkoxide or aryloxide having from 1 to about 20 carbon atoms, halide, or hydride.

In still another aspect of this invention, the second metallocene compound can comprise an ansa-metallocene having the following formula:

$$(X^5)(X^6)(X^7)(X^8)Zr,$$

wherein ($X^5$) and ($X^6$) are independently selected from a cyclopentadienyl or a substituted cyclopentadienyl;

wherein ($X^5$) and ($X^6$) are connected by a bridging group selected from >$CR^2_2$, >$SiR^2_2$, or —$CR^2_2CR^2_2$—, wherein $R^2$ in each instance is independently selected from a linear, branched, substituted, or unsubstituted hydrocarbyl group, any one of which having from 1 to about 20 carbon atoms; or hydrogen;

wherein when ($X^5$) or ($X^6$) is a substituted cyclopentadienyl, the substituted cyclopentadienyl is substituted with up to four substituents, in addition to the bridging group;

wherein any substituent on ($X^5$), ($X^6$), or $R^2$ is independently selected from a hydrocarbyl group, an oxygen group, a sulfur group, a nitrogen group, any one of which having from 1 to about 20 carbon atoms; or hydrogen; and wherein ($X^7$) and ($X^8$) are independently selected from alkoxide or aryloxide having from 1 to about 20 carbon atoms, halide, or hydride.

In yet another aspect of this invention, the catalyst composition comprises an organoaluminum compound having the following formula:

$$Al(X^9)_n(X^{10})_{3-n};$$

wherein ($X^9$) is a hydrocarbyl having from 1 to about 20 carbon atoms; ($X^{10}$) is selected from alkoxide or aryloxide having from 1 to about 20 carbon atoms, halide, or hydride; and n is a number from 1 to 3, inclusive.

In still another aspect of this invention, the catalyst composition comprises a chemically-treated solid oxide comprising a solid oxide treated with an electron-withdrawing anion, wherein:

the solid oxide is selected from silica, alumina, silica-alumina, aluminum phosphate, heteropolytungstates, titania, zirconia, magnesia, boria, zinc oxide, mixed oxides thereof, or mixtures thereof; and the electron-withdrawing anion is selected from fluoride, chloride, bromide, phosphate, triflate, bisulfate, sulfate, fluorophosphate, fluorosulfate, or any combination thereof. In another aspect, for example, the chemically-treated solid oxide can be selected from fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, or any combination thereof. Futher, and in yet another aspect, the chemically-treated solid oxide can further comprise a metal or metal ion selected from zinc, nickel, vanadium, silver, copper, gallium, tin, tungsten, molybdenum, or any combination thereof.

In another aspect of this invention, the catalyst composition can comprise at least one chemically-treated solid oxide comprising at least one solid oxide treated with at least one electron-withdrawing anion, wherein the solid oxide can comprise any oxide that is characterized by a high surface area, and the electron-withdrawing anion can comprise any anion that increases the acidity of the solid oxide as compared to the solid oxide that is not treated with at least one electron-withdrawing anion.

Another aspect of this invention is a catalyst composition comprising the contact product of a first metallocene compound, a second metallocene compound, at least one chemically-treated solid oxide, and at least one organoaluminum compound, and further comprising an optional cocatalyst. While not intending to be bound by theory, it is believed that the cocatalyst functions as, among other things, a scavenger to remove traces of water and oxygen from the catalyst composition. Several different cocatalysts may be used in this catalyst composition including, but not limited to, organoaluminum compounds, aluminoxanes, organozinc compounds, organoboron compounds, ionizing ionic compounds, clay materials, or any combination thereof. Thus, additional organoaluminum compound is an optional cocatalyst, and can be either the same of different from the at least one organoaluminum compound of the catalyst composition.

Further, another aspect of this invention is a composition of matter comprising a first metallocene compound, a second metallocene compound, at least one chemically-treated solid oxide, and at least one organoaluminum compound. Yet another aspect of this invention is a method of making a catalyst composition comprising contacting a first metallocene compound, a second metallocene compound, at least one chemically-treated solid oxide, and at least one organoaluminum compound. Still another aspect of this invention is a method of polymerizing olefins comprising contacting at least one type of olefin monomer with a catalyst composition under polymerization conditions, wherein the catalyst composition comprises the contact product of a first metallocene compound, a second metallocene compound, at least one chemically-treated solid oxide, and at least one organoaluminum compound. In each of these aspects of the present invention, the first metallocene compound, the second metallocene compound, the at least one chemically-treated solid oxide, and the at least one organoaluminum compound are characterized as follows:

a) the first metallocene compound is selected from an ansa-metallocene having the following formula:

$$(X^1)(X^2)(X^3)(X^4)M^1, \quad \text{i)}$$

wherein $(X^1)$ and $(X^2)$ are jointly selected from a fluorenyl and a cyclopentadienyl, a fluorenyl and an indenyl, or two fluorenyls, any one of which can be substituted, unsubstituted, partially saturated, or any combination thereof; or $$\text{rac-}(X^1)(X^2)(X^1)(X^4)M^1, \quad \text{ii)}$$

wherein $(X^1)$ and $(X^2)$ are jointly selected from two indenyls, any one of which can be substituted, unsubstituted, partially saturated, or any combination thereof;

wherein $M^1$ is selected from Ti, Zr, or Hf;

wherein $(X^1)$ and $(X^2)$ are connected by a substituted or unsubstituted bridging group comprising:

i) one atom selected from carbon, silicon, germanium, or tin, bonded to both $(X^1)$ and $(X^2)$; or
  ii) two contiguous carbon atoms in a chain, one end of which is bonded to $(X^1)$ and the other end of which is bonded to $(X^2)$; and wherein $(X^3)$; $(X^4)$; each substituent on the substituted cyclopentadienyl, the substituted indenyl, and the substituted fluorenyl; and each substituent on the substituted bridging group is independently selected from a hydrocarbyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 20 carbon atoms; a halide; or hydrogen;

b) the second metallocene compound is an ansa-metallocene having the following formula:

$$(X^5)(X^6)(X^7)(X^1)M^2,$$

wherein $M^2$ is selected from Ti, Zr, or Hf;

wherein $(X^5)$ and $(X^6)$ are independently selected from a cyclopentadienyl or a substituted cyclopentadienyl;

wherein $(X^5)$ and $(X^6)$ are connected by a substituted or unsubstituted bridging group comprising:

i) one atom selected from carbon, silicon, germanium, or tin, bonded to both $(X^5)$ and $(X^6)$; or
  ii) two contiguous carbon atoms in a chain, one end of which is bonded to $(X^5)$ and the other end of which is bonded to $(X^6)$; and wherein when $(X^5)$ or $(X^6)$ is a substituted cyclopentadienyl, the substituted cyclopentadienyl is substituted with up to four substituents, in addition to the bridging group;

wherein $(X^7)$; $(X^8)$; each substituent on the substituted cyclopentadienyl; and each substituent on the substituted bridging group is independently selected from a hydrocarbyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 20 carbon atoms; a halide; or hydrogen; and c) the chemically-treated solid oxide comprises a solid oxide treated with an electron-withdrawing anion; and d) the organoaluminum compound has the following formula:

$$Al(X^9)_n(X^{10})_{3-n};$$

wherein $(X^9)$ is a hydrocarbyl having from 1 to about 20 carbon atoms; $(X^{10})$ is selected from alkoxide or aryloxide having from 1 to about 20 carbon atoms, halide, or hydride; and n is a number from 1 to 3, inclusive.

The present invention also encompasses new polyolefins.

Further, another aspect of this invention is a polymer of ethylene, characterized by a melt index from about 3 to about 30 g/min; a density from about 0.915 to about 0.945 g/cm³; a flow activation energy $E_a$ from about 35 to about 45 kJ/mol; a polydispersity index $(M_w/M_n)$ from about 3 to about 15; a $M_z$ from about 300 to about 1,500 kg/mol; a $M_w$ molecular weight from about 70 to about 200 kg/mol; and a number of Long Chain Branches per 1,000 carbon atoms (LCB/1000 carbon atoms) from about 0.02 to about 0.3, in the $M_w$ molecular weight range of about 100 to about 1,000 kg/mol.

Yet another aspect of this invention is a polymer of ethylene wherein the polymer neck-in at 300 ft/min line speed is from about 3 to about 8 in/side. In another aspect, the polymer of ethylene of this invention is characterized by a neck-in at 900 ft/min line speed of from about 3 to about 8 in/side.

Still another aspect of this invention is a polymer of ethylene wherein the extruder head pressure at 200 lb/hr extrusion rate is from about 500 to about 2000 psi. In another aspect, the polymer of ethylene of this invention is characterized by an extruder motor load at 200 lb/hr extrusion rate of from about 40 to about 120 amps.

Another aspect of this invention is a polymer of ethylene wherein the Elmendorf MD tear resistance is greater than or equal to about 2.1 g/lb/ream. In another aspect, the polymer of ethylene of this invention is characterized by a Spencer impact strength of greater than or equal to about 0.010 g/lb/ream. Still another aspect of this invention is a polymer of ethylene wherein the burst adhesion strength is greater than or equal to about 95%.

Yet another aspect of this invention is a polymer of ethylene wherein the hot tack initiation temperature at which hot tack strength of 1N/25 mm strength is developed is less than or equal to about 110° C. In another aspect, the polymer of ethylene of this invention is characterized by an ultimate seal strength of greater than or equal to about 3.5 lbf/in.

This invention also encompasses precontacting some or all of the catalyst components, and optionally pretreating some or all of these components with an olefin compound, prior to initiating the polymerization reaction.

The present invention further comprises methods for polymerizing olefins comprising contacting at least one olefin monomer and the catalyst composition under polymerization conditions to produce the polymer.

This invention also encompasses an article that comprises the polymer produced with the catalyst composition of this invention.

These and other features, aspects, embodiments, and advantages of the present invention will become apparent after a review of the following detailed description of the disclosed features.

BRIEF DESCRIPTION OF THE DRAWINGS

FIG. 11.

FIG. 12.

FIG. 13.

DETAILED DESCRIPTION OF THE INVENTION

Figure 1:
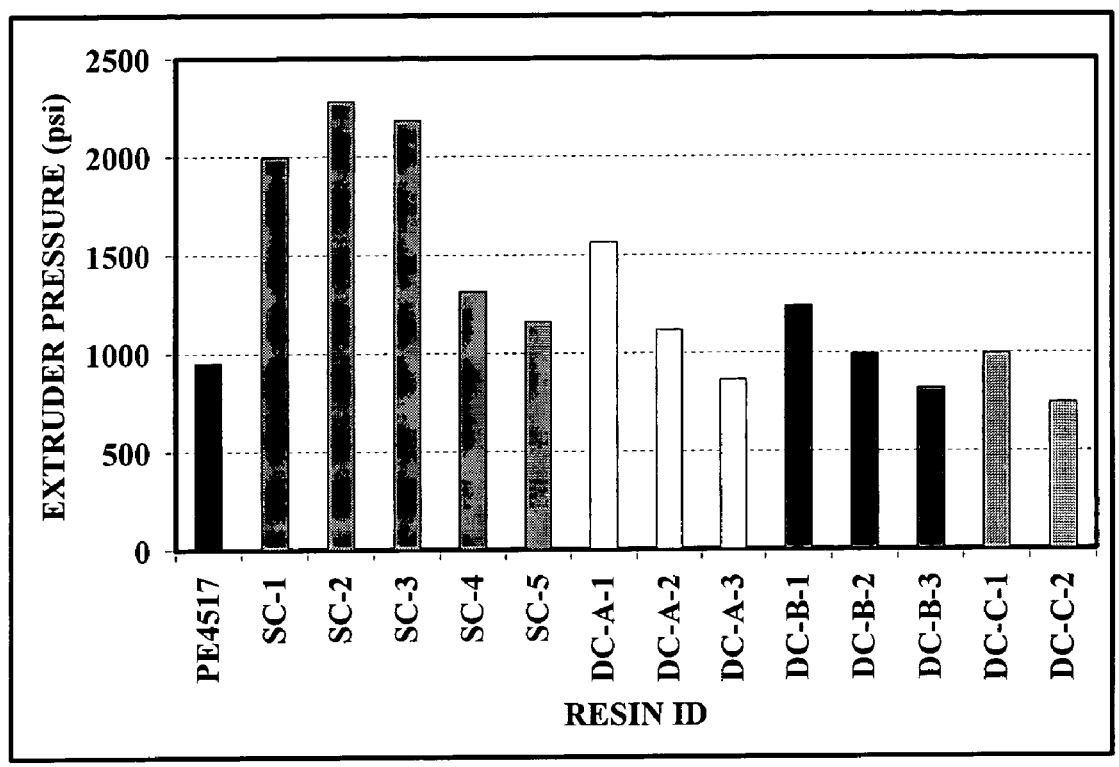
FIG. 1 provides comparative extruder head pressure data for the resins of the present invention.

The present invention provides new catalyst compositions, methods for preparing catalyst compositions, methods for using the catalyst compositions to polymerize olefin, and polyolefins. In one aspect, this invention encompasses a dual-metallocene catalyst system that provides a useful combination of polyolefin properties, such as melt index, density, polydispersity, long chain branching, Theological properties, and the like. For example, in one aspect of this invention, new metallocene catalyst polyethylene (PE) resins are provided which are suitable for extrusion coating applications. In another aspect, for example, the metallocene catalyst PE resins are formed using the low-pressure, Phillips loop-slurry manufacturing platform to attain the resin properties useful for extrusion coating applications.

In one aspect, the present invention encompasses a catalyst composition comprising the contact product of a first metallocene compound, a second metallocene compound, at least one chemically-treated solid oxide, and at least one organoaluminum compound. In another aspect, this invention encompasses a catalyst composition comprising the contact product of a single metallocene compound, at least one chemically-treated solid oxide, and at least one organoaluminum compound. In both these aspects, this invention encompasses a composition of matter, a catalyst composition for polymerizing olefins, a method of preparing a catalyst composition, a method of using a catalyst composition, new polymers and copolymers ethylene, and the like. In another aspect, this invention comprises new polyolefins.

In one aspect, the present invention comprises a dual-metallocene catalyst composition, wherein the first metallocene compound can comprise a bis(cyclopentadienyl-type ligand) complex of Ti, Zr, or Hf, the second metallocene compound can comprise a bis(cyclopentadienyl-type ligand) complex of Ti, Zr, or Hf; at least one chemically-treated solid oxide component; and at least one organoaluminum compound. In still another aspect of this invention, the first metallocene compound can comprise an ansa-metallocene, and the second metallocene compound can comprise an ansa-metallocene.

Catalyst Composition and Components

The Metallocene Compounds

In one aspect, the present invention provides a catalyst composition comprising a first metallocene compound, a second metallocene compound, at least one chemically-treated solid oxide, and at least one organoaluminum compound. In another aspect, for example, two different metallocene compounds are used simultaneously in a polymerization process to produce a polyethylene resin with properties that are useful for extrusion coating applications.

In one aspect of this invention, the first metallocene compound can be a titanium, zirconium, or hafnium metallocene compound wherein the two $\eta^5$-cyclopentadienyl-type ligands are bridged by a $C_1$, $C_2$, or $Si_1$ bridge, and wherein any one of the $\eta^5$-cyclopentadienyl-type ligands or bridging group may be substituted or unsubstituted. In this aspect, and under the reactor conditions disclosed herein, a catalyst composition based on the first metallocene compound, at least one chemically-treated solid oxide, and at least one organoaluminum compound typically provides a high molecular weight resin with an HLMI of less than about 10, and in another aspect, typically provides a high molecular weight resin with an HLMI of less than about 2. Further, in this aspect, the two $\eta^5$-cyclopentadienyl-type ligands are bridged by a substituted or unsubstituted bridging group ("bridge") comprising 1 or 2 contiguous ansa carbon atoms in a chain, or 1 ansa silicon atom, wherein one end of the 2-carbon chain is bonded to one $\eta^5$-cyclopentadienyl-type ligand and the other end of the chain is bonded to the other $\eta^5$-cyclopentadienyl-type ligand of the first metallocene compound. Examples of first metallocene compounds of this type of the present invention include, but are not limited to, a fluorenyl-bridge-cyclopentadienyl metallocene compound, a fluorenyl-bridge-indenyl metallocene compound, or a fluorenyl-bridge-fluorenyl metallocene compound, wherein any one of the $\eta^5$-cyclopentadienyl-type ligands or bridging group may be substituted or unsubstituted.

In another aspect, for example, the first metallocene compound can be a titanium, zirconium, or hafnium metallocene compound of the general type rac-indenyl-bridge-indenyl metallocene compound, wherein the bridge between the two $\eta^5$-indenyl ligands can be a $C_1$, $C_2$, or $Si_1$ bridge, and wherein any one of the $\eta^5$-indenyl ligands or bridging group may be substituted or unsubstituted. In this aspect, and under the reactor conditions disclosed herein, a catalyst composition based on the first metallocene compound, at least one chemically-treated solid oxide, and at least one organoaluminum compound typically provides a high molecular weight resin with an HLMI of less than about 10, and in another aspect, typically provides a high molecular weight resin with an HLMI of less than about 2. Further, in this aspect, the two $\eta^5$-indenyl ligands are bridged by a substituted or unsubstituted bridging group comprising 1 or 2 contiguous ansa carbon atoms in a chain, or 1 ansa silicon atom, wherein one end of the 2-carbon chain is bonded to one $\eta^5$-indenyl ligand and the other end of the chain is bonded to the other $\eta^5$-indenyl ligand of the first metallocene compound, so as to maintain the racemic metallocene compound.

In another aspect of this invention, the second metallocene compound can be a titanium, zirconium, or hafnium metallocene compound of the general type cyclopentadienyl-bridge-cyclopentadienyl metallocene compound, wherein the bridge between the two $\eta^5$-cyclopentadienyl ligands can be a $C_1$, $C_2$, or $Si_1$ bridge, and wherein any one of the $\eta^5$-cyclopentadienyl ligands or bridging group may be substituted or unsubstituted. In this aspect, and under the reactor conditions disclosed herein, a catalyst composition based on the second metallocene compound, at least one chemically-treated solid oxide, and at least one organoaluminum compound typically provides a low molecular weight resin with an MI of greater than about 1, and in another aspect, typically provides low molecular weight a resin with an MI of greater than about 20. Further, in this aspect, the two $\eta^5$-cyclopentadienyl ligands are bridged by a substituted or unsubstituted bridging group comprising 1 or 2 contiguous ansa carbon atoms in a chain, or 1 ansa silicon atom, bonded to both $\eta^5$-cyclopentadienyl ligands of the second metallocene compound.

In one aspect, the catalyst composition of the present invention comprises the contact product of a first metallocene compound, a second metallocene compound, at least one chemically-treated solid oxide, and at least one organoaluminum compound, wherein:

a) the first metallocene compound is selected from an ansa-metallocene having the following formula:

$$(X^1)(X^2)(X^3)(X^4)M^1, \qquad \text{i)}$$

wherein $(X^1)$ and $(X^2)$ are jointly selected from a fluorenyl and a cyclopentadienyl, a fluorenyl and an indenyl, or two fluorenyls, any one of which can be substituted, unsubstituted, partially saturated, or any combination thereof; or $$\text{rac-}(X^1)(X^2)(X^1)(X^4)M^1, \qquad \text{ii)}$$

wherein $(X^1)$ and $(X^2)$ are jointly selected from two indenyls, any one of which can be substituted, unsubstituted, partially saturated, or any combination thereof;

wherein $M^1$ is selected from Ti, Zr, or Hf;

wherein $(X^1)$ and $(X^2)$ are connected by a substituted or unsubstituted bridging group comprising:

i) one atom selected from carbon, silicon, germanium, or tin, bonded to both $(X^1)$ and $(X^2)$; or ii) two contiguous carbon atoms in a chain, one end of which is bonded to $(X^1)$ and the other end of which is bonded to $(X^2)$; and wherein $(X^3)$; $(X^4)$; each substituent on the substituted cyclopentadienyl, the substituted indenyl, and the substituted fluorenyl; and each substituent on the substituted bridging group is independently selected from a hydrocarbyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 20 carbon atoms; a halide; or hydrogen;

b) the second metallocene compound is an ansa-metallocene having the following formula:

$$(X^5)(X^6)(X^7)(X^8)M^2,$$

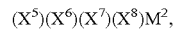

wherein $M^2$ is selected from Ti, Zr, or Hf;

wherein $(X^5)$ and $(X^6)$ are independently selected from a cyclopentadienyl or a substituted cyclopentadienyl;

wherein $(X^5)$ and $(X^6)$ are connected by a substituted or unsubstituted bridging group comprising:

i) one atom selected from carbon, silicon, germanium, or tin, bonded to both $(X^5)$ and $(X^6)$; or ii) two contiguous carbon atoms in a chain, one end of which is bonded to $(X^5)$ and the other end of which is bonded to $(X^6)$; and wherein when $(X^5)$ or $(X^6)$ is a substituted cyclopentadienyl, the substituted cyclopentadienyl is substituted with up to four substituents, in addition to the bridging group;

wherein $(X^7)$; $(X^8)$; and each substituent on the substituted cyclopentadienyl; and each substituent on the substituted bridging group is independently selected from a hydrocarbyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 20 carbon atoms; a halide; or hydrogen; and c) the chemically-treated solid oxide comprises a solid oxide treated with an electron-withdrawing anion.

In another aspect, the catalyst composition of the present invention comprises the contact product of a first metallocene compound, a second metallocene compound, at least one chemically-treated solid oxide, and at least one organoaluminum compound, wherein:

a) the first metallocene compound is selected from an ansa-metallocene having the following formula:

$(X^1)(X^2)(X^3)(X^4)M^1$,  i)

wherein $(X^1)$ and $(X^2)$ are jointly selected from a fluorenyl and a cyclopentadienyl, a fluorenyl and an indenyl, or two fluorenyls, any one of which can be substituted, unsubstituted, partially saturated, or any combination thereof; or rac-$(X^1)(X^2)(X^1)(X^4)M^1$,  ii)

wherein $(X^1)$ and $(X^2)$ are jointly selected from two indenyls, any one of which can be substituted, unsubstituted, partially saturated, or any combination thereof;

wherein $M^1$ is selected from Zr or Hf;

wherein $(X^1)$ and $(X^2)$ are connected by a bridging group selected from $>CR^1_2$, $>SiR^1_2$, or $—CR^1_2CR^1_2—$, wherein $R^1$ in each instance is independently selected from a linear, branched, substituted, or unsubstituted hydrocarbyl group, any one of which having from 1 to about 20 carbon atoms; or hydrogen;

wherein any substituent on $(X^1)$, $(X^2)$, or $R^1$ is independently selected from a hydrocarbyl group, an oxygen group, a sulfur group, a nitrogen group, a phosphorus group, an inorganic group, an organometallic group, having from 1 to about 20 carbon atoms; a halide; or hydrogen; and wherein $(X^3)$ and $(X^4)$ are independently selected from alkoxide or aryloxide having from 1 to about 20 carbon atoms, halide, or hydride; and b) the second metallocene compound is an ansa-metallocene having the following formula:

$(X^5)(X^6)(X^7)(X^8)Zr$, wherein $(X^5)$ and $(X^6)$ are independently selected from a cyclopentadienyl or a substituted cyclopentadienyl;

wherein $(X^5)$ and $(X^6)$ are connected by a bridging group selected from $>CR^2_2$, $>SiR^2_2$, or $—CR^2_2CR^2_2—$, wherein $R^2$ in each instance is independently selected from a linear, branched, substituted, or unsubstituted hydrocarbyl group, any one of which having from 1 to about 20 carbon atoms; or hydrogen;

wherein when $(X^5)$ or $(X^6)$ is a substituted cyclopentadienyl, the substituted cyclopentadienyl is substituted with up to four substituents, in addition to the bridging group;

wherein any substituent on $(X^5)$, $(X^6)$, or $R^2$ is independently selected from a hydrocarbyl group, an oxygen group, a sulfur group, a nitrogen group, a phosphorus group, an inorganic group, an organometallic group, having from 1 to about 20 carbon atoms; a halide; or hydrogen; and wherein $(X^7)$ and $(X^8)$ are independently selected from alkoxide, aryloxide, or amide having from 1 to about 20 carbon atoms, halide, or hydride.

The present invention further encompasses catalyst compositions comprising various combinations metallocene compound, including, but not limited to, at least one first metallocene compound in combination with a second metallocene compound, a first metallocene compound in combination with at least one second metallocene compound, at least one first metallocene compound in combination with at least one second metallocene compound, and any combination of more than one first metallocene compound and any combination of more than one second metallocene compound.

In still another aspect, the catalyst composition of this invention comprises the contact product of a first metallocene compound, a second metallocene compound, at least one chemically-treated solid oxide, and at least one organoaluminum compound, wherein the organoaluminum compound has the following formula:

$Al(X^9)_n(X^{10})_{3-n}$;

wherein $(X^9)$ is a hydrocarbyl having from 1 to about 20 carbon atoms; $(X^{10})$ is selected from alkoxide or aryloxide having from 1 to about 20 carbon atoms, halide, or hydride; and n is a number from 1 to 3, inclusive.

In yet another aspect, the catalyst composition of this invention comprises the contact product of a first metallocene compound, a second metallocene compound, at least one chemically-treated solid oxide, and at least one organoaluminum compound, wherein the chemically-treated solid oxide comprises a solid oxide treated with an electron-withdrawing anion, wherein:

the solid oxide is selected from silica, alumina, silica-alumina, aluminum phosphate, heteropolytungstates, titania, zirconia, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

The First Metallocene Compound

In one aspect of this invention, the first metallocene compound can comprise an ansa-metallocene having the following formula:

$(X^1)(X^2)(X^3)(X^4)M^1$, wherein $M^1$ is selected from Zr or Hf;

wherein $(X^1)$ and $(X^2)$ are jointly selected from a fluorenyl and a cyclopentadienyl or two fluorenyls, any one of which can be substituted or unsubstituted;

wherein $(X^1)$ and $(X^2)$ are connected by a bridging group selected from $>CR^1_2$, $>SiR^1_2$, or $—CR^1_2CR^1_2—$, wherein $R^1$ in each instance is independently selected from a linear, branched, substituted, or unsubstituted hydrocarbyl group, any one of which having from 1 to about 20 carbon atoms; halide; or hydrogen;

wherein any substituent on $(X^1)$, $(X^2)$, or $R^1$ is independently selected from a hydrocarbyl group, an oxygen group, a sulfur group, a nitrogen group, any one of which having from 1 to about 20 carbon atoms; or hydrogen; and wherein $(X^3)$ and $(X^4)$ are independently selected from alkoxide or aryloxide having from 1 to about 20 carbon atoms, halide, or hydride.

In yet another aspect, the first metallocene compound can comprise an ansa-metallocene having the following formula:

$$\text{rac-}(X^1)(X^2)(X^1)(X^4)Zr;\qquad 5$$

wherein $(X^1)$ and $(X^2)$ are jointly selected from two indenyls, any one of which can be substituted or unsubstituted;

wherein $(X^1)$ and $(X^2)$ are connected by a bridging group selected from $>CR^1_2$, $>SiR^1_2$, or $-CR^1_2CR^1_2-$, wherein $R^1$ in each instance is independently selected from a linear, branched, substituted, or unsubstituted hydrocarbyl group, any one of which having from 1 to about 20 carbon atoms; or hydrogen;

wherein any substituent on $(X^1)$, $(X^2)$, or $R^1$ is independently selected from a hydrocarbyl group, an oxygen group, a sulfur group, a nitrogen group, any one of which having from 1 to about 20 carbon atoms; or hydrogen; and wherein $(X^3)$ and $(X^4)$ are independently selected from alkoxide or aryloxide having from 1 to about 20 carbon atoms, halide, or hydride.

In another aspect of this invention, under the reactor conditions disclosed herein, a catalyst composition based on the first metallocene compound without a second metallocene, at least one chemically-treated solid oxide, and at least one organoaluminum compound typically provides a high molecular weight resin with an HLMI of less than about 10, and in another aspect, typically provides a resin with an HLMI of less than about 2.

In still another aspect, the two $\eta^5$-cyclopentadienyl-type ligands are bridged by a $C_1$, $C_2$, or $Si_1$ bridge, and wherein any one of the $\eta^5$-cyclopentadienyl-type ligands or bridging group may be substituted or unsubstituted.

In one aspect, for example, the first metallocene compound is selected from an ansa-metallocene having the following formula:

$$(X^1)(X^2)(X^3)(X^4)M^1,\qquad \text{i)}$$

wherein $(X^1)$ and $(X^2)$ are jointly selected from a fluorenyl and a cyclopentadienyl, a fluorenyl and an indenyl, or two fluorenyls, any one of which can be substituted or unsubstituted; or $$\text{rac-}(X^1)(X^2)(X^1)(X^4)M^1,\qquad \text{ii)}$$

wherein $(X^1)$ and $(X^2)$ are jointly selected from two indenyls, any one of which can be substituted or unsubstituted;

and wherein the possible substituents on $(X^1)$ and $(X^2)$ includes hydrogen. Thus, $(X^1)$ and $(X^2)$ may be partially saturated where chemically feasible, so long as the $\eta^5$-cyclopentadienyl-type ligand remains intact. Thus, the definitions of $(X^1)$ and $(X^2)$ include partially saturated analogs such as partially saturated indenyls and fluorenyls including, but not limited to, tetrahydroindenyls, tetrahydrofluorenyls, and octahydrofluorenyls.

In yet another aspect of this invention, examples of the first metallocene compound that are useful in the catalyst composition of this invention include a compound with the following formula:

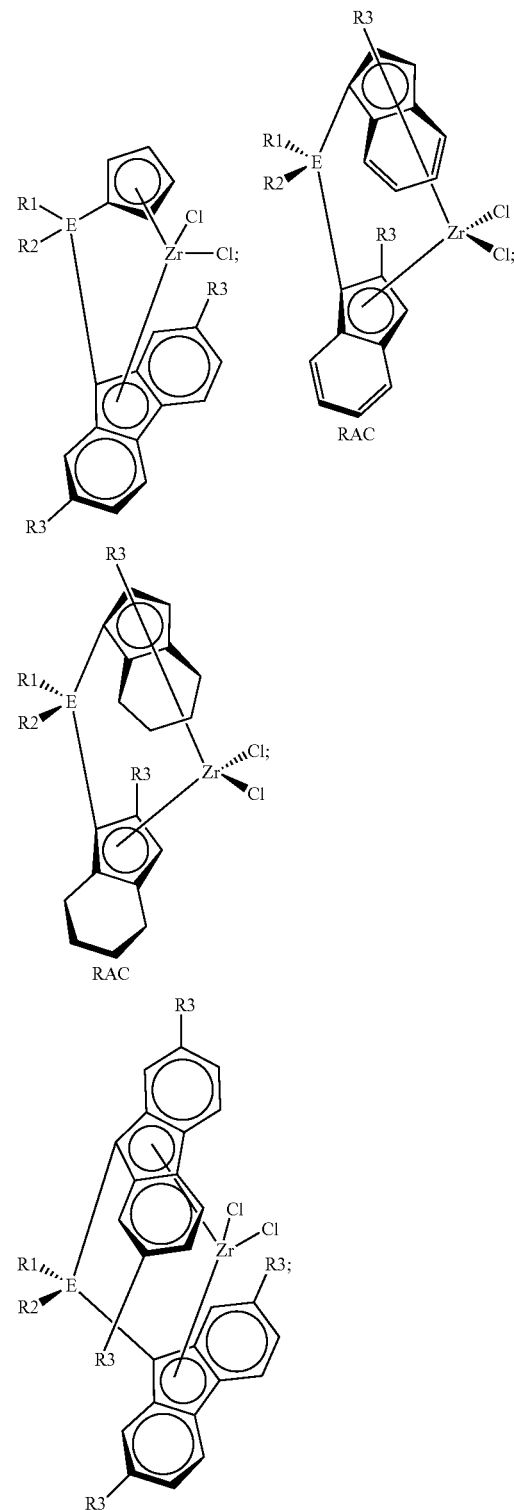

or any combination thereof;

wherein E is selected from C, Si, Ge, or Sn; and wherein R1, R2, and R3, in each instance, is independently selected from H or a hydrocarbyl group having from 1 to about 20 carbon atoms.

Examples of the first metallocene compound of this invention include, but are not limited to, the following compounds:
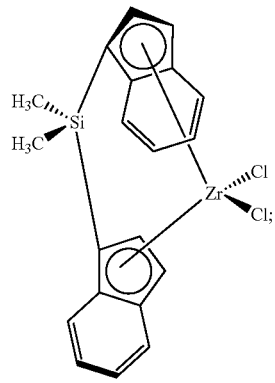
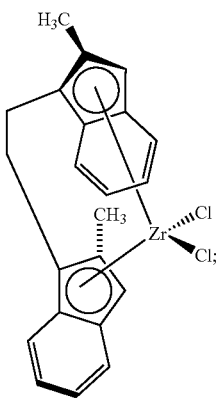
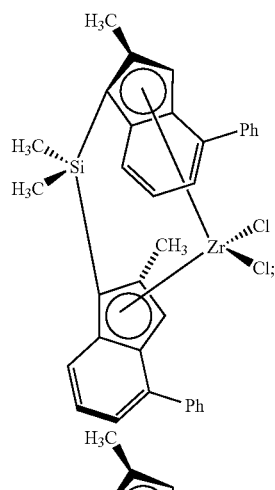
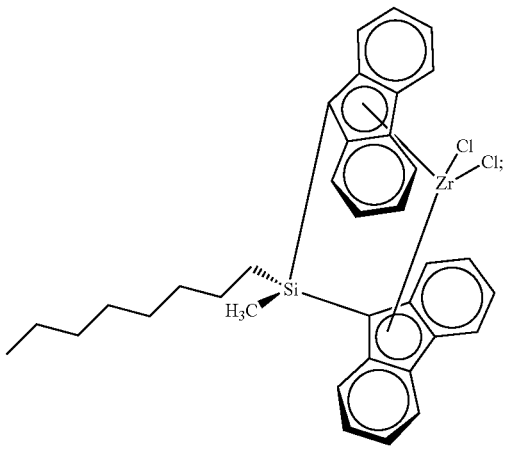
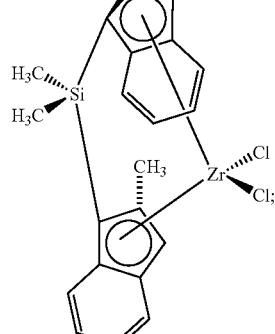
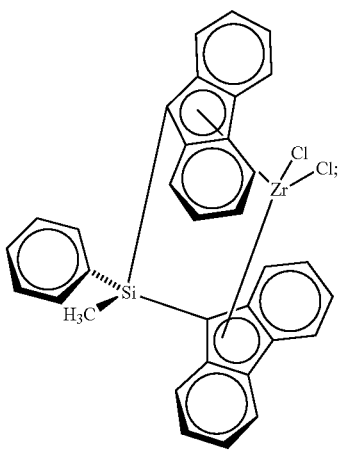
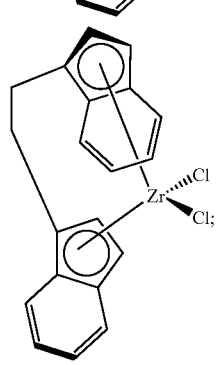

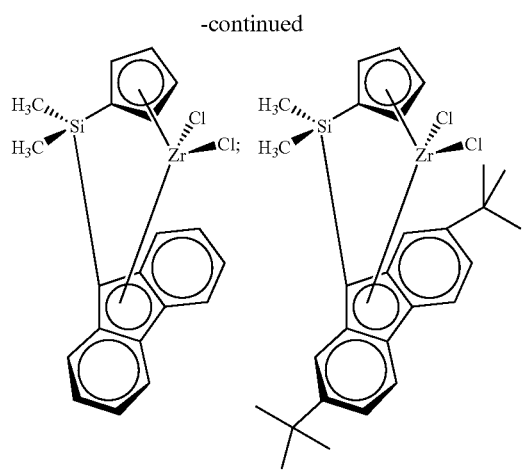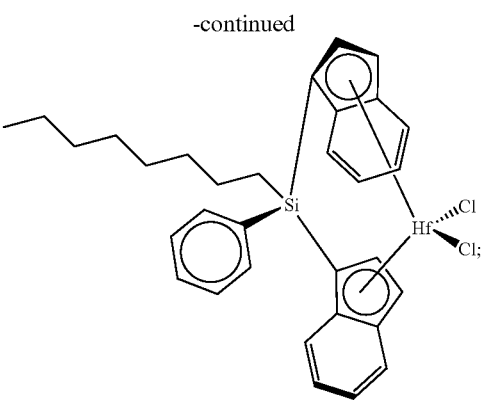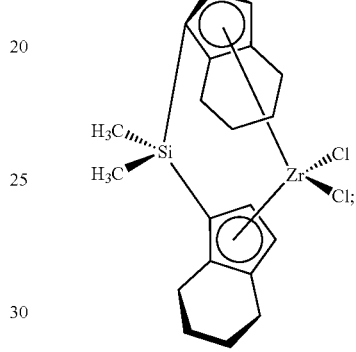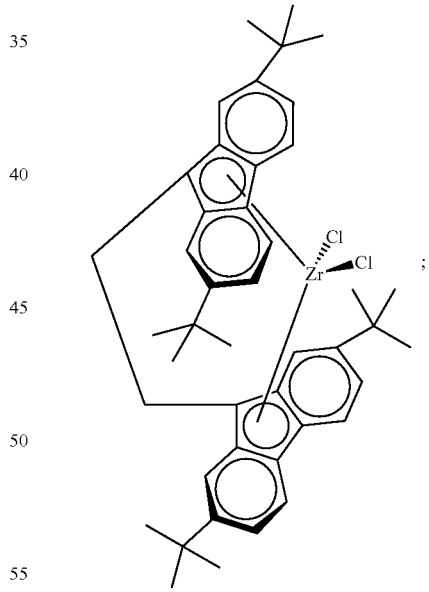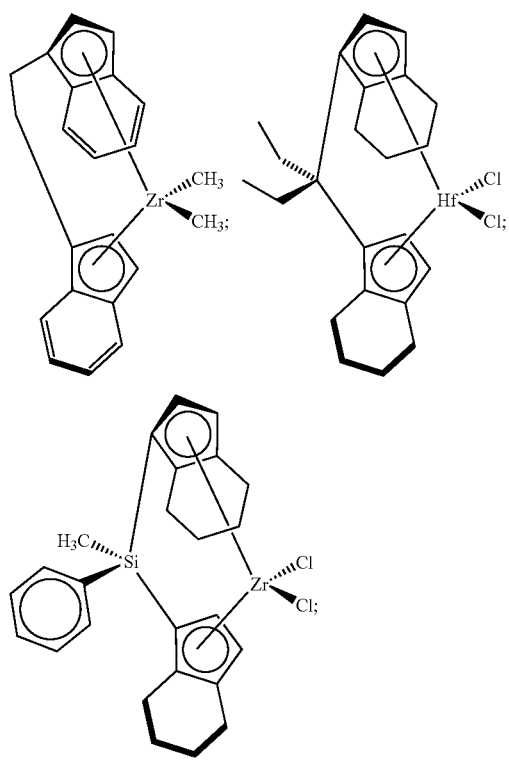
or any combination thereof.
Examples of the first metallocene compound of this invention also include, but are not limited to, the following compounds:
2-($\eta^5$-cyclopentadienyl)-2-($\eta^5$-fluoren-9-yl)hex-5-ene zirconium(IV) dichloride, [($\eta^5$-$C_5H_4$)$CCH_3$($CH_2CH_2CH=CH_2$)($\eta^5$-9-$C_{13}H_9$)]$ZrCl_2$;

2-(η$^5$-cyclopentadienyl)-2-(η$^5$-2,7-di-tert-butylfluoren-9-yl)hex-5-ene zirconium(IV) dichloride, [(η$^5$-C$_5$H$_4$)CCH$_3$(CH$_2$CH$_2$CH=CH$_2$)(η$^5$-9-C$_{13}$H$_7$-2,7-($^t$Bu$_2$)]ZrCl$_2$;

2-(η$^5$-cyclopentadienyl)-2-(η$^5$-fluoren-9-yl)hept-6-ene zirconium(IV) dichloride, [(η$^5$-C$_5$H$_4$)CCH$_3$(CH$_2$CH$_2$CH$_2$CH=CH$_2$)(η$^5$-9-C$_{13}$H$_9$)]ZrCl$_2$;

2-(η$^5$-cyclopentadienyl)-2-(η$^5$-2,7-di-tert-butylfluoren-9-yl)hept-6-ene zirconium(IV) dichloride, [(η$^5$-C$_5$H$_4$)CCH$_3$(CH$_2$CH$_2$CH$_2$CH=CH$_2$)(η$^5$-9-C$_{13}$H$_7$-2,7-$^t$Bu$_2$)]ZrCl$_2$;

1-(η$^5$-cyclopentadienyl)-1-(η$^5$-fluoren-9-yl)-1-phenyl-pent-4-ene zirconium(IV) dichloride, [(η$^5$-C$_5$H$_4$)C(C$_6$H$_5$)(CH$_2$CH$_2$CH=CH$_2$)(η$^5$-9-C$_{13}$H$_9$)]ZrCl$_2$;

1-(η$^5$-cyclopentadienyl)-1-(η$^5$-2,7-di-tert-butyl fluoren-9-yl)-1-phenylpent-4-ene zirconium(IV) dichloride, [(η$^5$-C$_5$H$_4$)C(C$_6$H$_5$)(CH$_2$CH$_2$CH=CH$_2$)(η$^5$-9-C$_{13}$H$_7$-2,7-$^t$Bu$_2$)]ZrCl$_2$;

1-(η$^5$-cyclopentadienyl)-1-(η$^5$-fluoren-9-yl)-1-phenyl-hex-5-ene zirconium(IV) dichloride, [(η$^5$-C$_5$H$_4$)C(C$_6$H$_5$)(CH$_2$CH$_2$CH$_2$CH=CH$_2$)(η$^5$-9-C$_{13}$H$_9$)]ZrCl$_2$;

1-(η$^5$-cyclopentadienyl)-1-(η$^5$-2,7-di-tert-butylfluoren-9-yl)-1-phenylhex-5-ene zirconium(IV) dichloride, [(η$^5$-C$_5$H$_4$)C(C$_6$H$_5$)(CH$_2$CH$_2$CH$_2$CH=CH$_2$)(η$^{5-9}$-C$_{13}$H$_7$-2,7-$^t$Bu$_2$)]ZrCl$_2$;

or any combination thereof.

In another aspect, examples of the first metallocene compound include, but are not limited to, rac-C$_2$H$_4$(η$^5$-Ind)$_2$ZrCl$_2$, rac-Me$_2$Si(η$^5$-Ind)$_2$ZrCl$_2$, Me(octyl)Si(η$^5$-Flu)$_2$ZrCl$_2$, rac-Me$_2$Si(η$^5$-2-Me-4-PhInd)$_2$ZrCl$_2$, rac-C$_2$H$_4$(η$^5$-2-MeInd)$_2$ZrCl$_2$, Me(Ph)Si(η$^5$-Flu)$_2$ZrCl$_2$, or any combination thereof.

The Second Metallocene Compound

In one aspect of this invention, the second metallocene compound can comprise an ansa-metallocene having the following formula:

(X$^5$)(X$^6$)(X$^7$)(X$^8$)Zr, wherein (X$^5$) and (X$^6$) are independently selected from a cyclopentadienyl or a substituted cyclopentadienyl;

wherein (X$^5$) and (X$^6$) are connected by a bridging group selected from >CR$^2$$_2$, >SiR$^2$$_2$, or —CR$^2$$_2$CR$^2$$_2$—, wherein R$^2$ in each instance is independently selected from a linear, branched, substituted, or unsubstituted hydrocarbyl group, any one of which having from 1 to about 20 carbon atoms; or hydrogen;

wherein when (X$^5$) or (X$^6$) is a substituted cyclopentadienyl, the substituted cyclopentadienyl is substituted with up to four substituents, in addition to the bridging group;

wherein any substituent on (X$^5$), (X$^6$), or R$^2$ is independently selected from a hydrocarbyl group, an oxygen group, a sulfur group, a nitrogen group, any one of which having from 1 to about 20 carbon atoms; or hydrogen; and wherein (X$^7$) and (X$^8$) are independently selected from alkoxide or aryloxide having from 1 to about 20 carbon atoms, halide, or hydride.

In another aspect of this invention, under the reactor conditions disclosed herein, a catalyst composition based on the second metallocene compound without a first metallocene, at least one chemically-treated solid oxide, and at least one organoaluminum compound typically provides a low molecular weight resin with an MI of greater than about 1, and in another aspect, typically provides a resin with an MI of greater than about 20.

In yet another aspect of this invention, examples of the second metallocene compound that are useful in the catalyst composition of this invention include a compound with the following formula:

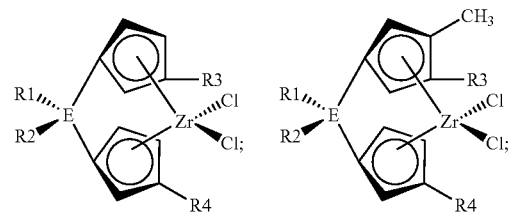
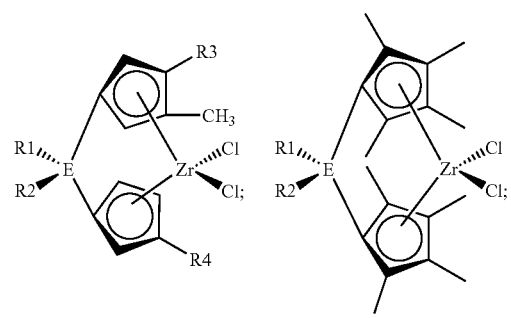

or any combination thereof, wherein E is selected from C, Si, Ge, or Sn; and wherein R1, R2, R3, and R4, in each instance, is independently selected from H or a hydrocarbyl group having from 1 to about 20 carbon atoms.

Examples of the second metallocene compound of this invention include, but are not limited to, the following compounds:

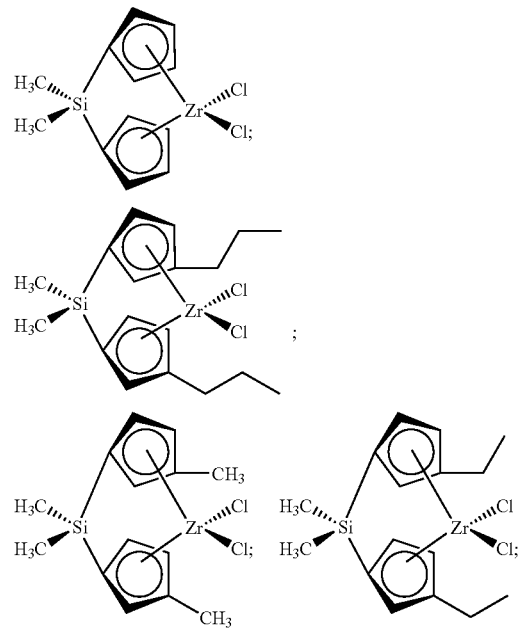

-continued

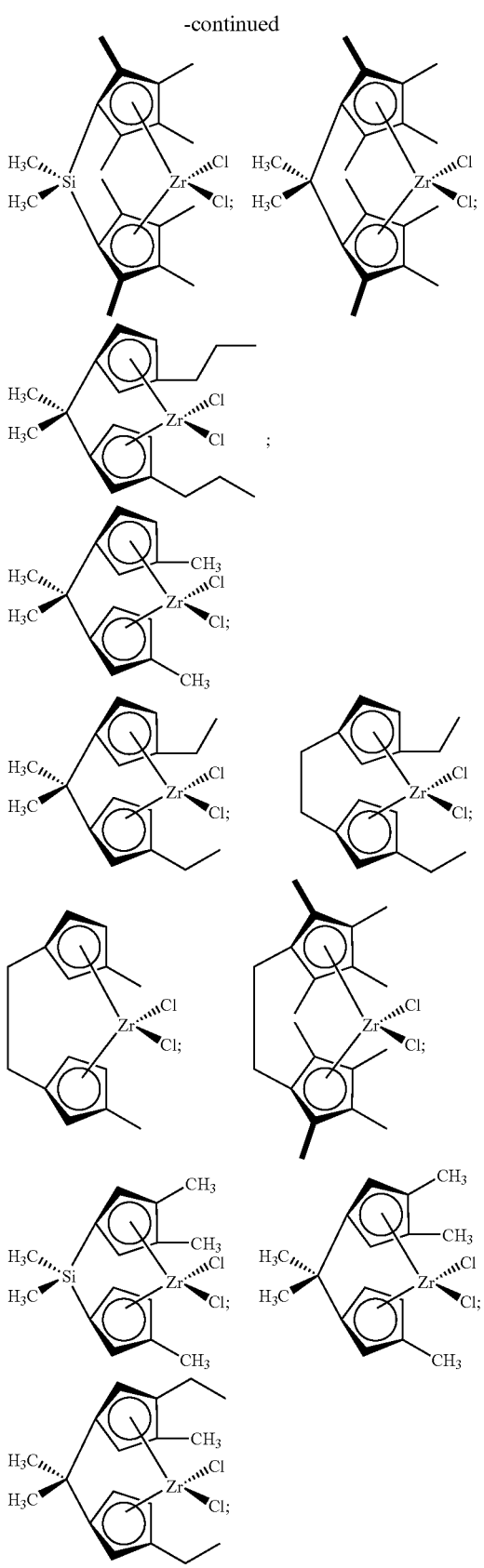

or any combination thereof.

In another aspect of this invention, examples of the second metallocene compound include, but are not limited to, rac-Me$_2$Si(3-n-PrCp)$_2$ZrCl$_2$, Me$_2$Si(Me$_4$Cp)$_2$ZrCl$_2$, Me$_2$SiCp$_2$ZrCl$_2$, or any combination thereof.

Substituents

In one aspect of this invention, the metallocene compounds can comprise a variety of substituents, comprising chemical moieties bonded either to the metal itself as an (X$^3$), (X$^4$), (X$^7$), or (X$^8$) ligand, or bonded to another portion of the molecule, such as a substituent on a η$^5$-cyclopentadienyl-type ligand, a substituent on a bridging group linking two a η$^5$-cyclopentadienyl-type ligand, or the like.

In this aspect, for example, (X$^3$); (X$^4$); each substituent on the substituted cyclopentadienyl, the substituted indenyl, and the substituted fluorenyl; and each substituent on the substituted bridging group may be independently selected from a hydrocarbyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 20 carbon atoms; a halide; or hydrogen; as long as these groups do not terminate the activity of the catalyst composition. Further, this description can include substituted, unsubstituted, branched, linear, or heteroatom-substituted analogs of these moieties.

Further, this list includes substituents that may be characterized in more than one of these categories such as benzyl. This list also includes hydrogen, therefore the notion of a substituted indenyl and substituted fluorenyl includes partially saturated indenyls and fluorenyls including, but not limited to, tetrahydroindenyls, tetrahydrofluorenyls, and octahydrofluorenyls.

Examples of each of these substituent groups include, but are not limited to, the following groups. In each example presented below, unless otherwise specified, R is independently selected from: an aliphatic group; an aromatic group; a cyclic group; any combination thereof; any substituted derivative thereof, including but not limited to, a halide-, an alkoxide-, or an amide-substituted derivative thereof; any one of which has from 1 to about 20 carbon atoms; or hydrogen. Also included in these groups are any unsubstituted, branched, or linear analogs thereof.

Examples of aliphatic groups, in each instance, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof, in each instance having from one to about 20 carbon atoms. Thus, aliphatic groups include, but are not limited to, hydrocarbyls such as paraffins and alkenyls. For example, aliphatic groups as used herein include methyl, ethyl, propyl, n-butyl, tert-butyl, sec-butyl, isobutyl, amyl, isoamyl, hexyl, cyclohexyl, heptyl, octyl, nonyl, decyl, dodecyl, 2-ethylhexyl, pentenyl, butenyl, and the like.

Examples of aromatic groups, in each instance, include, but are not limited to, phenyl, naphthyl, anthacenyl, and the like, including substituted derivatives thereof, in each instance having from 6 to about 25 carbons. Substituted derivatives of aromatic compounds include, but are not limited to, tolyl, xylyl, mesityl, and the like, including any heteroatom substituted derivative thereof.

Examples of cyclic groups, in each instance, include, but are not limited to, cycloparaffins, cycloolefins, cycloacetylenes, arenes such as phenyl, bicyclic groups and the like, including substituted derivatives thereof, in each instance having from about 3 to about 20 carbon atoms. Thus heteroatom-substituted cyclic groups such as furanyl are included herein.

In each instance, aliphatic and cyclic groups are groups comprising an aliphatic portion and a cyclic portion, examples of which include, but are not limited to, groups such as: —$(CH_2)_m C_6H_q R_{5-q}$ wherein m is an integer from 1 to about 10, q is an integer from 1 to 5, inclusive; $(CH_2)_m C_6H_q R_{10-q}$ wherein m is an integer from 1 to about 10, q is an integer from 1 to 10, inclusive; and $(CH_2)_m C_5H_q R_{9-q}$ wherein m is an integer from 1 to about 10, q is an integer from 1 to 9, inclusive. In each instance and as defined above, R is independently selected from: an aliphatic group; an aromatic group; a cyclic group; any combination thereof; any substituted derivative thereof, including but not limited to, a halide-, an alkoxide-, or an amide-substituted derivative thereof, any one of which has from 1 to about 20 carbon atoms; or hydrogen. In one aspect, aliphatic and cyclic groups include, but are not limited to: —$CH_2C_6H_5$; —$CH_2C_6H_4F$; —$CH_2C_6H_4Cl$; —$CH_2C_6H_4Br$; —$CH_2C_6H_4I$; —$CH_2C_6H_4OMe$; —$CH_2C_6H_4OEt$; —$CH_2C_6H_4NH_2$; —$CH_2C_6H_4NMe_2$; —$CH_2C_6H_4NEt_2$; —$CH_2CH_2C_6H_5$; —$CH_2CH_2C_6H_4F$; —$CH_2CH_2C_6H_4Cl$; —$CH_2CH_2C_6H_4Br$; —$CH_2CH_2C_6H_4I$; —$CH_2CH_2C_6H_4OMe$; —$CH_2CH_2C_6H_4OEt$; —$CH_2CH_2C_6H_4NH_2$; —$CH_2CH_2C_6H_4NMe_2$; —$CH_2CH_2C_6H_4NEt_2$; any regioisomer thereof, and any substituted derivative thereof.

Examples of halides, in each instance, include fluoride, chloride, bromide, and iodide.

In each instance, oxygen groups are oxygen-containing groups, examples of which include, but are not limited to, alkoxy or aryloxy groups (—OR), —OC(O)R, —OC(O)H, —$OSiR_3$, —$OPR_2$, —$OAlR_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms. Examples of alkoxy or aryloxy groups (—OR) groups include, but are not limited to, methoxy, ethoxy, propoxy, butoxy, phenoxy, substituted phenoxy, and the like.

In each instance, sulfur groups are sulfur-containing groups, examples of which include, but are not limited to, —SR, —$OSO_2R$, —$OSO_2OR$, —SCN, —$SO_2R$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, nitrogen groups are nitrogen-containing groups, which include, but are not limited to, —$NH_2$, —NHR, —$NR_2$, —$NO_2$, —$N_3$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, phosphorus groups are phosphorus-containing groups, which include, but are not limited to, —$PH_2$, —PHR, —$PR_2$, —$P(O)R_2$, —$P(OR)_2$, —$P(O)(OR)_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, arsenic groups are arsenic-containing groups, which include, but are not limited to, —AsHR, —$AsR_2$, —$As(O)R_2$, —$As(OR)_2$, —$As(O)(OR)_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, carbon groups are carbon-containing groups, which include, but are not limited to, alkyl halide groups that comprise halide-substituted alkyl groups with 1 to about 20 carbon atoms, aralkyl groups with 1 to about 20 carbon atoms, —C(O)H, —C(O)R, —C(O)OR, cyano, —C(NR)H, —C(NR)R, —C(NR)OR, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, silicon groups are silicon-containing groups, which include, but are not limited to, silyl groups such alkylsilyl groups, arylsilyl groups, arylalkylsilyl groups, siloxy groups, and the like, which in each instance have from 1 to about 20 carbon atoms. For example, silicon groups include trimethylsilyl and phenyloctylsilyl groups.

In each instance, germanium groups are germanium-containing groups, which include, but are not limited to, germyl groups such alkylgermyl groups, arylgermyl groups, arylalkylgermyl groups, germyloxy groups, and the like, which in each instance have from 1 to about 20 carbon atoms.

In each instance, tin groups are tin-containing groups, which include, but are not limited to, stannyl groups such alkylstannyl groups, arylstannyl groups, arylalkylstannyl groups, stannoxy (or "stannyloxy") groups, and the like, which in each instance have from 1 to about 20 carbon atoms. Thus, tin groups include, but are not limited to, stannoxy groups.

In each instance, lead groups are lead-containing groups, which include, but are not limited to, alkyllead groups, aryllead groups, arylalkyllead groups, and the like, which in each instance, have from 1 to about 20 carbon atoms.

In each instance, boron groups are boron-containing groups, which include, but are not limited to, —$BR_2$, —$BX_2$, —BRX, wherein X is a monoanionic group such as halide, hydride, alkoxide, alkyl thiolate, and the like, and wherein R in each instance is selected from alkyl, cycloalkyl, aryl, aralkyl, substituted alkyl, substituted aryl, or substituted aralkyl having from 1 to about 20 carbon atoms.

In each instance, aluminum groups are aluminum-containing groups, which include, but are not limited to, —$AlR_2$, —$AlX_2$, —AlRX, wherein X is a monoanionic group such as halide, hydride, alkoxide, alkyl thiolate, and the like, and wherein R in each instance is selected from alkyl, cycloalkyl, aryl, aralkyl, substituted alkyl, substituted aryl, or substituted aralkyl having from 1 to about 20 carbon atoms.

Examples of inorganic groups that may be used as substituents for substituted cyclopentadienyls, substituted indenyls, substituted fluorenyls, and substituted boratabenzenes, in each instance, include, but are not limited to, —$SO_2X$, —$OAlX_2$, —$OSiX_3$, —$OPX_2$, —SX, —$OSO_2X$, —$AsX_2$, —$As(O)X_2$, —$PX_2$, and the like, wherein X is a monoanionic group such as halide, hydride, amide, alkoxide, alkyl thiolate, and the like, and wherein any alkyl, cycloalkyl, aryl, aralkyl, substituted alkyl, substituted aryl, or substituted aralkyl group or substituent on these ligands has from 1 to about 20 carbon atoms.

Examples of organometallic groups that may be used as substituents for substituted cyclopentadienyls, substituted indenyls, and substituted fluorenyls, in each instance, include, but are not limited to, organoboron groups, organoaluminum groups, organogallium groups, organosilicon groups, organogermanium groups, organotin groups, organolead groups, organo-transition metal groups, and the like, having from 1 to about 20 carbon atoms.

Numerous processes to prepare metallocene compounds that can be employed in this invention have been reported. For example, U.S. Pat. Nos. 4,939,217, 5,191,132, 5,210,352, 5,347,026, 5,399,636, 5,401,817, 5,420,320, 5,436,305, 5,451,649, 5,496,781, 5,498,581, 5,541,272, 5,554,795, 5,563,284, 5,565,592, 5,571,880, 5,594,078, 5,631,203, 5,631,335, 5,654,454, 5,668,230, 5,705,579, and 6,509,427 describe such methods, each of which is incorporated by reference herein, in its entirety. Other processes to prepare metallocene compounds that can be employed in this invention have been reported in references such as: Köppl, A. Alt, H. G. *J. Mol. Catal A*. 2001, 165, 23; Kajigaeshi, S.; Kadowaki, T.; Nishida, A.; Fujisaki, S. *The Chemical Society of Japan*, 1986, 59, 97; Alt, H. G.; Jung, M.; Kehr, G. *J. Organomet. Chem*. 1998, 562, 153–181; and Alt, H. G.; Jung, M. *J. Organomet. Chem*. 1998, 568, 87–112; each of which is incorporated by reference herein, in its entirety. Further, additional processes to prepare metallocene compounds that can be employed in this invention have been reported in: *Journal of Organometallic Chemistry*, 1996, 522, 39–54, which is incorporated by reference herein, in its entirety. The following treatises also describe such methods: Wailes, P. C.; Coutts, R. S. P.; Weigold, H. in Organometallic Chemistry of Titanium, Zironium, and Hafnium, Academic; New York, 1974.; Cardin, D. J.; Lappert, M. F.; and Raston, C. L.; Chemistry of Organo-Zirconium and -Hafnium Compounds; Halstead Press; New York, 1986; each of which is incorporated by reference herein, in its entirety.

The Chemically Treated Solid Oxide

In one aspect, this invention encompasses a catalyst composition comprising a first metallocene compound, a second metallocene compound, at least one chemically-treated solid oxide, and at least one organoaluminum compound. In another aspect, the present invention encompasses catalyst compositions comprising a chemically-treated solid oxide which serves as an acidic activator-support, and which is typically used in combination with an organoaluminum compound.

In one aspect of this invention, the catalyst composition can comprise at least one chemically-treated solid oxide comprising at least one solid oxide treated with at least one electron-withdrawing anion, wherein the solid oxide can comprise any oxide that is characterized by a high surface area, and the electron-withdrawing anion can comprise any anion that increases the acidity of the solid oxide as compared to the solid oxide that is not treated with at least one electron-withdrawing anion.

In another aspect of this invention, the catalyst composition comprises a chemically-treated solid oxide comprising a solid oxide treated with an electron-withdrawing anion, wherein:

the solid oxide is selected from silica, alumina, silica-alumina, aluminum phosphate, heteropolytungstates, titania, zirconia, magnesia, boria, zinc oxide, mixed oxides thereof, or mixtures thereof; and the electron-withdrawing anion is selected from fluoride, chloride, bromide, phosphate, triflate, bisulfate, sulfate, fluorophosphate, fluorosulfate, or any combination thereof. In another aspect, for example, the chemically-treated solid oxide can be selected from fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, or any combination thereof. Futher, and in yet another aspect, the chemically-treated solid oxide can further comprise a metal or metal ion selected from zinc, nickel, vanadium, silver, copper, gallium, tin, tungsten, molybdenum, or any combination thereof.

The chemically-treated solid oxide typically comprises the contact product of at least one solid oxide compound and at least one electron-withdrawing anion source. In one aspect, the solid oxide compound comprises an inorganic oxide. It is not required that the solid oxide compound be calcined prior to contacting the electron-withdrawing anion source. The contact product may be calcined either during or after the solid oxide compound is contacted with the electron-withdrawing anion source. In this aspect, the solid oxide compound may be calcined or uncalcined. In another aspect, the activator-support may comprise the contact product of at least one calcined solid oxide compound and at least one electron-withdrawing anion source.

The chemically-treated solid oxide, also termed the activator-support, exhibits enhanced acidity as compared to the corresponding untreated solid oxide compound. The chemically-treated solid oxide also functions as a catalyst activator as compared to the corresponding untreated solid oxide. While the chemically-treated solid oxide activates the metallocene in the absence of cocatalysts, it is not necessary to eliminate cocatalysts from the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of an organoaluminum compound, aluminoxanes, organoboron compounds, or ionizing ionic compounds.

In one aspect, the chemically-treated solid oxide of this invention comprises a solid inorganic oxide material, a mixed oxide material, or a combination of inorganic oxide materials, that is chemically-treated with an electron-withdrawing component, and optionally treated with a metal. Thus, the solid oxide of this invention encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound, and are encompassed by this invention.

In one aspect of this invention, the chemically-treated solid oxide further comprises a metal or metal ion selected from zinc, nickel, vanadium, titanium, silver, copper, gallium, tin, tungsten, molybdenum, or any combination thereof. Examples of chemically-treated solid oxides that further comprise a metal or metal ion include, but are not limited to, zinc-impregnated chlorided alumina, titanium-impregnated fluorided alumina, zinc-impregnated fluorided alumina, zinc-impregnated chlorided silica-alumina, zinc-impregnated fluorided silica-alumina, zinc-impregnated sulfated alumina, chlorided zinc aluminate, fluorided zinc aluminate, sulfated zinc aluminate, or any combination thereof.

In another aspect, the chemically-treated solid oxide of this invention comprises a solid oxide of relatively high porosity, which exhibits Lewis acidic or Brønsted acidic behavior. The solid oxide is chemically-treated with an electron-withdrawing component, typically an electron-withdrawing anion, to form a activator-support. While not intending to be bound by the following statement, it is believed that treatment of the inorganic oxide with an electron-withdrawing component augments or enhances the acidity of the oxide. Thus in one aspect, the activator-support exhibits Lewis or Brønsted acidity which is typically greater than the Lewis or Brønsted acid strength than the untreated solid oxide, or the activator-support has a greater number of acid sites than the untreated solid oxide, or both. One method to quantify the acidity of the chemically-treated and untreated solid oxide materials is by comparing the polymerization activities of the treated and untreated oxides under acid catalyzed reactions.

In one aspect, the chemically-treated solid oxide comprises a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements. (See: *Hawley's Condensed Chemical Dictionary*, 11$^{th}$ Ed., John Wiley & Sons; 1995; Cotton, F. A.; Wilkinson, G.; Murillo; C. A.; and Bochmann; M. *Advanced Inorganic Chemistry*, 6$^{th}$ Ed., Wiley-Interscience, 1999.) Usually, the inorganic oxide comprises oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr.

Suitable examples of solid oxide materials or compounds that can be used in the chemically-treated solid oxide of the present invention include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. Examples of mixed oxides that can be used in the activator-support of the present invention include, but are not limited to, silica-alumina, silica-titania, silica-zirconia, zeolites, many clay minerals, alumina-titania, alumina-zirconia, zinc-aluminate and the like.

In one aspect of this invention, the solid oxide material is chemically-treated by contacting it with at least one electron-withdrawing component, typically an electron-withdrawing anion source. Further, the solid oxide material is optionally chemically-treated with a metal ion, then calcining to form a metal-containing or metal-impregnated chemically-treated solid oxide. Alternatively, a solid oxide material and an electron-withdrawing anion source are contacted and calcined simultaneously. The method by which the oxide is contacted with an electron-withdrawing component, typically a salt or an acid of an electron-withdrawing anion, includes, but is not limited to, gelling, co-gelling, impregnation of one compound onto another, and the like. Typically, following any contacting method, the contacted mixture of oxide compound, electron-withdrawing anion, and optionally the metal ion is calcined.

The electron-withdrawing component used to treat the oxide is any component that increases the Lewis or Brønsted acidity of the solid oxide upon treatment. In one aspect, the electron-withdrawing component is an electron-withdrawing anion derived from a salt, an acid, or other compound such as a volatile organic compound that may serve as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, trifluoroacetate, triflate, and the like, including mixtures and combinations thereof. In addition, other ionic or non-ionic compounds that serve as sources for these electron-withdrawing anions may also be employed in the present invention.

When the electron-withdrawing component comprises a salt of an electron-withdrawing anion, the counterion or cation of that salt may be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron withdrawing anions, in varying proportions, can be used to tailor the specific acidity of the activator-support to the desired level. Combinations of electron withdrawing components may be contacted with the oxide material simultaneously or individually, and any order that affords the desired chemically-treated solid oxide acidity. For example, one aspect of this invention is employing two or more electron-withdrawing anion source compounds in two or more separate contacting steps. Thus, one example of such a process by which an chemically-treated solid oxide is prepared is as follows: a selected solid oxide compound, or combination of oxide compounds, is contacted with a first electron-withdrawing anion source compound to form a first mixture, this first mixture is then calcined, the calcined first mixture is then contacted with a second electron-withdrawing anion source compound to form a second mixture, followed by calcining said second mixture to form a treated solid oxide compound. In such a process, the first and second electron-withdrawing anion source compounds are typically different compounds, although they may be the same compound.

In one aspect of the invention, the solid oxide activator-support (chemically-treated solid oxide) may be produced by a process comprising:

1) contacting a solid oxide compound with at least one electron-withdrawing anion source compound to form a first mixture; and 2) calcining the first mixture to form the solid oxide activator-support.

In another aspect of this invention, the solid oxide activator-support (chemically-treated solid oxide) is produced by a process comprising:

1) contacting at least one solid oxide compound with a first electron-withdrawing anion source compound to form a first mixture; and 2) calcining the first mixture to produce a calcined first mixture;

3) contacting the calcined first mixture with a second electron-withdrawing anion source compound to form a second mixture; and 4) calcining the second mixture to form the solid oxide activator-support. Thus, the solid oxide activator-support is sometimes referred to simply as a treated solid oxide compound.

Another aspect of this invention is producing or forming the chemically-treated solid oxide by contacting at least one solid oxide with at least one electron-withdrawing anion source compound, wherein the at least one solid oxide compound is calcined before, during or after contacting the electron-withdrawing anion source, and wherein there is a substantial absence of aluminoxanes and organoborates.

In one aspect of this invention, once the solid oxide has been treated and dried, it may be subsequently calcined. Calcining of the treated solid oxide is generally conducted in an ambient atmosphere, typically in a dry ambient atmosphere, at a temperature from about 200° C. to about 900° C., and for a time of about 1 minute to about 100 hours. In another aspect, calcining is conducted at a temperature from about 300° C. to about 800° C. and in another aspect, calcining is conducted at a temperature from about 400° C. to about 700° C. In yet another aspect, calcining is conducted from about 1 hour to about 50 hours, and in another aspect calcining is conducted, from about 3 hours to about 20 hours. In still another aspect, calcining may be carried out from about 1 to about 10 hours at a temperature from about 350° C. to about 550° C.

Further, any type of suitable ambient can be used during calcining. Generally, calcining is conducted in an oxidizing atmosphere, such as air. Alternatively, an inert atmosphere, such as nitrogen or argon, or a reducing atmosphere such as hydrogen or carbon monoxide, may be used.

In another aspect of the invention, the solid oxide component used to prepare the chemically-treated solid oxide has a pore volume greater than about 0.1 cc/g. In another aspect, the solid oxide component has a pore volume greater than about 0.5 cc/g, and in yet another aspect, greater than about 1.0 cc/g. In still another aspect, the solid oxide component has a surface area from about 100 to about 1000 $m^2/g$. In another aspect, solid oxide component has a surface area from about 200 to about 800 $m^2/g$, and in still another aspect, from about 250 to about 600 $m^2/g$.

The solid oxide material may be treated with a source of halide ion or sulfate ion, or a combination of anions, and optionally treated with a metal ion, then calcined to provide the chemically-treated solid oxide in the form of a particulate solid. In one aspect, the solid oxide material is treated with a source of sulfate, termed a sulfating agent, a source of chloride ion, termed a chloriding agent, a source of fluoride ion, termed a fluoriding agent, or a combination thereof, and calcined to provide the solid oxide activator. In another aspect, useful acidic activator-supports include, but are not limited to: bromided alumina; chlorided alumina; fluorided alumina; sulfated alumina; bromided silica-alumina, chlorided silica-alumina; fluorided silica-alumina; sulfated silica-alumina; bromided silica-zirconia, chlorided silica-zirconia; fluorided silica-zirconia; sulfated silica-zirconia; a pillared clay such as a pillared montmorillonite, optionally treated with fluoride, chloride, or sulfate; phosphated alumina, or other aluminophosphates, optionally treated with sulfate, fluoride, or chloride; or any combination thereof. Further, any of the activator-supports may optionally be treated with a metal ion.

In one aspect of this invention, the chemically-treated solid oxide comprises a fluorided solid oxide in the form of a particulate solid, thus a source of fluoride ion is added to the oxide by treatment with a fluoriding agent. In still another aspect, fluoride ion may be added to the oxide by forming a slurry of the oxide in a suitable solvent such as alcohol or water, including, but are not limited to, the one to three carbon alcohols because of their volatility and low surface tension. Examples of fluoriding agents that can be used in this invention include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), analogs thereof, and combinations thereof. For example, ammonium bifluoride $NH_4HF_2$ may be used as the fluoriding agent, due to its ease of use and ready availability.

In another aspect of the present invention, the solid oxide can be treated with a fluoriding agent during the calcining step. Any fluoriding agent capable of thoroughly contacting the solid oxide during the calcining step can be used. For example, in addition to those fluoriding agents described previously, volatile organic fluoriding agents may be used. Examples of volatile organic fluoriding agents useful in this aspect of the invention include, but are not limited to, freons, perfluorohexane, perfluorobenzene, fluoromethane, trifluoroethanol, and combinations thereof. Gaseous hydrogen fluoride or fluorine itself can also be used with the solid oxide is fluorided during calcining. One convenient method of contacting the solid oxide with the fluoriding agent is to vaporize a fluoriding agent into a gas stream used to fluidize the solid oxide during calcination.

Similarly, in another aspect of this invention, the chemically-treated solid oxide can comprise a chlorided solid oxide in the form of a particulate solid, thus a source of chloride ion is added to the oxide by treatment with a chloriding agent. The chloride ion may be added to the oxide by forming a slurry of the oxide in a suitable solvent. In another aspect of the present invention, the solid oxide can be treated with a chloriding agent during the calcining step. Any chloriding agent capable of serving as a source of chloride and thoroughly contacting the oxide during the calcining step can be used. For example, volatile organic choriding agents may be used. Examples of volatile organic choriding agents useful in this aspect of the invention include, but are not limited to, certain freons, perchlorobenzene, chloromethane, dichloromethane, chloroform, carbon tetrachloride, trichloroethanol, or any combination thereof. Gaseous hydrogen chloride or chlorine itself can also be used with the solid oxide during calcining. One convenient method of contacting the oxide with the chloriding agent is to vaporize a chloriding agent into a gas stream used to fluidize the solid oxide during calcination.

In one aspect, the amount of fluoride or chloride ion present before calcining the solid oxide is generally from about 2 to about 50% by weight, where the weight percents are based on the weight of the solid oxide, for example silica-alumina, before calcining. In another aspect, the the amount of fluoride or chloride ion present before calcining the solid oxide is from about 3 to about 25% by weight, and in another aspect, from about 4 to about 20% by weight. Once impregnated with halide, the halided oxide may be dried by any method known in the art including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina can have a pore volume greater than about 0.5 cc/g. In one aspect, the pore volume may be greater than about 0.8 cc/g, and in another aspect, the pore volume may be greater than about 1.0 cc/g. Further, the silica-alumina may have a surface area greater than about 100 $m^2/g$. In one aspect, the surface area is greater than about 250 $m^2/g$, and in another aspect, the surface area may be greater than about 350 $m^2/g$. Generally, the silica-alumina of this invention has an alumina content from about 5 to about 95%. In one aspect, the alumina content of the silica-alumina may be from about 5 to about 50%, and in another aspect, the alumina content of the silica-alumina may be from about 8% to about 30% alumina by weight. In yet another aspect, the solid oxide component can comprise alumina without silica and in another aspect, the solid oxide component can comprise silica without alumina.

The sulfated solid oxide comprises sulfate and a solid oxide component such as alumina or silica-alumina, in the form of a particulate solid. Optionally, the sulfated oxide is further treated with a metal ion such that the calcined sulfated oxide comprises a metal. In one aspect, the sulfated solid oxide comprises sulfate and alumina. In one aspect of this invention, the sulfated alumina is formed by a process wherein the alumina is treated with a sulfate source, for example selected from, but not limited to, sulfuric acid or a sulfate salt such as ammonium sulfate. In one aspect, this process may be performed by forming a slurry of the alumina in a suitable solvent such as alcohol or water, in which the desired concentration of the sulfating agent has been added. Suitable organic solvents include, but are not limited to, the one to three carbon alcohols because of their volatility and low surface tension.

In one aspect of the invention, the amount of sulfate ion present before calcining is generally from about 0.5 parts by weight to about 100 parts by weight sulfate ion to about 100 parts by weight solid oxide. In another aspect, the amount of sulfate ion present before calcining is generally from about 1 part by weight to about 50 parts by weight sulfate ion to about 100 parts by weight solid oxide, and in still another aspect, from about 5 parts by weight to about 30 parts by weight sulfate ion to about 100 parts by weight solid oxide. These weight ratios are based on the weight of the solid oxide before calcining. Once impregnated with sulfate, the sulfated oxide may be dried by any method known in the art including, but not limited to, suction filtration followed by evaporation, drying under vacuum, spray drying, and the like, although it is also possible to initiate the calcining step immediately.

In addition to being treated with an electron-withdrawing component such as halide or sulfate ion, the solid inorganic oxide of this invention may optionally be treated with a metal source, including metal salts or metal-containing compounds. In one aspect of the invention, these compounds may be added to or impregnated onto the solid oxide in solution form, and subsequently converted into the supported metal upon calcining. Accordingly, the solid inorganic oxide can further comprise a metal selected from zinc, titanium, nickel, vanadium, silver, copper, gallium, tin, tungsten, molybdenum, or a combination thereof. For example, zinc may be used to impregnate the solid oxide because it provides good catalyst activity and low cost. The solid oxide may be treated with metal salts or metal-containing compounds before, after, or at the same time that the solid oxide is treated with the electron-withdrawing anion.

Further, any method of impregnating the solid oxide material with a metal may be used. The method by which the oxide is contacted with a metal source, typically a salt or metal-containing compound, includes, but is not limited to, gelling, co-gelling, impregnation of one compound onto another, and the like. Following any contacting method, the contacted mixture of oxide compound, electron-withdrawing anion, and the metal ion is typically calcined. Alternatively, a solid oxide material, an electron-withdrawing anion source, and the metal salt or metal-containing compound are contacted and calcined simultaneously.

In another aspect, the first metallocene compound, the second metallocene compound, or a combination thereof, may be precontacted with an olefin monomer and an organoaluminum compound for a first period of time prior to contacting this mixture with the chemically-treated solid oxide. Once the precontacted mixture of the first metallocene compound, the second metallocene compound, or a combination thereof, olefin monomer, organoaluminum compound is contacted with the chemically-treated solid oxide, the composition further comprising the chemically-treated solid oxide is termed the "postcontacted" mixture. The postcontacted mixture may be allowed to remain in further contact for a second period of time prior to being charged into the reactor in which the polymerization process will be carried out.

Various processes to prepare solid oxide activator-supports that can be employed in this invention have been reported. For example, U.S. Pat. Nos. 6,107,230, 6,165,929, 6,294,494, 6,300,271, 6,316,553, 6,355,594, 6,376,415, 6,391,816, 6,395,666, 6,524,987, and 6,548,441, describe such methods, each of which is incorporated by reference herein, in its entirety.

The Organoaluminum Compound

In one aspect, this invention encompasses a catalyst composition comprising a first metallocene compound, a second metallocene compound, at least one chemically-treated solid oxide, and at least one organoaluminum compound. Organoaluminum compounds that can be used in this invention include, but are not limited to compound with the formula:

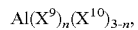
$$Al(X^9)_n(X^{10})_{3-n},$$

wherein ($X^9$) is a hydrocarbyl having from 1 to about 20 carbon atoms; ($X^{10}$) is selected from alkoxide or aryloxide, any one of which having from 1 to about 20 carbon atoms, halide, or hydride; and n is a number from 1 to 3, inclusive. In one aspect, ($X^9$) is an alkyl having from 1 to about 10 carbon atoms. Examples of ($X^9$) moieties include, but are not limited to, ethyl, propyl, n-butyl, sec-butyl, isobutyl, hexyl, and the like. In another aspect, ($X^{10}$) may be independently selected from fluoro or chloro. In yet another aspect, ($X^{10}$) may be chloro.

In the formula $Al(X^9)_n(X^{10})_{3-n}$, n is a number from 1 to 3 inclusive, and typically, n is 3. The value of n is not restricted to be an integer, therefore this formula includes sesquihalide compounds or other organoaluminum cluster compounds.

Generally, examples of organoaluminum compounds that can be used in this invention include, but are not limited to, trialkylaluminum compounds, dialkylaluminium halide compounds, dialkylaluminum alkoxide compounds, dialkylaluminum hydride compounds, and combinations thereof. Specific examples of organoaluminum compounds that are useful in this invention include, but are not limited to: trimethylaluminum (TMA); triethylaluminum (TEA); tripropylaluminum; diethylaluminum ethoxide; tributylaluminum; disobutylaluminum hydride; triisobutylaluminum; and diethylaluminum chloride.

In one aspect, the present invention comprises precontacting the ansa-metallocene with at least one organoaluminum compound and an olefin monomer to form a precontacted mixture, prior to contact this precontacted mixture with the solid oxide activator-support to form the active catalyst. When the catalyst composition is prepared in this manner, typically, though not necessarily, a portion of the organoaluminum compound is added to the precontacted mixture and another portion of the organoaluminum compound is added to the postcontacted mixture prepared when the precontacted mixture is contacted with the solid oxide activator. However, all the organoaluminum compound may be used to prepare the catalyst in either the precontacting or postcontacting step. Alternatively, all the catalyst components may be contacted in a single step.

Further, more than one organoaluminum compounds may be used, in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed, regardless of whether a single organoaluminum compound is used, or more than one organoaluminum compound. In another aspect, triethylaluminum (TEA) or triisobutylaluminum are typical organoaluminum compounds used in this invention.

The Optional Aluminoxane Cocatalyst

In one aspect, this invention encompasses a catalyst composition comprising a first metallocene compound, a second metallocene compound, at least one chemically-treated solid oxide, and at least one organoaluminum compound. In another aspect, the present invention provides a catalyst composition comprising an optional aluminoxane cocatalyst in addition to these other components.

Aluminoxanes are also referred to as poly(hydrocarbyl aluminum oxides) or organoaluminoxanes. The other catalyst components are typically contacted with the aluminoxane in a saturated hydrocarbon compound solvent, though any solvent which is substantially inert to the reactants, intermediates, and products of the activation step can be used. The catalyst composition formed in this manner may be collected by methods known to those of skill in the art, including but not limited to filtration, or the catalyst composition may be introduced into the polymerization reactor without being isolated.

The aluminoxane compound of this invention is an oligomeric aluminum compound, wherein the aluminoxane compound can comprise linear structures, cyclic, or cage structures, or typically mixtures of all three. Cyclic aluminoxane compounds having the formula:

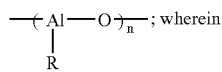

R is a linear or branched alkyl having from 1 to 10 carbon atoms, and n is an integer from 3 to about 10 are encompassed by this invention. The (AlRO)$_n$ moiety shown here also constitutes the repeating unit in a linear aluminoxane. Thus, linear aluminoxanes having the formula:

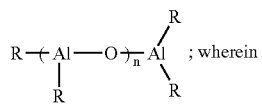

R is a linear or branched alkyl having from 1 to 10 carbon atoms, and n is an integer from 1 to about 50, are also encompassed by this invention.

Further, aluminoxanes may also have cage structures of the formula R$^t_{5m+\alpha}$R$^b_{m-\alpha}$Al$_{4m}$O$_{3m}$, wherein m is 3 or 4 and $\alpha$ is =n$_{Al(3)}$−n$_{O(2)}$+n$_{O(4)}$; wherein n$_{Al(3)}$ is the number of three coordinate aluminum atoms, n$_{O(2)}$ is the number of two coordinate oxygen atoms, n$_{O(4)}$ is the number of 4 coordinate oxygen atoms, R$^t$ represents a terminal alkyl group, and R$^b$ represents a bridging alkyl group; wherein R is a linear or branched alkyl having from 1 to 10 carbon atoms.

Thus, aluminoxanes that can serve as optional cocatalysts in this invention are generally represented by formulas such as (R—Al—O)$_n$, R(R—Al—O)$_n$AlR$_2$, and the like, wherein the R group is typically a linear or branched C$_1$–C$_6$ alkyl such as methyl, ethyl, propyl, butyl, pentyl, or hexyl wherein n typically represents an integer from 1 to about 50. In one embodiment, the aluminoxane compounds of this invention include, but are not limited to, methylaluminoxane, ethylaluminoxane, n-propylaluminoxane, iso-propylaluminoxane, n-butylaluminoxane, t-butyl-aluminoxane, sec-butylaluminoxane, iso-butylaluminoxane, 1-pentylaluminoxane, 2-pentylaluminoxane, 3-pentylaluminoxane, iso-pentylaluminoxane, neopentylaluminoxane, or combinations thereof.

While organoaluminoxanes with different types of R groups are encompassed by the present invention, methyl aluminoxane (MAO), ethyl aluminoxane, or isobutyl aluminoxane are typical optional cocatalysts used in the catalyst compositions of this invention. These aluminoxanes are prepared from trimethylaluminum, triethylaluminum, or triisobutylaluminum, respectively, and are sometimes referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as disclosed in U.S. Pat. No. 4,794,096, which is herein incorporated by reference in its entirety.

The present invention contemplates many values of n in the aluminoxane formulas (R—Al—O)$_n$ and R(R—Al—O)$_n$AlR$_2$, and preferably n is at least about 3. However, depending upon how the organoaluminoxane is prepared, stored, and used, the value of n may be variable within a single sample of aluminoxane, and such a combination of organoaluminoxanes are comprised in the methods and compositions of the present invention.

In preparing the catalyst composition of this invention comprising an optional aluminoxane, the molar ratio of the aluminum in the aluminoxane to the metallocene in the composition is usually from about 1:10 to about 100,000:1. In one another aspect, the molar ratio of the aluminum in the aluminoxane to the metallocene in the composition is usually from about 5:1 to about 15,000:1. The amount of optional aluminoxane added to a polymerization zone is an amount within a range of about 0.01 mg/L to about 1000 mg/L, from about 0.1 mg/L to about 100 mg/L, or from about 1 mg/L to abut 50 mg/L.

Organoaluminoxanes can be prepared by various procedures which are well known in the art. Examples of organoaluminoxane preparations are disclosed in U.S. Pat. Nos. 3,242,099 and 4,808,561, each of which is incorporated by reference herein, in its entirety. One example of how an aluminoxane may be prepared is as follows. Water which is dissolved in an inert organic solvent may be reacted with an aluminum alkyl compound such as AlR$_3$ to form the desired organoaluminoxane compound. While not intending to be bound by this statement, it is believed that this synthetic method can afford a mixture of both linear and cyclic (R—Al—O)$_q$ aluminoxane species, both of which are encompassed by this invention. Alternatively, organoaluminoxanes may be prepared by reacting an aluminum alkyl compound such as AlR$_3$ with a hydrated salt, such as hydrated copper sulfate, in an inert organic solvent.

The Optional Organozinc Cocatalysts

In one aspect, this invention encompasses a catalyst composition comprising a first metallocene compound, a second metallocene compound, at least one chemically-treated solid oxide, and at least one organoaluminum compound. In another aspect, the present invention provides a catalyst composition comprising an optional organozinc cocatalyst in addition to these other components.

In one aspect, the catalyst composition further comprises an optional organozinc cocatalyst, selected from a compound with the following formula:

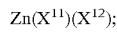

$Zn(X^{11})(X^{12})$;

wherein ($X^{11}$) is a hydrocarbyl having from 1 to about 20 carbon atoms; ($X^{12}$) is selected from a hydrocarbyl, an alkoxide or an aryloxide having from 1 to about 20 carbon atoms, halide, or hydride. In another aspect, the optional organozinc cocatalyst is selected from dimethylzinc, diethylzinc, dipropylzinc, dibutylzinc, dineopentylzinc, di(trimethylsilylmethyl)zinc, and the like, including any combinations thereof.

The Optional Organoboron Cocatalyst

In one aspect, this invention encompasses a catalyst composition comprising a first metallocene compound, a second metallocene compound, at least one chemically-treated solid oxide, and at least one organoaluminum compound. In another aspect, the present invention provides a catalyst composition comprising an optional organoboron cocatalyst in addition to these other components.

In one aspect, the organoboron compound comprises neutral boron compounds, borate salts, or combinations thereof. For example, the organoboron compounds of this invention can comprise a fluoroorgano boron compound, a fluoroorgano borate compound, or a combination thereof. Any fluoroorgano boron or fluoroorgano borate compound known in the art can be utilized. The term fluoroorgano boron compounds has its usual meaning to refer to neutral compounds of the form $BY_3$. The term fluoroorgano borate compound also has its usual meaning to refer to the monoanionic salts of a fluoroorgano boron compound of the form $[cation]^+[BY_4]^-$, where Y represents a fluorinated organic group. For convenience, fluoroorgano boron and fluoroorgano borate compounds are typically referred to collectively by organoboron compounds, or by either name as the context requires.

Examples of fluoroorgano borate compounds that can be used as cocatalysts in the present invention include, but are not limited to, fluorinated aryl borates such as, N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, and the like, including mixtures thereof. Examples of fluoroorgano boron compounds that can be used as cocatalysts in the present invention include, but are not limited to, tris(pentafluorophenyl)boron, tris[3,5-bis(trifluoromethyl)phenyl]boron, and the like, including mixtures thereof.

Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919,983, which is incorporated herein by reference in its entirety.

Generally, any amount of organoboron compound can be utilized in this invention. In one aspect, the molar ratio of the organoboron compound to the total of the first and second metallocene compounds in the composition is from about 0.1:1 to about 10:1. Typically, the amount of the fluoroorgano boron or fluoroorgano borate compound used as a cocatalyst for the metallocenes is in a range of from about 0.5 mole to about 10 moles of boron compound per total mole of first and second metallocene compounds combined. In one aspect, the amount of fluoroorgano boron or fluoroorgano borate compound used as a cocatalyst for the metallocene is in a range of from about 0.8 mole to about 5 moles of boron compound per total moles of first and second metallocene compound.

The Optional Ionizing Ionic Compound Cocatalyst

In one aspect, this invention encompasses a catalyst composition comprising a first metallocene compound, a second metallocene compound, at least one chemically-treated solid oxide, and at least one organoaluminum compound. In another aspect, the present invention provides a catalyst composition comprising an optional ionizing ionic compound cocatalyst in addition to these other components. Examples of ionizing ionic compound are disclosed in U.S. Pat. Nos. 5,576,259 and 5,807,938, each of which is incorporated herein by reference, in its entirety.

An ionizing ionic compound is an ionic compound which can function to enhance the activity of the catalyst composition. While not bound by theory, it is believed that the ionizing ionic compound may be capable of reacting with the first, second, or both metallocene compounds and converting the metallocenes into a cationic metallocene compounds. Again, while not intending to be bound by theory, it is believed that the ionizing ionic compound may function as an ionizing compound by completely or partially extracting an anionic ligand, possibly a non-$\eta^5$-alkadienyl ligand such as ($X^3$), ($X^4$), ($X^7$), or ($X^8$) from the metallocenes. However, the ionizing ionic compound is an activator regardless of whether it is ionizes the metallocenes, abstracts an ($X^3$), ($X^4$), ($X^7$), or ($X^8$) ligand in a fashion as to form an ion pair, weakens the metal-($X^3$), metal-($X^4$), metal-($X^7$), or metal-($X^8$) bond in the metallocenes, simply coordinates to an ($X^3$), ($X^4$), ($X^7$), or ($X^8$) ligand, or any other mechanisms by which activation may occur.

Further, it is not necessary that the ionizing ionic compound activate the metallocenes only. The activation function of the ionizing ionic compound is evident in the enhanced activity of catalyst composition as a whole, as compared to a catalyst composition containing catalyst composition that does not comprise any ionizing ionic compound. It is also not necessary that the ionizing ionic compound activate both first and second metallocene compounds, nor is it necessary that it activate the first metallocene compound and the second metallocene compounds to the same extent.

Examples of ionizing ionic compounds include, but are not limited to, the following compounds: tri(n-butyl)ammonium tetrakis(p-tolyl)borate, tri(n-butyl)ammonium tetrakis(m-tolyl)borate, tri(n-butyl)ammonium tetrakis(2,4-dimethyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis (trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl) borate, triphenylcarbenium tetrakis(2,4-dimethylphenyl)borate, triphenylcarbenium tetrakis(3,5-dimethylphenyl) borate, triphenylcarbenium tetrakis[3,5-bis(trifluoromethyl) phenyl]borate, triphenylcarbenium tetrakis (pentafluorophenyl)borate, tropylium tetrakis(p-tolyl) borate, tropylium tetrakis(m-tolyl)borate, tropylium tetrakis (2,4-dimethylphenyl)borate, tropylium tetrakis(3,5-dimethylphenyl)borate, tropylium tetrakis[3,5-bis (trifluoromethyl)phenyl]borate, tropylium tetrakis (pentafluorophenyl)borate, lithium tetrakis (pentafluorophenyl)borate, lithium tetrakis(phenyl)borate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetrakis (phenyl)borate, sodium tetrakis(p-tolyl)borate, sodium tetrakis(m-tolyl)borate, sodium tetrakis(2,4-dimethylphenyl) borate, sodium tetrakis(3,5-dimethylphenyl)borate, sodium tetrafluoroborate, potassium tetrakis(pentafluorophenyl)borate, potassium tetrakis(phenyl)borate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, tri(n-butyl)ammonium tetrakis(p-tolyl)aluminate, tri(n-butyl)ammonium tetrakis(m-tolyl)aluminate, tri(n-butyl)ammonium tetrakis(2,4-dimethyl)aluminate, tri(n-butyl)ammonium tetrakis(3,5-dimethylphenyl)aluminate, tri(n-butyl)ammonium tetrakis(pentafluorophenyl)aluminate, N,N-dimethylanilinium tetrakis(p-tolyl)aluminate, N,N-dimethylanilinium tetrakis(m-tolyl)aluminate, N,N-dimethylanilinium tetrakis (2,4-dimethylphenyl)aluminate, N,N-dimethylanilinium tetrakis(3,5-dimethylphenyl)aluminate, N,N-dimethylanilinium tetrakis(pentafluorophenyl)aluminate, triphenylcarbenium tetrakis(p-tolyl)aluminate, triphenylcarbenium tetrakis(m-tolyl)aluminate, triphenylcarbenium tetrakis(2,4-dimethylphenyl)aluminate, triphenylcarbenium tetrakis(3,5-dimethylphenyl)aluminate, triphenylcarbenium tetrakis(pentafluorophenyl)aluminate, tropylium tetrakis(p-tolyl)aluminate, tropylium tetrakis(m-tolyl)aluminate, tropylium tetrakis(2,4-dimethylphenyl)aluminate, tropylium tetrakis(3,5-dimethylphenyl)aluminate, tropylium tetrakis (pentafluorophenyl)aluminate, lithium tetrakis(pentafluorophenyl)aluminate, lithium tetrakis(phenyl)aluminate, lithium tetrakis(p-tolyl)aluminate, lithium tetrakis(m-tolyl) aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetrakis(phenyl)aluminate, sodium tetrakis (p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetrakis(phenyl)aluminate, potassium tetrakis(p-tolyl)aluminate, potassium tetrakis(m-tolyl)aluminate, potassium tetrakis(2,4-dimethylphenyl)aluminate, potassium tetrakis (3,5-dimethylphenyl)aluminate, potassium tetrafluoroaluminate, However, the ionizing ionic compound is not limited thereto in the present invention.

The Olefin Monomer

In one aspect, unsaturated reactants that are useful in the polymerization processes with catalyst compositions and processes of this invention typically include olefin compounds having from about 2 to about 30 carbon atoms per molecule and having at least one olefinic double bond. This invention encompasses homopolymerization processes using a single olefin such as ethylene or propylene, as well as copolymerization reactions with at least one different olefinic compound. In one aspect of a copolymerization reaction of ethylene, copolymers of ethylene comprise a major amount of ethylene (>50 mole percent) and a minor amount of comonomer <50 mole percent), though this is not a requirement. The comonomers that can be copolymerized with ethylene should have from three to about 20 carbon atoms in their molecular chain.

Acyclic, cyclic, polycyclic, terminal ($\alpha$), internal, linear, branched, substituted, unsubstituted, functionalized, and non-functionalized olefins may be employed in this invention. For example, typical unsaturated compounds that may be polymerized with the catalysts of this invention include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and mixtures of any two or more thereof. Cyclic and bicyclic olefins, including but not limited to, cyclopentene, cyclohexene, norbornylene, norbornadiene, and the like, may also be polymerized as described above.

In one aspect, when a copolymer is desired, the monomer ethylene may be copolymerized with a comonomer. In another aspect, examples of the comonomer include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, or the five normal decenes. In another aspect, the comonomer may be selected from 1-butene, 1-pentene, 1-hexene, 1-octene, 1-decene, or styrene.

In one aspect, the amount of comonomer introduced into a reactor zone to produce the copolymer is generally from about 0.01 to about 10 weight percent comonomer based on the total weight of the monomer and comonomer. In another aspect, the amount of comonomer introduced into a reactor zone is from about 0.01 to about 5 weight percent comonomer, and in still another aspect, from about 0.1 to about 4 weight percent comonomer based on the total weight of the monomer and comonomer. Alternatively, an amount sufficient to give the above described concentrations by weight, in the copolymer produced can be used.

While not intending to be bound by this theory, in the event that branched, substituted, or functionalized olefins are used as reactants, it is believed that steric hindrance may impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. In one aspect, at least one reactant for the catalyst compositions of this invention is ethylene, so the polymerizations are either homopolymerizations or copolymerizations with a different acyclic, cyclic, terminal, internal, linear, branched, substituted, or unsubstituted olefin. In addition, the catalyst compositions of this invention may be used in polymerization of diolefin compounds, including but are not limited to, 1,3-butadiene, isoprene, 1,4-pentadiene, and 1,5-hexadiene.

Preparation of the Catalyst Composition

In one aspect, this invention encompasses a catalyst composition comprising the contact product of a first metallocene compound, a second metallocene compound, at least one chemically-treated solid oxide, and at least one organoaluminum compound. In another aspect, this invention encompasses methods of making the catalyst composition encompassing contacting a first metallocene compound, a second metallocene compound, at least one chemically-treated solid oxide, and at least one organoaluminum compound, in any order. In this aspect, an active catalyst composition is obtained with the catalyst components are contacted in any sequence or order.

In another aspect of this invention, the first metallocene compound, the second metallocene compound, or both can optionally be precontacted with an olefinic monomer, not necessarily the olefin monomer to be polymerized, and an organoaluminum cocatalyst for a first period of time prior to contacting this precontacted mixture with the chemically treated solid oxide. In one aspect, the first period of time for contact, the precontact time, between the metallocene compound or compounds, the olefinic monomer, and the organoaluminum compound typically range from time about 0.1 hour to about 24 hours, and from about 0.1 to about 1 hour is typical. Precontact times from about 10 minutes to about 30 minutes are also typical.

In yet another aspect of this invention, once the precontacted mixture of the first, second, or both metallocene compounds, olefin monomer, and organoaluminum cocatalyst is contacted with the chemically treated solid oxide, this composition (further comprising the chemically treated solid oxide) is termed the postcontacted mixture. Typically, the postcontacted mixture may optionally be allowed to remain in contact for a second period of time, the postcontact time, prior to being initiating the polymerization process. In one aspect, postcontact times between the precontacted mixture and the chemically treated solid oxide may range in time from about 0.1 hour to about 24 hours. In another aspect, for example, postcontact times from about 0.1 hour to about 1 hour are typical.

In one aspect, the precontacting, the postcontacting step, or both may increase the productivity of the polymer as compared to the same catalyst composition that is prepared without precontacting or postcontacting. However, neither a precontacting step nor a postcontacting step are required for this invention.

The postcontacted mixture may be heated at a temperature and for a duration sufficient to allow adsorption, impregnation, or interaction of precontacted mixture and the chemically treated solid oxide, such that a portion of the components of the precontacted mixture is immobilized, adsorbed, or deposited thereon. For example, the postcontacted mixture may be heated from between about 0° F. to about 150° F. Temperatures between about 40° F. to about 95° F. are typical if the mixture is heated at all.

In one aspect, the molar ratio of the total moles of first and second metallocene compounds combined to the organoaluminum compound may be from about 1:1 to about 1:10,000. In another aspect, the molar ratio of the total moles of first and second metallocene compounds combined to the organoaluminum compound may be from about 1:1 to about 1:1,000, and in another aspect, from about 1:1 to about 1:100. These molar ratios reflect the ratio of the total moles of first and second metallocene compounds combined to the total amount of organoaluminum compound in both the precontacted mixture and the postcontacted mixture combined.

When a precontacting step is used, generally, the molar ratio of olefin monomer to total moles of first and second metallocene compounds combined in the precontacted mixture may be from about 1:10 to about 100,000:1, or from about 10:1 to about 1,000:1.

In another aspect of this invention, the weight ratio of the chemically treated solid oxide to the organoaluminum compound may range from about 1:5 to about 1,000:1. In another aspect, the weight ratio of the chemically treated solid oxide to the organoaluminum compound may be from about 1:3 to about 100:1, and in yet another aspect, from about 1:1 to about 50:1.

In a further aspect of this invention, the weight ratio of the first and second metallocene compounds combined to the chemically treated solid oxide may be from about 1:1 to about 1:1,000,000. In yet another aspect of this invention, the weight ratio of the total moles of first and second metallocene compounds combined to the chemically treated solid oxide which may be from about 1:10 to about 1:100,00, and in another aspect, from about 1:20 to about 1:1000.

One aspect of this invention is that aluminoxane is not required to form the catalyst composition disclosed herein, a feature that allows lower polymer production costs. Accordingly, in one aspect, the present invention can use $AlR_3$-type organoaluminum compounds and a chemically treated solid oxide in the absence of aluminoxanes. While not intending to be bound by theory, it is believed that the organoaluminum compounds likely does not activate the metallocene catalyst in the same manner as an organoaluminoxane.

Additionally, no expensive borate compounds or $MgCl_2$ are required to form the catalyst composition of this invention, although aluminoxanes, organoboron compounds, ionizing ionic compounds, organozinc compounds, $MgCl_2$, or any combination thereof can optionally be used in the catalyst composition of this invention. Further, in one aspect, cocatalysts such as aluminoxanes, organoboron compounds, ionizing ionic compounds, organozinc compounds, or any combination thereof may be used as cocatalysts with the first and second metallocene compounds, either in the presence or in the absence of the chemically treated solid oxide, and either in the presence or in the absence of the organoaluminum compounds.

In one aspect, the catalyst activity of the catalyst of this invention is typically greater than or equal to about 100 grams polyethylene per gram of chemically treated solid oxide per hour (abbreviated gP/(gCTSO·hr)). In another aspect, the catalyst of this invention may be characterized by an activity of greater than or equal to about 250 gP/(gCTSO·hr), and in another aspect, an activity of greater than or equal to about 500 gP/(gCTSO·hr). In still another aspect, the catalyst of this invention may be characterized by an activity of greater than or equal to about 1000 gP/(gCTSO·hr), and in another aspect, an activity of greater than or equal to about 2000 gP/(gCTSO·hr). This activity is measured under slurry polymerization conditions, using isobutane as the diluent, and with a polymerization temperature of about 90° C., and an ethylene pressure of about 550 psig. The reactor should have substantially no indication of any wall scale, coating or other forms of fouling upon making these measurements.

Utility of the Catalyst Composition in Polymerization Processes

Table 1 provides some non-limiting examples of catalysts and preparative conditions for the catalysts of the present invention. Polymerizations using the catalysts of this invention can be carried out in any manner known in the art. Such polymerization processes include, but are not limited to slurry polymerizations, gas phase polymerizations, solution polymerizations, and the like, including multi-reactor combinations thereof. Thus, any polymerization zone known in the art to produce ethylene-containing polymers can be utilized. For example, a stirred reactor can be utilized for a batch process, or the reaction can be carried out continuously in a loop reactor or in a continuous stirred reactor.

After catalyst activation, a catalyst composition is used to homopolymerize ethylene, or copolymerize ethylene with a comonomer. A typical polymerization method is a slurry polymerization process (also known as the particle form process), which are well known in the art and are disclosed, for example in U.S. Pat. No. 3,248,179, which is incorporated by reference herein, in its entirety. Other polymerization methods of the present invention for slurry processes are those employing a loop reactor of the type disclosed in U.S. Pat. No. 3,248,179, and those utilized in a plurality of stirred reactors either in series, parallel, or combinations thereof, wherein the reaction conditions are different in the different reactors, which is also incorporated by reference herein, in its entirety.

Polymerization temperature for this invention typically ranges from about 60° C. to about 280° C., with a polymerization reaction temperature more typically operating between about 70° C. to about 110° C.

The polymerization reaction typically occurs in an inert atmosphere, that is, in atmosphere substantial free of oxygen and under substantially anhydrous conditions, thus, in the absence of water as the reaction begins. Therefore a dry, inert atmosphere, for example, dry nitrogen or dry argon, is typically employed in the polymerization reactor.

The polymerization reaction pressure can be any pressure that does not adversely affect the polymerization reaction, and it typically conducted at a pressure higher than the pretreatment pressures. Generally, polymerization pressures are from about atmospheric pressure to about 1000 psig, more typically from about 50 psig to about 800 psig. Further, hydrogen can be used in the polymerization process of this invention to control polymer molecular weight.

Polymerizations using the catalysts of this invention can be carried out in any manner known in the art. Such processes that can polymerize monomers into polymers include, but are not limited to slurry polymerizations, gas phase polymerizations, solution polymerizations, and multi-reactor combinations thereof. Thus, any polymerization zone known in the art to produce olefin-containing polymers can be utilized. For example, a stirred reactor can be utilized for a batch process, or the reaction can be carried out continuously in a loop reactor or in a continuous stirred reactor. Typically, the polymerizations disclosed herein are carried out using a slurry polymerization process in a loop reaction zone. Suitable diluents used in slurry polymerization are well known in the art and include hydrocarbons which are liquid under reaction conditions. The term "diluent" as used in this disclosure does not necessarily mean an inert material, as this term is meant to include compounds and compositions that may contribute to polymerization process. Examples of hydrocarbons that can be used as diluents include, but are not limited to, cyclohexane, isobutane, n-butane, propane, n-pentane, isopentane, neopentane, and n-hexane. Typically, isobutane is used as the diluent in a slurry polymerization. Examples of this technology are found in U.S. Pat. Nos. 4,424,341; 4,501,885; 4,613,484; 4,737,280; and 5,597,892; each of which is incorporated by reference herein, in its entirety.

For purposes of the invention, the term polymerization reactor includes any polymerization reactor or polymerization reactor system known in the art that is capable of polymerizing olefin monomers to produce homopolymers or copolymers of the present invention. Such reactors can comprise slurry reactors, gas-phase reactors, solution reactors, or any combination thereof. Gas phase reactors can comprise fluidized bed reactors or tubular reactors. Slurry reactors can comprise vertical loops or horizontal loops. Solution reactors can comprise stirred tank or autoclave reactors.

Polymerization reactors suitable for the present invention can comprise at least one raw material feed system, at least one feed system for catalyst or catalyst components, at least one reactor system, at least one polymer recovery system or any suitable combination thereof. Suitable reactors for the present invention can further comprise any one, or combination of, a catalyst storage system, an extrusion system, a cooling system, a diluent recycling system, or a control system. Such reactors can comprise continuous take-off and direct recycling of catalyst, diluent, and polymer. Generally, continuous processes can comprise the continuous introduction of a monomer, a catalyst, and a diluent into a polymerization reactor and the continuous removal from this reactor of a suspension comprising polymer particles and the diluent.

Polymerization reactor systems of the present invention can comprise one type of reactor per system or multiple reactor systems comprising two or more types of reactors operated in parallel or in series. Multiple reactor systems can comprise reactors connected together to perform polymerization, or reactors that are not connected. The polymer can be polymerized in one reactor under one set of conditions, and then the polymer can be transferred to a second reactor for polymerization under a different set of conditions.

In one aspect of the invention, the polymerization reactor system can comprise at least one loop slurry reactor. Such reactors are known in the art and can comprise vertical or horizontal loops. Such loops can comprise a single loop or a series of loops. Multiple loop reactors can comprise both vertical and horizontal loops. The slurry polymerization can be performed in an organic solvent that can disperse the catalyst and polymer. Examples of suitable solvents include butane, hexane, cyclohexane, octane, and isobutane. Monomer, solvent, catalyst and any comonomer are continuously fed to a loop reactor where polymerization occurs. Polymerization can occur at low temperatures and pressures. Reactor effluent can be flashed to remove the solid resin.

In yet another aspect of this invention, the polymerization reactor can comprise at least one gas phase reactor. Such systems can employ a continuous recycle stream containing one or more monomers continuously cycled through the fluidized bed in the presence of the catalyst under polymerization conditions. The recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone.

In still another aspect of the invention, the polymerization reactor can comprise a tubular reactor. Tubular reactors can make polymers by free radical initiation, or by employing the catalysts typically used for coordination polymerization.

Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams are intermixed for polymerization. Heat and pressure can be employed appropriately to obtain optimal polymerization reaction conditions.

In another aspect of the invention, the polymerization reactor can comprise a solution polymerization reactor. During solution polymerization, the monomer is contacted with the catalyst composition by suitable stirring or other means. A carrier comprising an inert organic diluent or excess monomer can be employed. If desired, the monomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed during polymerization to obtain better temperature control and to maintain uniform polymerization mixtures throughout the polymerization zone. Adequate means are utilized for dissipating the exothermic heat of polymerization. The polymerization can be effected in a batch manner, or in a continuous manner. The reactor can comprise a series of at least one separator that employs high pressure and low pressure to separate the desired polymer.

In a further aspect of the invention, the polymerization reactor system can comprise the combination of two or more reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactors. Alternatively, polymerization in multiple reactors can include the manual transfer of polymer from one reactor to subsequent reactors for continued polymerization. Such reactors can include any combination including, but not limited to, multiple loop reactors, multiple gas reactors, a combination of loop and gas reactors, a combination of autoclave reactors or solution reactors with gas or loop reactors, multiple solution reactors, or multiple autoclave reactors.

After the polymers are produced, they can be formed into various articles, including but not limited to, household containers, utensils, film products, drums, fuel tanks, pipes, geomembranes, and liners. Various processes can form these articles. Usually, additives and modifiers are added to the polymer in order to provide desired effects. By using the invention described herein, articles can likely be produced at a lower cost, while maintaining most or all of the unique properties of polymers produced with metallocene catalysts.

Resin Preparation and Properties of the Present Invention

Table 1 provides some non-limiting examples of preparation conditions for the catalysts of the present invention. Table 2 provides some non-limiting examples of the catalysts, polymerization conditions, and resulting resin properties of this invention. Table 3 provides some non-limiting examples of the catalysts, polymerization conditions, and resulting resin properties of this invention. Tables 4 through 6, FIGS. 1 through 14, and the Examples provide data for the polyethylene resins produced using the catalyst compositions of this invention, and for polyethylene resins produced using standard or comparative catalyst compositions.

Example 7 provides a description of the resin synthesis. For the resin evaluation data presented in the Tables 4–6 and the Examples, four separate catalyst systems were employed. As shown in Tables 1 and 2, a single metallocene catalyst system was evaluated, and resins from this catalyst are designated with the prefix "SC" to denote a single catalyst. Tables 1 and 2 also indicate that the next three catalysts were dual-metallocene catalysts, using different pairs of metallocene catalysts which were employed by combining the catalysts in desired ratios in the reactor prior to polymerization. The resins from these dual-metallocene systems are designated with the prefixes "DC-A", "DC-B" and "DC-C" to denote dual-metallocene systems and distinguish the three systems. Further, the resins themselves are labeled numerically thereafter for ease of identification, for example, SC-1, SC-2, DC-A-1, DC-B-1, and so forth. A commercially available HP-LDPE, PE4517, from Chevron Phillips Chemical Co. LP, was used as a control for all the trials.

Resins from the single metallocene catalyst were all found to exhibit generally higher extruder pressures and motor load as compared to PE4517 at equivalent melt index values. In contrast, the dual-metallocene catalyst resins exhibited considerably better shear-thinning behavior than the single metallocene catalyst resins, resulting in extruder pressures and motor loads comparable to the PE4517 resin. The neck-in and maximum attainable line speed for processing the resins of this invention showed varied responses. The single catalyst resins exhibited higher neck-in and poorer draw-down as compared to PE4517, however both the neck-in and draw-down behaviors improved considerably with the dual-metallocene resins. One catalyst pair in particular, DC-C-2, generated resins that had equivalent or lower extruder pressures and motor loads and neck-in at both 300 ft/min and 900 ft/min line speeds that were just slightly higher than those of PE4517. In general, the maximum lines speeds for these particular resins were lower compared to PE4517, but still high enough (~1000 ft/min) to generally be considered commercially viable. The Elmendorf tear, Spencer impact, burst adhesion and sealing (hot tack and ultimate seal strength) properties for all the experimental resins were observed to be substantially equivalent or better than these properties of the PE4517 resin.

As disclosed herein, it was observed that the extruder pressure and motor load characteristics were, generally, substantially a function of an appropriate high shear viscosity alone. For the resins of this invention, the neck-in behavior was observed to depend primarily on the zero shear viscosity or melt elasticity. In addition, the high molecular mass fraction or component was observed to influence the neck-in behavior. It was further noted that the processing extrusion coating performance of these resins at elevated temperatures could be reasonably predicted from rheology data at much lower temperatures, in agreement with recent published observations. The draw-down (maximum line speed) was seen to depend weakly on the low shear viscosity, although the reasons for this are not well understood. The PE4517 resin, it was observed, did not fall on the same trendlines for neck-in and draw-down behavior as the resins prepared according to the present invention. While not intending to be bound by theory, this observation was attributed to differences in both the degree of long chain branching as well as the long chain branching architecture of these resins.

Comparison of Single Metallocene and Dual-Metallocene Catalyst Resins

Example 8 reports the results obtained from the single metallocene catalysts, and the properties of the resulting resins, which are used as a comparative baseline for the dual-metallocene catalysts and the commercially available HP-LDPE control, labeled as PE4517 (from Chevron Phillips Chemical Co. LP). As seen in FIGS. 1–4, all the single catalyst-produced resins labeled SC-1 through SC-5 generally exhibited higher extruder pressures, motor loads, and neck-in as compared to the commercially available HP-LDPE control labeled as PE4517. Thus, while SC-1 through SC-3 were similar to PE4517 in MI, they exhibited almost twice the extrusion pressure and 50% higher motor load as compared to the PE4517 resin. The neck-in of these resins was higher at 300 ft/min line speed and exhibited rupture prior to reaching the 900 ft/min line speeds. The resins SC-4 and SC-5 were higher in MI as compared to PE4517 and as a result their extruder pressures and motor loads were closer to that of PE4517. However, they exhibited higher neck-in at 300 ft/min. Further, SC-4 also exhibited rupture prior to reaching 900 ft/min, whereas SC-5 was able to be drawn down to 900 ft/min line speed as may be seen from FIG. 4. At this higher line speed, however, it had nearly three times the neck-in of PE4517.

Example 8 provides a detailed analysis of the SC catalyst resins. In summary, these results indicated that these particular single catalyst resins did not provide the optimum balance of extrusion and neck-in characteristics that were comparable to the PE4517 resin as desired.

Figure 2:
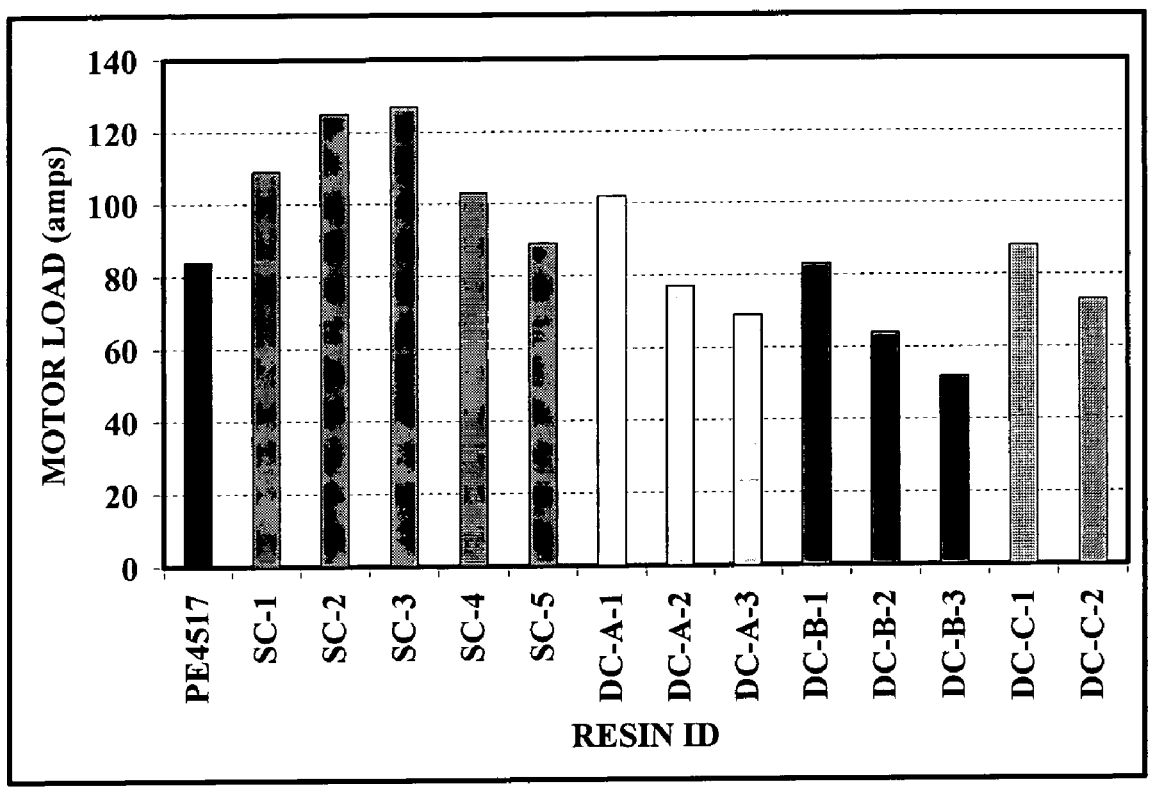
FIG. 2 provides comparative extruder motor load data for the resins of the present invention.
Figure 3:
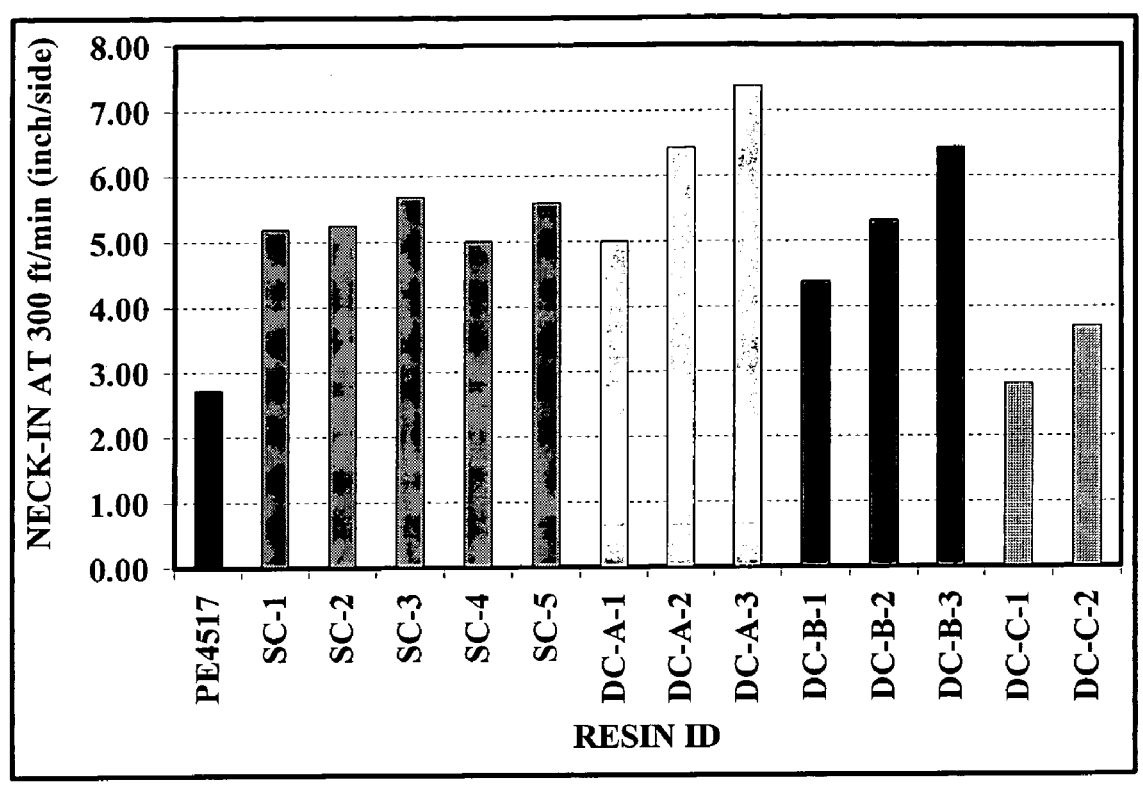
FIG. 3 illustrates comparative data for neck-in (inches per side) at 300 ft/min line speed for the resins of the present invention.
Figure 4:
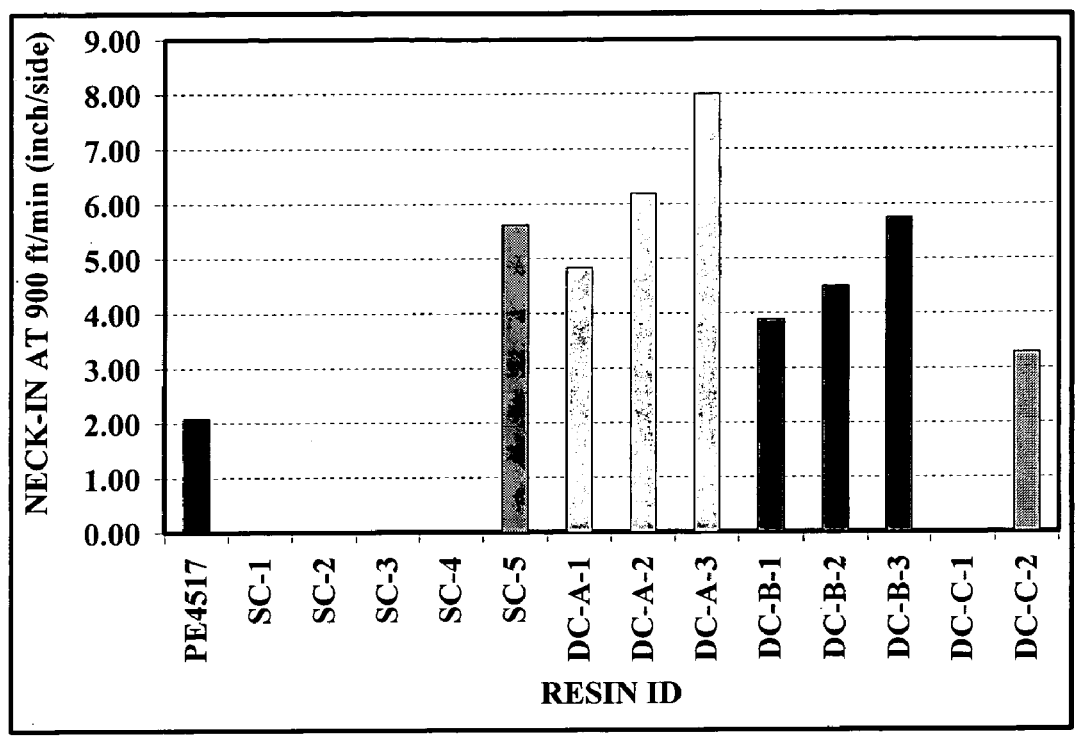
FIG. 4 illustrates comparative data for neck-in (inches per side) at 900 ft/min line speed for the resins of the present invention.

Example 9 and Tables 4–6 provide the results obtained from three different dual-metallocene catalyst pairs, and the properties of the resulting resins, and compares the results obtained to the HP-LDPE control resin PE4517. These dual-metallocene resins demonstrate, among other things, the broadening of the molecular weight distribution and enhancement of the shear-thinning response, as compared to the resins produced from the single metallocene catalysts. The dual-metallocene resins, while showing some differences among them, were generally better in overall performance as compared to the single catalyst resins. For example, comparing the data for the dual-metallocene resins DC-A-1, DC-B-1 and DC-C-1 with that of the single-metallocene resins SC-1, SC-2 and SC-3, which are closest in MI to one another, illustrate these differences. Generally, the dual-metallocene catalyst resins exhibited lower extruder head pressures, lower motor loads, lower neck-in, and better draw-down as seen in FIGS. 1–4, respectively. The performance of the two resins from system C, namely the DC-C-1 and DC-C-2 resins, was especially noteworthy in comparison to the HP-LDPE control PE4517 resin. Resin DC-C-1, which is nominally the same MI as PE4517, exhibits very comparable, if not better, extruder pressure and motor load characteristics and comparable neck-in at 300 ft/min to the PE4517, as illustrated in FIG. 3. However, the DC-C-1 resin did not have good draw-down and tore off at 600 ft/min (see Table 4). Resin DC-C-2, which is higher in MI (~12 MI) than PE4517, exhibited clearly lower extruder pressure, lower motor load, and quite comparable neck-in at both 300 ft/min and 900 ft/min line speeds as compared to the PE4517 resin.

Extrusion Coating Properties

Extrusion coating evaluations for the resins of this invention were performed and compared to those of the HP-LDPE control resin PE4517, and are reported in Example 10.

Figure 6:
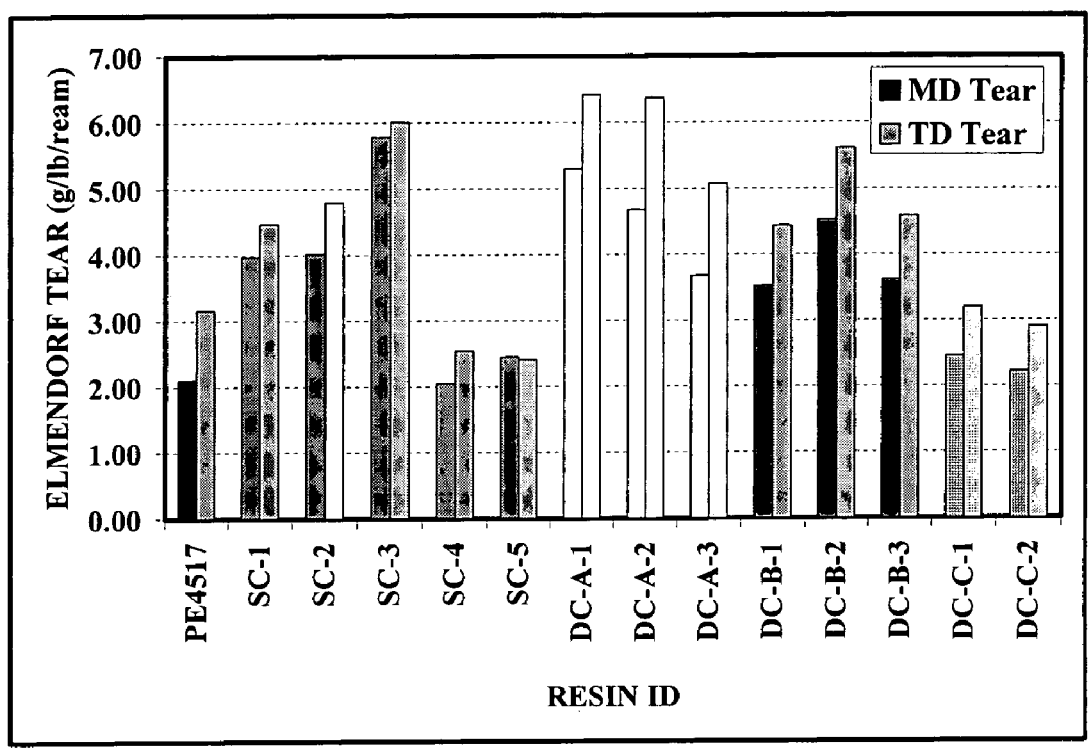
FIG. 6 provides comparative data for the Elmendorf tear strengths of resins of the present invention, tested with Kraft paper substrate, in machine (MD) and transverse (TD) directions. The lighter shaded (second) bars for each resin represents TD tear.

As demonstrated in the Elmendorf Tear strengths illustrated in FIG. 6, the experimental resins prepared according to the Examples were either largely equivalent or better in terms of the MD and TD tear resistance than the PE4517 resin. The Spencer impact strength in FIG. 7 similarly shows largely comparable performance of the experimental resins with that of PE4517. The burst adhesion in FIG. 8 shows some variability but again no apparent trend with either density or melt index.

Figure 9:
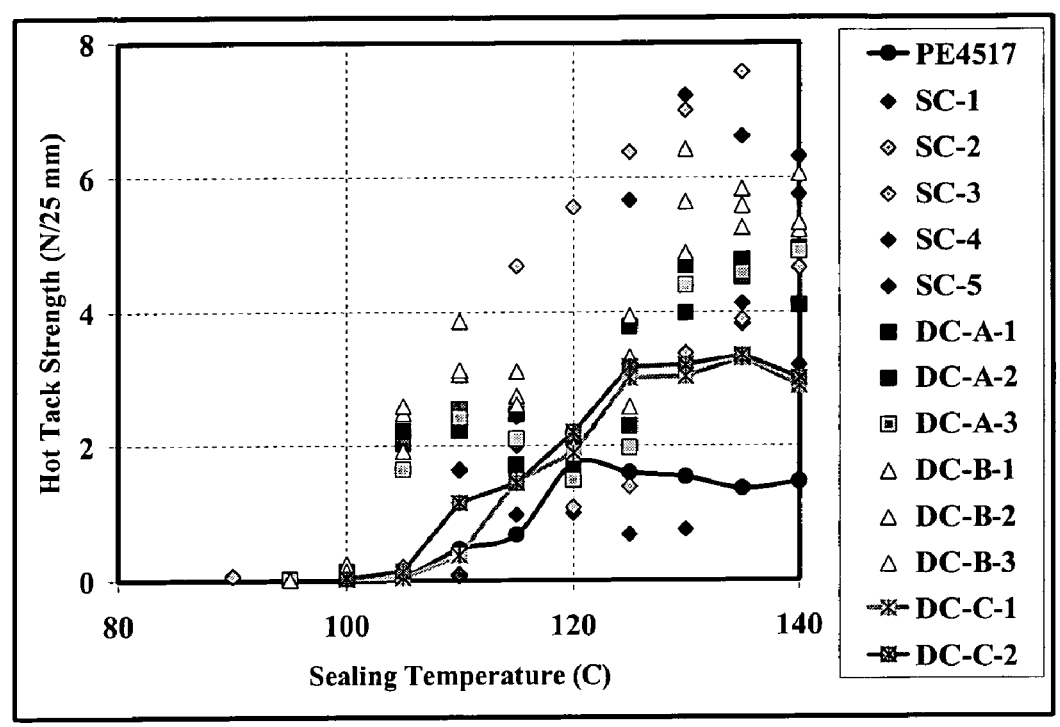
FIG. 9 provides hot tack strength curves for the resins of the present invention. Only lines connecting data points for the PE4517, DC-C-1 and DC-C-2 are shown to maintain visual clarity.
Figure 10:
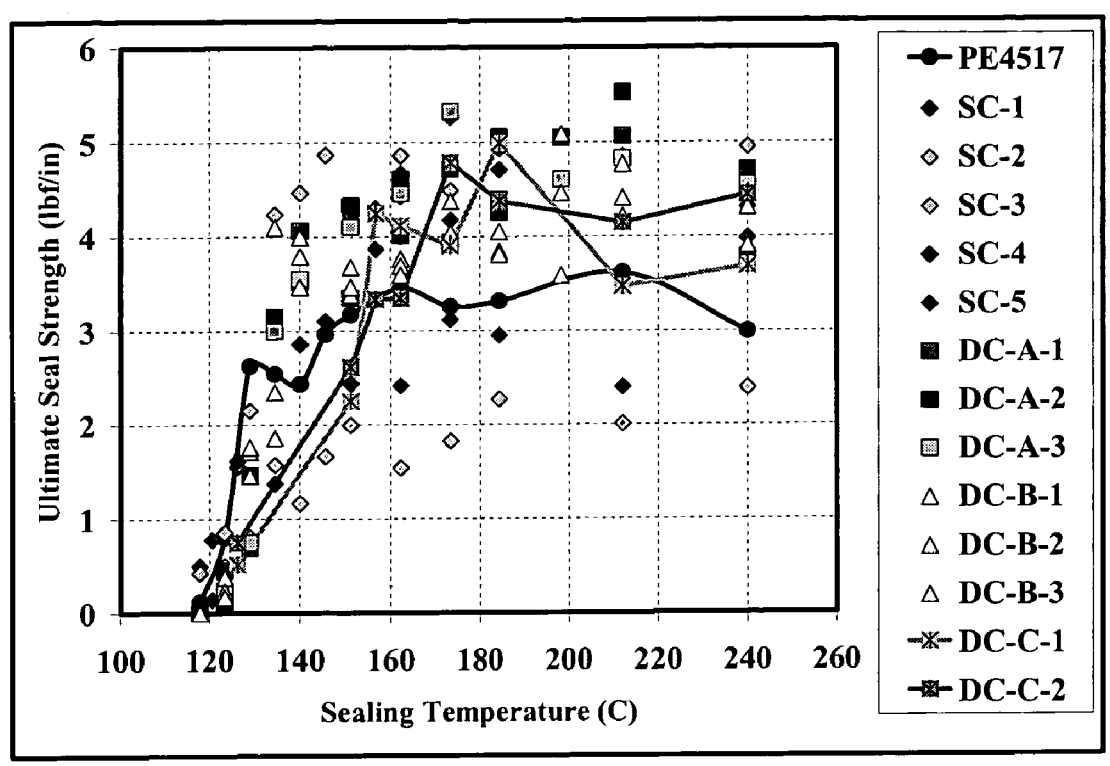
FIG. 10 provides ultimate seal strength curves for the resins of the present invention. Only lines connecting data points for the PE4517, DC-C-1 and DC-C-2 are shown to maintain visual clarity.

The hot tack strength data for the experimental resins is shown in FIG. 9. With the possible exception of resin SC-1, which was one of the highest (0.934 g/cm$^3$) density resins prepared according to this invention, the other experimental resins show hot tack strength behavior that appears to be largely comparable to that of PE4517. The ultimate seal strength data in FIG. 10 illustrates that by and large the experimental resins exhibit comparable seal initiation temperatures and seal strengths as compared to those of PE4517. A closer comparison of PE4517, DC-C-1 and DC-C-2 further demonstrates that while the ultimate seal strength for PE4517 appears to plateau at around 3.2 lbf/in, those for DC-C-1 and DC-C-2 exhibit generally higher plateau strengths around 4–4.5 lbf/in.

Molecular Weight and Rheological Characteristics

Absolute molecular weight data from SEC-MALS, showing weight average molecular weight ($M_w$), number average molecular weight ($M_n$), z-average molecular weight ($M_z$) and molecular weight distribution ($M_w/M_n$) are presented in Table 5. The Theological characteristics of the resins of this invention, expressed in terms of the Carreau-Yasuda empirical model parameters, are presented in Table 6. All of the experimental resins shown in Tables 1, 2 and 3, and the HP-LDPE control resin PE4517, were all determined to contain varying degrees of long chain branching from the SEC-MALS data. Example 11 details the molecular weight and Theological characteristics of the resins of the present invention.

Figure 11A:
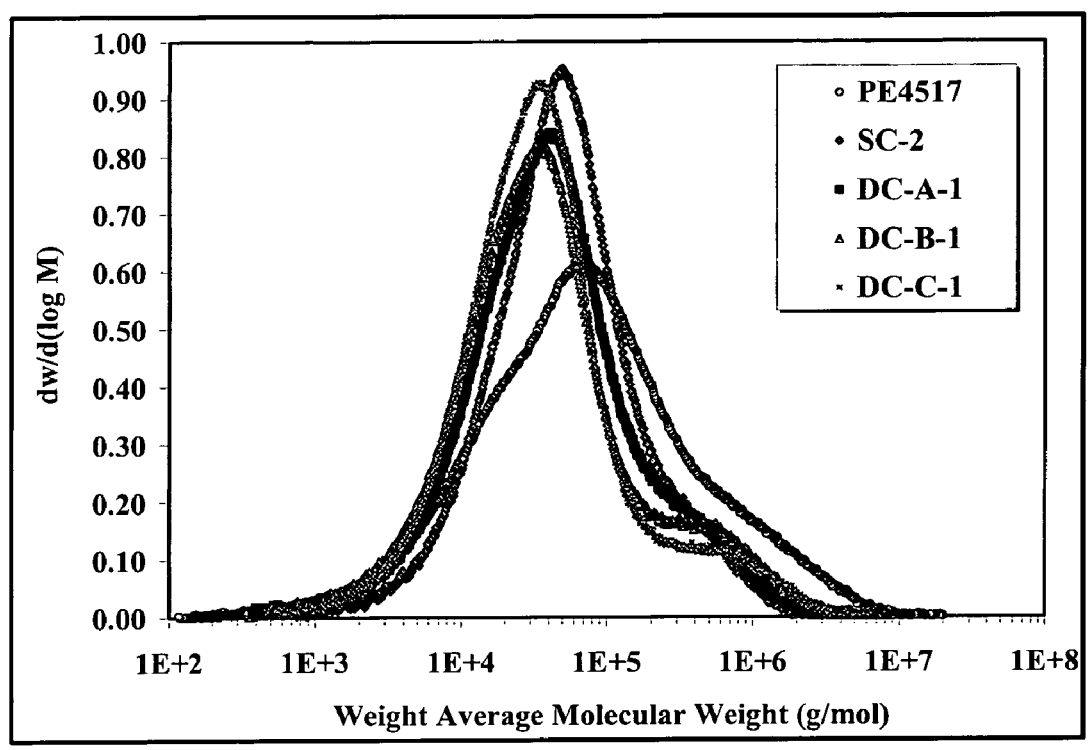
FIG. 11(a) illustrates molecular weight data for the resins of the present invention derived from SEC-MALS analysis.
Figure 11B:
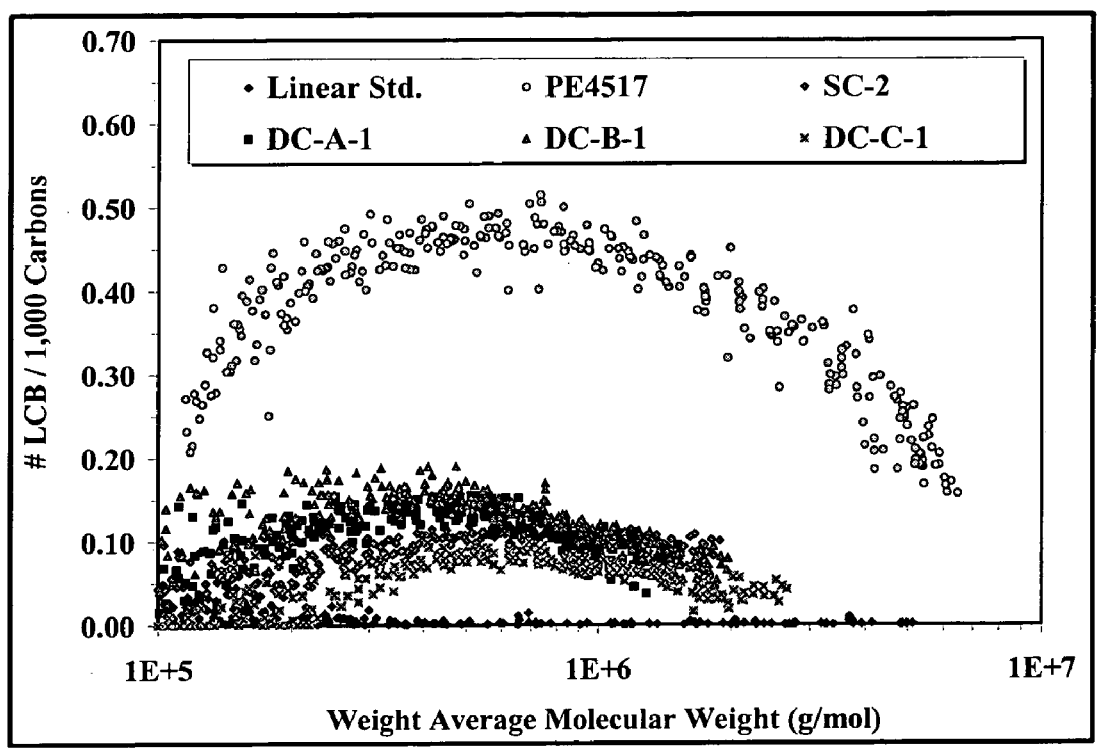
FIG. 11(b) illustrates the degree of long chain branching (number of LCB/1,000 backbone carbons) as a function of weight average molecular weight as determined from SEC-MALS.

As illustrated in FIG. 11a, PE4517 had the greatest polydispersity as compared to the A, B, or C resins of this invention, as seen by the significant "hump" on the high molecular weight end. The experimental resins were all generally much narrower in polydispersity, but also all exhibited a high molecular weight "hump". As illustrated in FIG. 11b, the PE4517 resin was considerably higher in the degree of long chain branching level across the molecular weight range as compared to all the resins of the present invention. The results of FIGS. 11a and 11b demonstrated that in comparison to the PE4517 resin, the experimental resins generally: 1) are narrower in polydispersity; 2) lack the very high end of the $M_w$; and 3) contain only about one third to one fourth the level of LCB.

Further support to the presence of long chain branching in these polymers comes from the elevated flow activation energies, Ea, of close to 40 kJ/mol for select representative resins, as shown in Table 4. The experimental resins were also characterized using Nuclear Magnetic Resonance (NMR), and these results appear to show only "Y" type branches. In contrast, HP-LDPE is believed to have a more complex, random multi-branched or branch-on-branch "tree-like" long chain branching architecture, as a result of the high-pressure, free-radical polymerization process. Therefore, the differences among the various resins produced according to the present invention, and the reasons for their observed performance differences, are believed to be due largely to differences in the $M_w$, molecular weight distribution (MWD), and long chain branching levels, rather than the type of long chain branching architecture.

Motor Load and Extruder Head Pressure

Figure 12A:
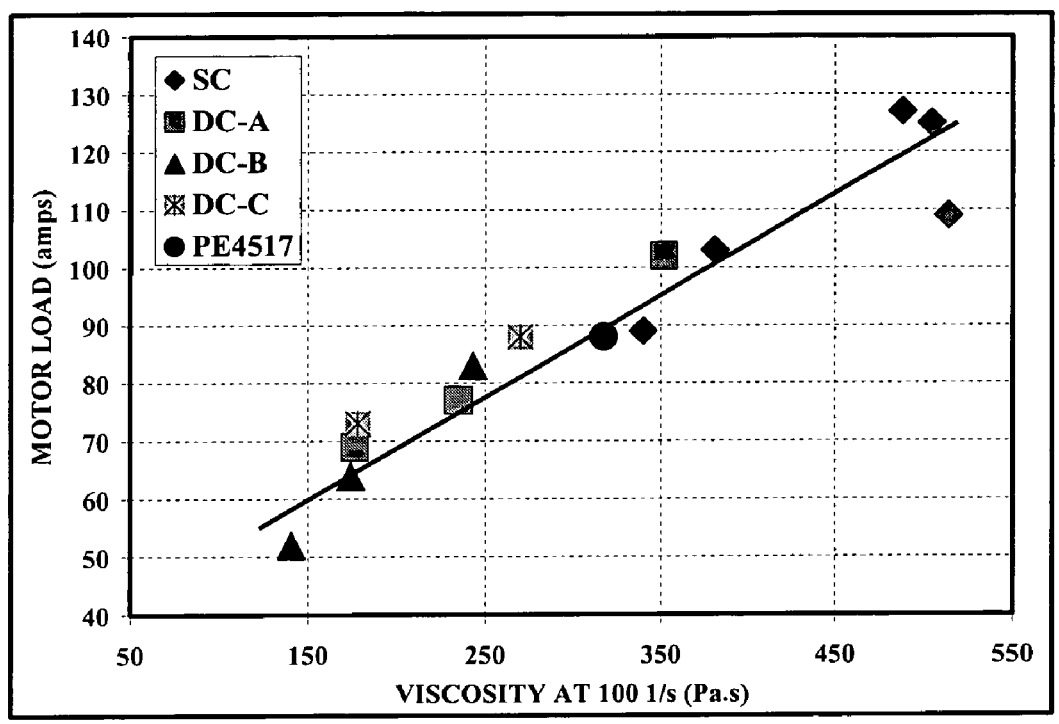
FIG. 12(a) illustrates motor load as a function of the shear viscosity at 100 1/s shear rate for the resins of the present invention.
Figure 12B:
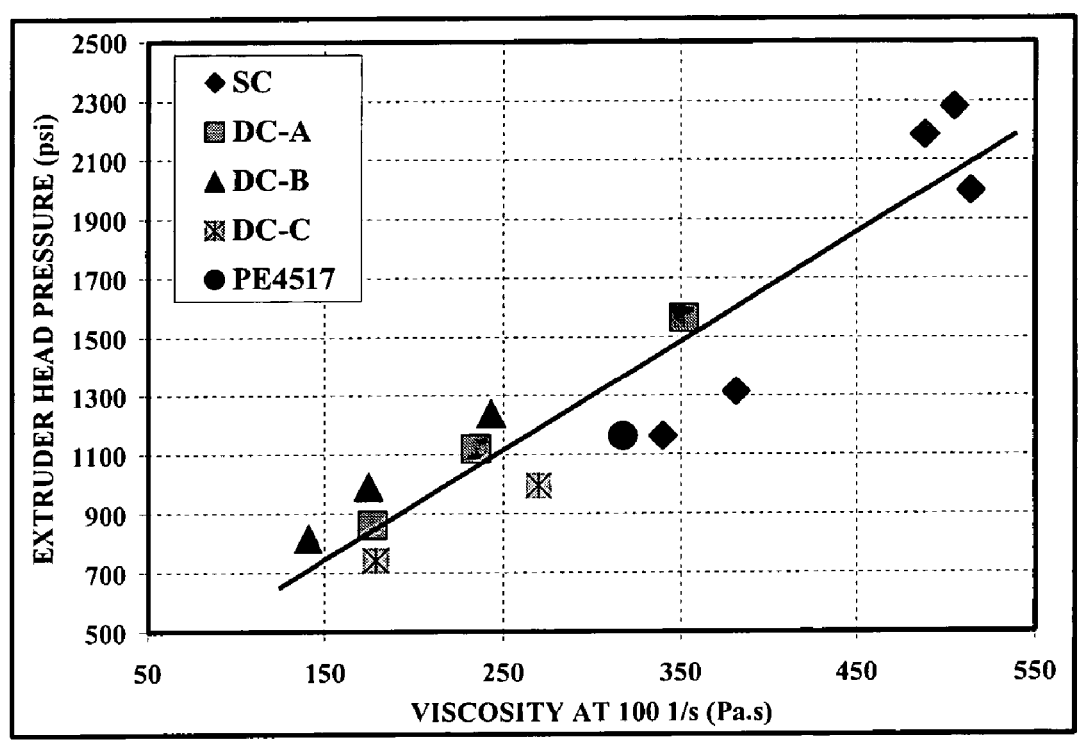
FIG. 12(b) plots extruder head pressure drop as a function of shear viscosity at 100 1/s shear rate for the resins of the present invention. In both FIGS. 12(a) and 12(b), solid lines are trend lines only.

Example 12 details the motor load and extruder head pressure properties of the resins of this invention. Motor load and extruder head pressure are expected to be functions of the shear viscosity. The motor load and extruder pressure drop were examined as a function of the measured shear viscosity at 100 l/s shear rate, the results of which indicate a reasonably good correlation of both motor load and extruder pressure with the shear viscosity, as seen in FIGS. 12a and 12b, respectively. Example 12 provides a detailed analysis of these data.

Further examination of the data in FIG. 12 with respect to the four different resin/catalyst systems investigated revealed that the single catalyst resins, at equivalent MI, exhibited higher high-shear viscosities and hence higher motor loads and pressure drops. In contrast, the dual-catalyst resins exhibited lower high-shear viscosities and hence lower motor loads and pressure drops. The data in FIG. 12 thus indicated that the expected extrusion characteristics, namely motor load and head pressure, may be adjusted by controlling the shear flow viscosity behavior at the prevailing processing conditions. Thus, the greater the shear-thinning behavior for a given MI, the lower the expected motor load and head pressure should be.

Neck-In Behavior

Figure 13A:
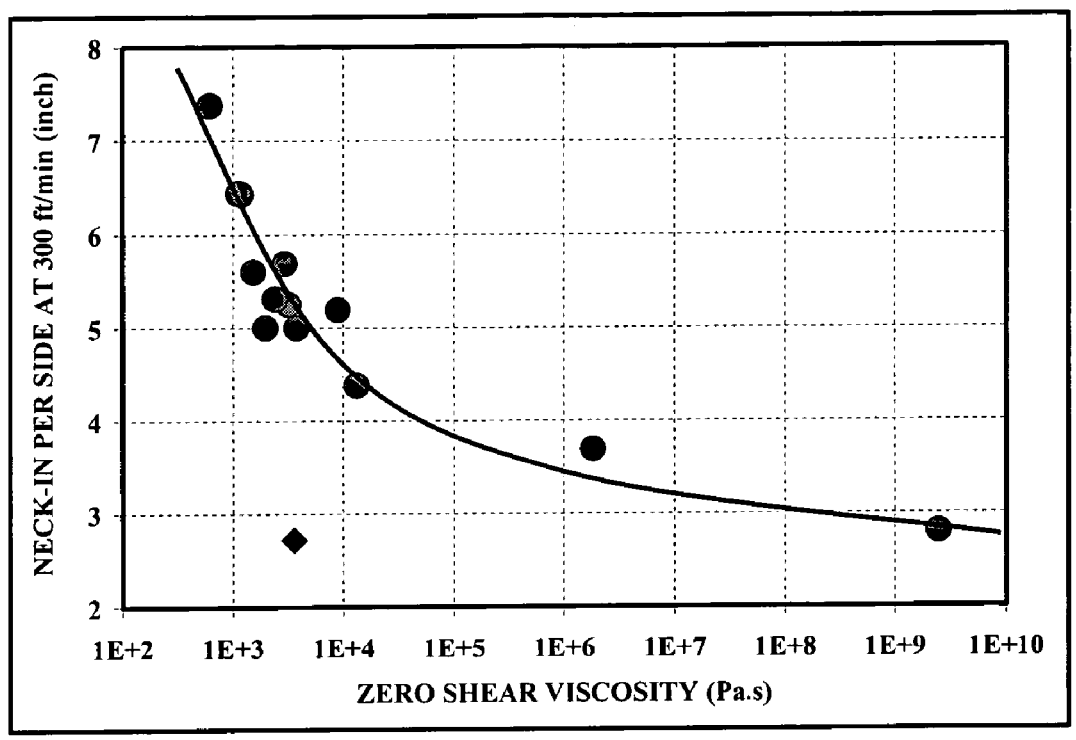
FIG. 13(a) illustrates neck-in per side as a function of zero shear viscosity for the resins of the present invention.
Figure 13B:
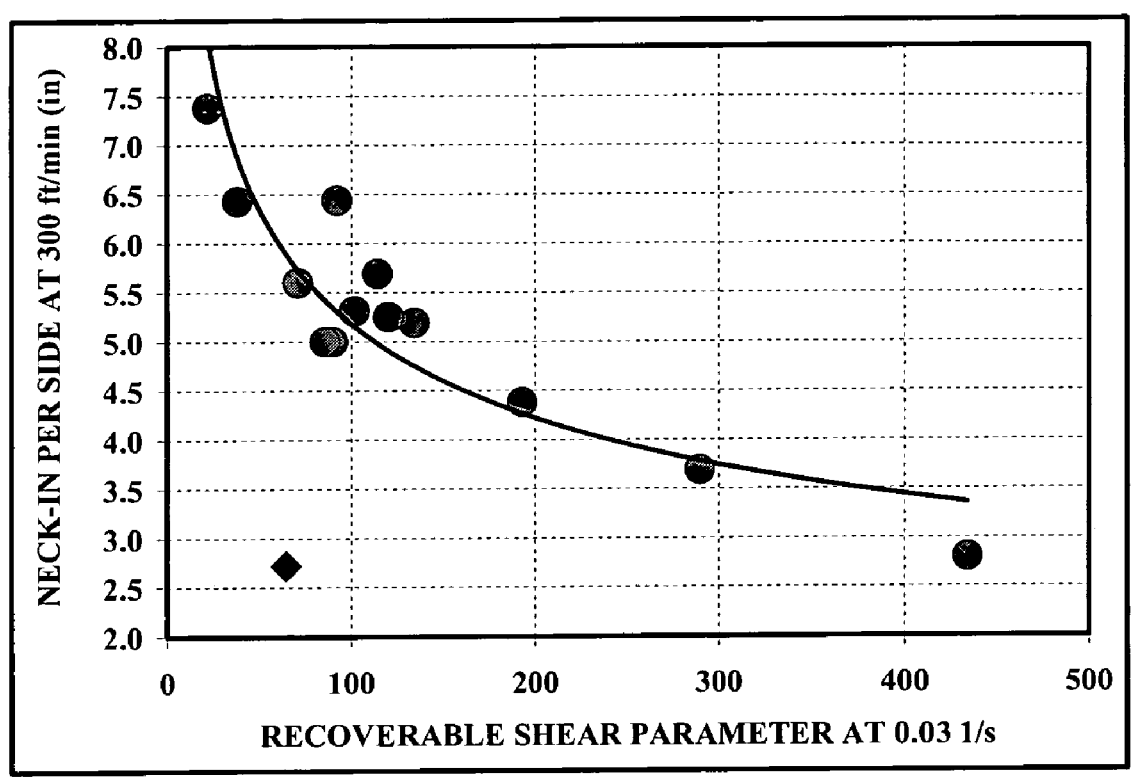
FIG. 13(b) illustrates neck-in per side as a function of the Recoverable Shear Parameter at 0.03 1/s. In both FIGS. 13(a) and 13(b), the solid line is a trend line only, and the diamond shaped symbol represents data for the PE4517 resin for comparison.

Example 13 provides a detailed analysis of the neck-in behavior of the resins of this invention. FIG. 13a illustrates the neck-in per side at 300 ft/min, shown on a semi-log plot as a function of the zero shear viscosity estimated as described herein. In FIG. 13b, the neck-in per side at 300 ft/min is shown as a function of the Recoverable Shear Parameter (RSP). All the resins prepared according to the present invention appeared to fall substantially on a single trendline, with neck-in systematically decreasing as the zero shear viscosity increased (FIG. 13a), or as the melt elasticity increased (FIG. 13b). In contrast to this observed behavior, the PE4517 resin was clearly off the trendline in both cases.

Figure 5:
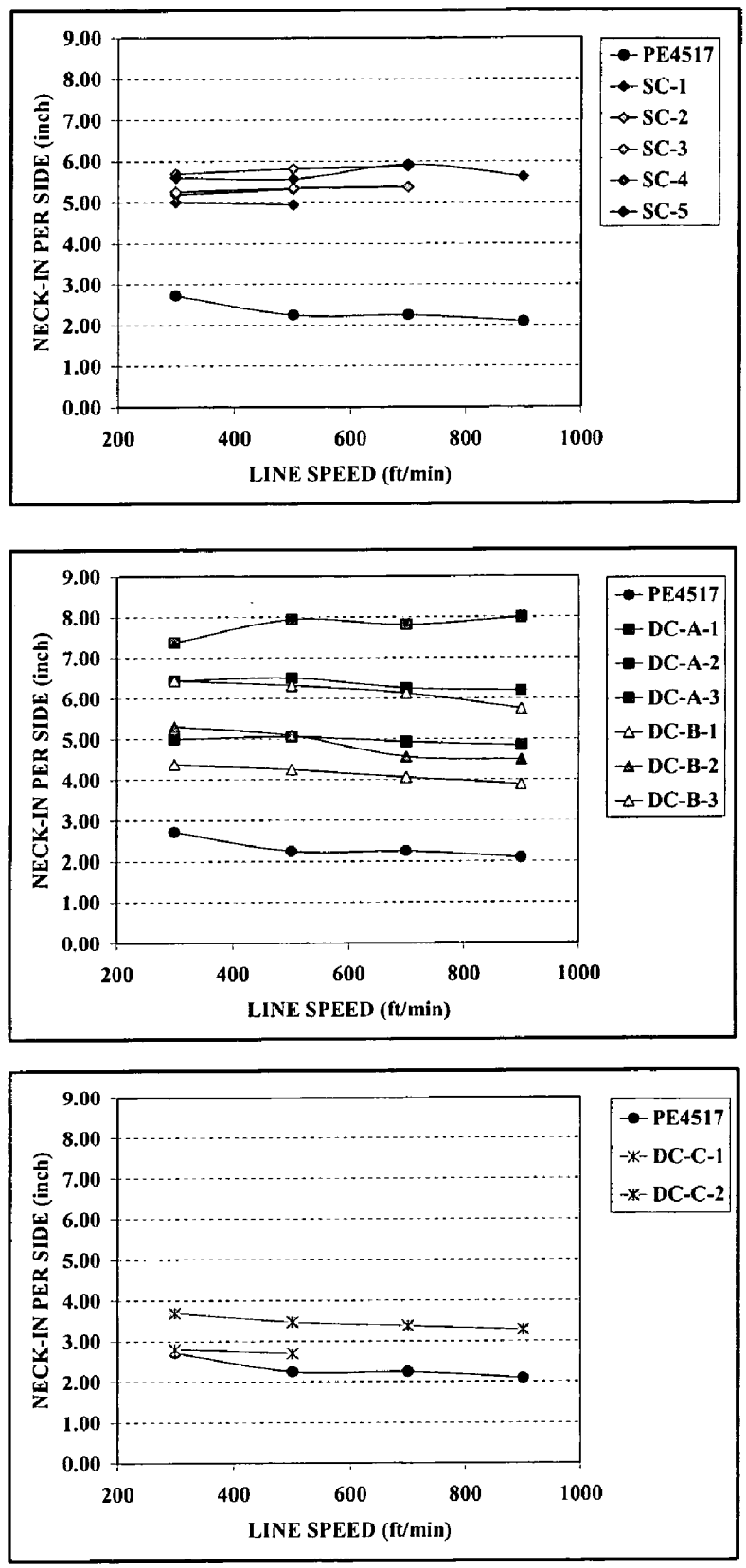
FIG. 5 illustrates comparative data for neck-in per side as a function of line speed (draw-down) for the single-metallocene resins (top), dual-metallocene A and B resins (middle) and dual-metallocene C resins (bottom) of the present invention.

FIG. 5 illustrates the neck-in as a function of increasing line speed, or higher draw-down, and demonstrates that the neck-in of all of the single catalyst resins SC-1 through SC-5 showed either a flat or increased neck-in behavior with increasing line speed. In contrast, the neck-in of PE4517 and each of the dual-metallocene resins, with the exception of resin DC-A-3, showed generally lower neck-in as line speed increased. These data illustrate that the dual-metallocene systems of the present invention generated resin molecular architectures that exhibited strain-hardening responses similar to that observed with HP-LDPE resins.

On the assumption that the resins of the present invention all exhibit a substantially similar type of LCB architecture as disclosed herein, and furthermore vary in degree of LCB level by only small amounts (see FIG. 11b), it would appear that the differences in the neck-in behavior is considerably influenced by the high $M_w$ fraction. Table 3 illustrates that all the experimental resins actually vary in a narrow range of molecular weight characteristics, primarily in the $M_w$ and $M_z$ characteristics. Specifically, the z-average molecular weight, $M_z$, at constant MI, appears to increase in proceeding from the single catalyst SC system, to the dual catalyst DC-A system, to the dual catalyst DC-B system, to the dual catalyst DC-C system. This observation is seen further by comparing the $M_w$ and $M_z$ data in Table 3 for resins SC-2, DC-A-1, DC-B-1 and DC-C-1, which are all close to ~5 MI, and the data in FIGS. 11a and 11b. Upon closer inspection, it appears that the resin DC-C-1, which had the lowest neck-in among the experimental resins, is actually lower in LCB content compared to DC-A-1 and DC-B-1. However, DC-C-1 is higher in $M_z$ than the other resins of the present invention. Therefore, while not intending to be bound by theory, it is possible that the resins of the present invention exhibit the observed differences in neck-in not as a result of differences in long chain branching type, but differences in the higher $M_w$ fractions. In contrast, the fact that PE4517 appears not to follow the general trends of the experimental resin series with regard to neck-in (FIGS. 13a and 13b) may be attributed to differences in degree as well as the type of long chain branching as disclosed herein.

Draw-Down Ability

Figure 14:
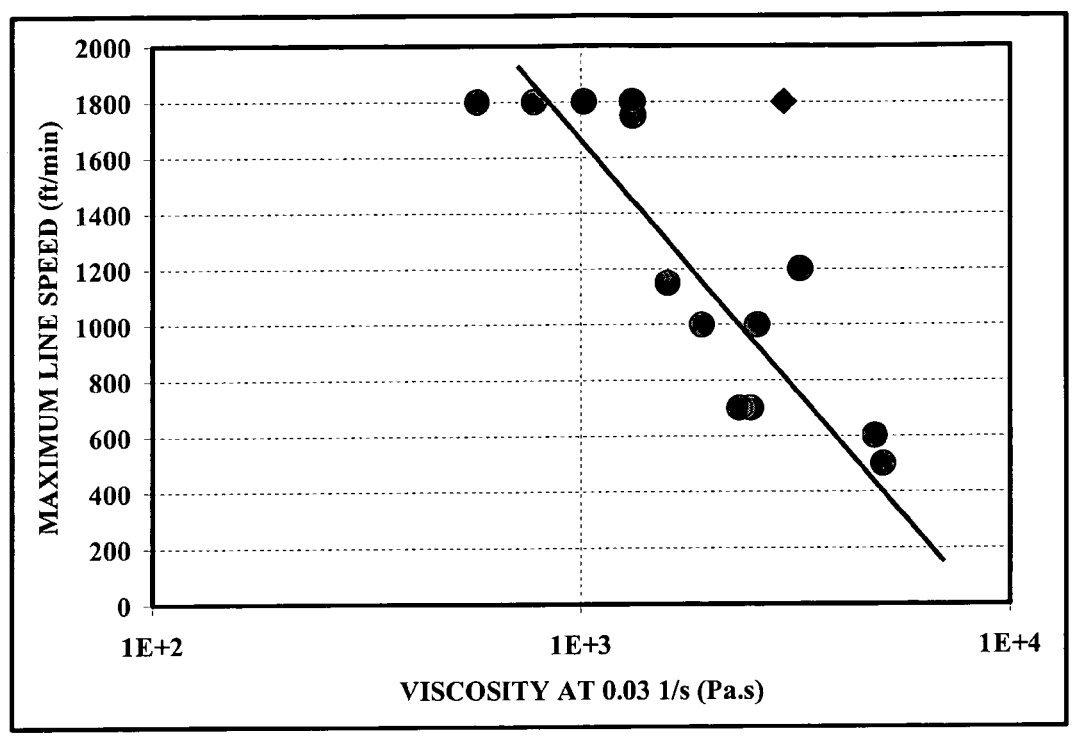
FIG. 14 demonstrates the maximum line speed as a function of the low shear viscosity at 0.03 1/s frequency for the resins of the present invention. The diamond shaped symbol represents data for the PE4517 resin for comparison.

The maximum line speed attainable with each resin is shown in FIG. 14 as a function of the low shear viscosity at 0.03 l/s frequency, obtained from the dynamic frequency sweep data at 190° C. A rough trend is observed of decreasing maximum line speed achieved with increasing low shear viscosity. The PE4517 response is different from that of the resins prepared according to the present invention, as indicated in FIG. 14.

Resin Properties

An examination of the Tables, Figures, and Examples disclosed herein provides a further description of the resin properties of this invention, as follows.

In accordance with one aspect of this invention, the polymer of ethylene of the present invention can be characterized by a melt index from about 3 to about 30 g/min; a density from about 0.915 to about 0.945 g/cm³; a flow activation energy $E_a$ from about 35 to about 45 kJ/mol; a polydispersity index ($M_w/M_n$) from about 3 to about 15; a $M_z$ from about 300 to about 1,500 kg/mol; a $M_w$ molecular weight from about 70 to about 200 kg/mol; and a number of Long Chain Branches per 1,000 carbon atoms (LCB/1000 carbon atoms) from about 0.02 to about 0.3, in the $M_w$ molecular weight range of about 100 to about 1,000 kg/mol.

In accordance with another aspect of this invention, the polymer of ethylene of the present invention can be characterized by melt index from about 5 to about 20 g/min; a density from about 0.915 to about 0.935 g/cm³; a flow activation energy $E_a$ from about 37 to about 43 kJ/mol; a polydispersity index ($M_w/M_n$) from about 4 to about 12; a $M_z$ from about 400 to about 1,200 kg/mol; a $M_w$ molecular weight from about 75 to about 150 kg/mol; and a number of Long Chain Branches per 1,000 carbon atoms (LCB/1000 carbon atoms) from about 0.02 to about 0.25, in the $M_w$ molecular weight range from about 100 to about 1,000 kg/mol.

In accordance with still another aspect of this invention, the polymer of ethylene of the present invention can be characterized by a melt index from about 7 to about 15 g/min; a density from about 0.916 to about 0.930 g/cm³; a flow activation energy $E_a$ from about 38 to about 42 kJ/mol; a polydispersity index ($M_w/M_n$) from about 5 to about 10; a $M_z$ from about 500 to about 1,100 kg/mol; a $M_w$ molecular weight from about 80 to about 130 kg/mol; and a number of Long Chain Branches per 1,000 carbon atoms (LCB/1000 carbon atoms) from about 0.02 to about 0.18, in the $M_w$ molecular weight range from about 100 to about 1,000 kg/mol.

In a further aspect of this invention, the polymer of ethylene is characterized by a polymer neck-in at 300 ft/min line speed from about 3 to about 8 in/side. In another aspect, the polymer neck-in at 300 ft/min line speed is from about 3 to about 6 in/side, and in still another aspect, the polymer neck-in at 300 ft/min line speed is from about 3 to about 4.5 in/side.

In a further aspect of this invention, the polymer of ethylene is characterized by a Recoverable Shear Parameter×1E3 (RSP) at 190° C. and 0.03 rad/s frequency from about 20 to about 500. In another aspect, the polymer Recoverable Shear Parameter×1E3 (RSP) at 190° C. and 0.03 rad/s frequency is from about 80 to about 475, and in still another aspect, the polymer Recoverable Shear Parameter×1E3 (RSP) at 190° C. and 0.03 rad/s frequency is from about 175 to about 450.

In yet another aspect of this invention, the polymer of ethylene is characterized by a polymer neck-in at 900 ft/min line speed from about 3 to about 8 in/side. In still another aspect, the polymer neck-in at 900 ft/min line speed is from about 3 to about 6 in/side, and in another aspect, the polymer neck-in at 900 ft/min line speed is from about 3 to about 4.5 in/side.

In another aspect of this invention, the polymer of ethylene is characterized by an extruder head pressure at 200 lb/hr extrusion rate from about 500 to about 2000 psi. In another aspect, the extruder head pressure at 200 lb/hr extrusion rate is from about 600 to about 1500 psi, and in still another aspect, the extruder head pressure at 200 lb/hr extrusion rate is from about 700 to about 1300 psi.

In still a further aspect of this invention, the polymer of ethylene is characterized by an extruder motor load at 200 lb/hr extrusion rate from about 40 to about 120 amps. In another aspect, the extruder motor load at 200 lb/hr extrusion rate is from about 50 to about 100 amps, and in still another aspect, the extruder motor load at 200 lb/hr extrusion rate is from about 60 to about 90 amps.

In yet a further aspect of this invention, the polymer of ethylene is characterized by an Elmendorf MD tear resistance greater than or equal to about 2.1 g/lb/ream. In another aspect, the Elmendorf TD tear resistance is greater than or equal to about 2.9 g/lb/ream.

In another aspect of this invention, the polymer of ethylene is characterized by a Spencer impact strength greater than or equal to about 0.010 g/lb/ream.

In yet another aspect of this invention, the polymer of ethylene is characterized by a burst adhesion strength greater than or equal to about 95%.

In yet a further aspect of this invention, the polymer of ethylene is characterized by a hot tack initiation temperature at which hot tack strength of 1N/25 mm strength is developed of less than or equal to about 110° C. In another aspect, the hot tack initiation temperature at which hot tack strength of 1N/25 mm strength is developed is less than or equal to about 120° C.

In still a further aspect of this invention, the polymer of ethylene is characterized by an ultimate seal strength greater than or equal to about 3.5 lbf/in.

These results illustrate the synthesis of resins with metallocene catalysts that, while different in their molecular architectures as compared to HP-LDPE, can closely match the performance characteristics of conventional HP-LDPE resins in extrusion coating applications.

Definitions

In order to more clearly define the terms used herein, the following definitions are provided. To the extent that any definition or usage provided by any document incorporated herein by reference conflicts with the definition or usage provided herein, the definition or usage provided herein controls.

The term "polymer" is used herein to mean homopolymers comprising ethylene and copolymers of ethylene and another olefinic comonomer. Thus, the term "a polymer of ethylene" is used herein to refer to both homopolymers and copolymers of ethylene and an olefinic comonomer. Polymer is also used herein to mean homopolymers and copolymers of any other polymerizable monomer disclosed herein.

The term "cocatalyst" is generally used herein to refer to the organoaluminum compounds that may constitute one component of the catalyst composition, but also refers to the optional components of the catalyst composition including, but not limited to, aluminoxanes, organoboron compounds, organozinc compounds, or ionizing ionic compounds, as disclosed herein. The term cocatalyst may be used regardless of the actual function of the compound or any chemical mechanism by which the compound may operate. In one aspect, the term cocatalyst is used to distinguish that component of the catalyst composition from the first and second metallocene compounds.

The term "precontacted" mixture is used herein to describe a first mixture of catalyst components that are contacted for a first period of time prior to the first mixture being used to form a "postcontacted" or second mixture of catalyst components that are contacted for a second period of time. Typically, the precontacted mixture describes a mixture of metallocene compound (first, second, or both), olefin monomer, and organoaluminum compound, before this mixture is contacted with the chemically treated solid oxide and optionally additional organoaluminum compound. Thus, "precontacted" describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for the precontacted organoaluminum compound, once it is contacted with the metallocene and the olefin monomer, to have reacted to form at least one different chemical compound, formulation, or structure from the distinct organoaluminum compound used to prepare the precontacted mixture. In this case, the precontacted organoaluminum compound or component is described as comprising an organoaluminum compound that was used to prepare the precontacted mixture.

Similarly, the term "postcontacted" mixture is used herein to describe a second mixture of catalyst components that are contacted for a second period of time, and one constituent of which is the "precontacted" or first mixture of catalyst components that were contacted for a first period of time. Typically, the term "postcontacted" mixture is used herein to describe the mixture of first metallocene compound, first metallocene compound, olefin monomer, organoaluminum compound, and chemically treated solid oxide, formed from contacting the precontacted mixture of a portion of these components with any additional components added to make up the postcontacted mixture. Generally, the additional component added to make up the postcontacted mixture is the chemically treated solid oxide, and optionally may include an organoaluminum compound the same or different from the organoaluminum compound used to prepare the precontacted mixture, as described herein. Accordingly, this invention may also occasionally distinguish between a component used to prepare the postcontacted mixture and that component after the mixture has been prepared.

The term metallocene describes a compound comprising two $\eta^5$-cycloalkadienyl-type ligands in the molecule. Thus, the metallocenes of this invention are bridged bis($\eta^5$-cyclopentadienyl-type ligand) compounds, wherein the $\eta^5$-cycloalkadienyl portions include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst", in much the same way the term "cocatalyst" is used herein to refer to the organoaluminum compound.

The terms "catalyst composition," "catalyst mixture," and the like do not depend upon the actual product of the reaction of the components of the mixtures, the nature of the active catalytic site, or the fate of the aluminum cocatalyst, the first metallocene compound, the second metallocene compound, any olefin monomer used to prepare a precontacted mixture, or the chemically treated solid oxide after combining these components. Therefore, the terms catalyst composition, catalyst mixture, and the like may include both heterogeneous compositions and homogenous compositions.

The term "hydrocarbyl" is used to specify a hydrocarbon radical group that includes, but is not limited to aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, heteroatom substituted derivatives thereof.

The terms chemically treated solid oxide, solid oxide activator-support, acidic activator-support, activator-support, treated solid oxide compound, or simply activator, and the like are used herein to indicate a solid, inorganic oxide of relatively high porosity, which exhibits Lewis acidic or Brønsted acidic behavior, and which has been treated with an electron-withdrawing component, typically an anion, and which is calcined. The electron-withdrawing component is typically an electron-withdrawing anion source compound. Thus, the chemically treated solid oxide compound comprises the calcined contact product of at least one solid oxide compound with at least one electron-withdrawing anion source compound. Typically, the chemically treated solid oxide comprises at least one ionizing, acidic solid oxide compound. The terms support or activator-support are not used to imply these components are inert, and this component should not be construed as an inert component of the catalyst composition.

The term hot tack initiation temperatures is defined herein as the temperature at which 1N/25 mm strength is developed.

Unless specified otherwise, or unless the context requires otherwise, certain abbreviations that are used herein, include, but not limited to: Ind, indenyl; Flu, fluorenyl; Cp, cyclopentadienyl; C2, ethylene; C6, 1-hexene; iC4, isobutane; FSA, fluorided silica-alumina; CTSO, chemically-treated solid oxide.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

For any particular compound disclosed herein, any general structure presented also encompasses all conformational isomers, regioisomers, and stereoisomers that may arise from a particular set of substituents. The general structure also encompasses all enantiomers, diastereomers, and other optical isomers whether in enantiomeric or racemic forms, as well as mixtures of stereoisomers, as the context requires.

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims.

In the following examples, unless otherwise specified, the syntheses and preparations described therein were carried out under an inert atmosphere such as nitrogen and/or argon. Solvents were purchased from commercial sources and were typically dried prior to use. Unless otherwise specified, reagents were obtained from commercial sources.

General Test Methods

Melt Index and Density

Melt index (MI) was measured according to ASTM D-1238, Condition F (190° C., 2.16 kg). Density was measured using density gradient columns in accordance with ASTM D-1505.

Melt Rheological Characterization

Pellet samples were compression molded at 182° C. for a total of three minutes. The samples were allowed to melt at a relatively low pressure for one minute and then subjected to a high molding pressure for an additional two minutes. The molded samples were then quenched in a cold (room temperature) press. 2 mm×25.4 mm diameter disks were stamped out of the molded slabs for theological characterization.

Small-strain (10%) oscillatory shear measurements were performed on a Rheometrics Scientific, Inc. ARES rheometer using parallel-plate geometry at a temperature of 190° C. The test chamber of the rheometer was blanketed in nitrogen in order to minimize polymer degradation. The rheometer was preheated to the test temperature of the study. Upon sample loading and after oven thermal equilibration, the specimens were squeezed between the plates to a 1.6 mm thickness and the excess was trimmed. A total of 8.0 minutes elapsed between the time the sample was inserted between the plates and the time the frequency sweep (0.03–100 rad/s) was started. The complex viscosity ($\eta^*$) versus frequency ($\omega$) data were then curve fitted using the modified three parameter Carreau-Yasuda (CY) empirical model to obtain the CY parameters viz. zero shear viscosity—$\eta_0$, characteristic relaxation time—$\tau_\eta$ and breadth parameter a. Details of the significance and interpretation of these three parameters may be found in C. A. Hieber and H. H. Chiang, *Rheol. Acta*, 28, 321 (1989) and C. A. Hieber and H. H. Chiang, *Polym. Eng. Sci.*, 32, 931 (1992), both of which are hereby incorporated by reference herein in their entireties. Flow activation energies (Ea) were determined for some resins by performing time-temperature superposition of dynamic frequency data obtained at 150° C., 190° C. and 230° C.

Absolute Molecular Weight as Determined by Light Scattering

Molecular weight data were determined using SEC-MALS, which combines the methods of size exclusion chromatography (SEC) with multi-angle light scattering (MALS) detection. A DAWN EOS 18-angle light scattering photometer (Wyatt Technology, Santa Barbara, Calif.) was attached to a PL-210 SEC system (Polymer Labs, UK) or a Waters 150 CV Plus system (Milford, Mass.) through a hot transfer line, thermally controlled at the same temperature as the SEC columns and its differential refractive index (DRI) detector (145° C.). At a flow rate setting of 0.7 mL/min, the mobile phase, 1,2,4-trichlorobenzene (TCB), was eluted through three, 7.5 mm×300 mm, 20 μm Mixed A-LS columns (Polymer Labs). Polyethylene (PE) solutions with concentrations of ~1.2 mg/mL, depending on samples, were prepared at 150° C. for 4 h before being transferred to the SEC injection vials sitting in a carousel heated at 145° C. For polymers of higher molecular weight, longer heating times were necessary in order to obtain true homogeneous solutions. In addition to acquiring a concentration chromatogram, seventeen light-scattering chromatograms at different angles were also acquired for each injection using Wyatt's Astray) software. At each chromatographic slice, both the absolute molecular weight (M) and root mean square (RMS) radius of gyration ($R_g$) were obtained from a Debye plot's intercept and slop, respectively. Methods for this process are detailed in Wyatt, P. J., *Anal. Chim. Acta*, 272, 1 (1993), which is hereby incorporated herein by reference in its entirety. The linear PE control employed was a linear, high-density broad MWD polyethylene sample (Chevron Phillips Chemical Co.). The weight average molecular weight ($M_w$), number average molecular weight ($M_n$), z-average molecular weight ($M_z$) and molecular weight distribution ($M_w/M_n$) were computed from this data, and are presented in various Tables.

The Zimm-Stockmayer approach was used to determine the amount of LCB in ethylene polymers. Since SEC-MALS measures M and $R_g$ at each slice of a chromatogram simultaneously, the branching indices, $g_M$, as a function of M could be determined at each slice directly by determining the ratio of the mean square $R_g$ of branched molecules to that of linear ones, at the same M, as shown in equation 1:

$$g_M = \frac{\langle R_g \rangle_{br}^2}{\langle R_g \rangle_{lin}^2} \quad (1)$$

where the subscripts br and lin represent branched and linear polymers, respectively.

At a given $g_M$, the weight-averaged number of LCB per molecule ($B_{3w}$) was computed using Zimm-Stockmayer's equation, shown in equation 2, where the branches were assumed to be trifunctional, or Y-shaped.

$$g_M = \frac{6}{B_{3w}} \left\{ \frac{1}{2} \left( \frac{2+B_{3w}}{B_{3w}} \right)^{1/2} \ln\left[ \frac{(2+B_{3w})^{1/2} + (B_{3w})^{1/2}}{(2+B_{3w})^{1/2} - (B_{3w})^{1/2}} \right] - 1 \right\} \quad (2)$$

LCB frequency ($LCB_{M_i}$), the number of LCB per 1 000 C, of the $i^{th}$ slice was then computed straightforwardly using equation 3:

$$LCB_{M_i} = 1\,000 * 14 * B_{3w}/M_i \quad (3)$$

where $M_i$ is the MW of the $i^{th}$ slice. The LCB distribution across the molecular weight distribution (MWD), (LCBD) was thus be established for a full polymer.

For a copolymer, however, the contribution of comonomer to the RMS radius of gyration ($R_g$) was first corrected before equations 1, 2, 3 were applied for the determination of LCB in the copolymer.

With a known SCB distribution across the MWD for the copolymer, $$\left( \frac{d(SCB)}{d(MW)} \right),$$

the SCB correction factor across the entire MWD of the copolymer was thus be obtained, using equation 4:

$$\frac{d(\Delta g_M)}{d(MW)} = \frac{d(SCB)}{d(MW)} * \frac{d(\Delta g_M)}{d(SCB)} \quad (4)$$

The LCB profiles and levels were determined by making two assumption to correct for the SCB content, namely that: 1) the SCB profile was assumed to be flat across the MWD; and 2) the SCB content for all resins was assumed to be the same and equal to 10.9 SCB/1000 carbons Extrusion Coating Evaluations Extrusion coating evaluations for the resins of this invention were performed on a commercial-scale GPC (Guardian Packaging Corporation) extrusion coating line. This line was used in a monolayer configuration and was equipped with a 4.5 inch single flite screw, 24:1 L/D extruder, Cloeren variable geometry feedblock, and a 40-inch Cloeren EBR IV internally deckled die. A die width of 32 inches was used for the entire study. The extruder metering zones, pipes, feedblock, and die were set to 610 F and the output rate was fixed at 200 lb/hr. The draw distance from die to nip roll was fixed at 8 inches. The chill roll was matte finish and controlled to 65 F. Line speed was increased incrementally from 300 ft/min to 500 ft/min to 700 ft/min to 900 ft/min, and then finally to 1,800 ft/min, in order to measure neck-in performance at a range of line speeds and to determine if and when edge tear was encountered. The resin was coated onto a 35# natural kraft paper substrate, which was pretreated using a Pillar corona treater. PET "slip sheets" were also placed between the extrudate and the paper, while at steady-state conditions, in order to produce samples where the extrudate could be cleanly removed from the substrate for coat weight and haze testing.

Elmendorf Tear and Spencer Impact Measurements

Elmendorf tear was measured according to ASTM D-1922 using a Thwing-Albert Elmendorf tear tester. Spencer impact was measured as per ASTM D-3420, Pendulum Impact Resistance of Plastic Film—Procedure B. Both Elmendorf tear and Spencer impact testing were done on the entire structure (that is, the polymer coated onto paper), however the results were reported in grams per pound per ream of polymer coating only, to account for the variability in thickness of the paper substrate.

Hot Tack and Heat Seal Testing

Hot tack testing was measured in accordance with ASTM F-1921 using a J&B Hot Tack Tester. Heat seal testing was measured in accordance with ASTM F-88 using a Theller Heat Sealer and an Instron tensiometer. Hot tack testing was carried out using a 0.5 second dwell time, 0.5 second cooling time, a sealing pressure of 0.5 N/mm², and a peel speed of 200 mm/s. Heat seal testing was carried out using a 0.5 second dwell time, 30 psi of seal pressure, and a cross-head speed of 20 in/min.

EXAMPLE 1

General Sources and Properties of the Solid Oxide Materials Used to Prepare the Chemically-Treated Solid Oxides Alumina was obtained as Ketjen™ grade B from Akzo Nobel, having a pore volume of about 1.78 cc/g and a surface area of about 340 m²/g or Ketjen™ L 95–98% alumina and 2–5% silica having a pore volume of 2.00 cc/g and surface area of 380 m²/g. Silica was obtained as Davison grade 952 from W. R. Grace, having a pore volume of about 1.6 cc/g and a surface area of about 300 m²/g. Silica-alumina was obtained as MS13-110 from W. R. Grace having 13% by weight alumina and 87% by weight silica and having a pore volume of about 1.2 cc/g and a surface area of about 350 m²/g.

EXAMPLE 2

Preparation of a Chlorided Alumina Activator-Support

Ten mL of Ketjen™ Grade B alumina was calcined in air for three hours at 600° C. After this calcining step, the furnace temperature was lowered to about 400° C., and a nitrogen stream was initiated over the alumina bed, after which 1.0 mL of carbon tetrachloride was injected into the nitrogen stream and evaporated upstream from the alumina bed. This gas phase CCl₄ was carried into the bed and there reacted with the alumina to chloride the surface. This process provided the equivalent to about 15.5 mmol of chloride ion per gram of dehydrated alumina. After this chloriding treatment, the resulting alumina was white in color. This activator support was used in the same manner as the sulfated alumina.

EXAMPLE 3

Preparation of a Fluorided Silica-Alumina Activator-Support

The silica-alumina used to prepare the fluorided silica-alumina acidic activator-support in this Example was obtained from W. R. Grace as Grade MS13-110, containing 13% alumina, having a pore volume of about 1.2 cc/g and a surface area of about 400 m²/g. This material was fluorided by impregnation to incipient wetness with a solution containing ammonium bifluoride in an amount sufficient to equal 10 wt % of the weight of the silica-alumina. This impregnated material was then dried in a vacuum oven for 8 hours at 100° C. The thus-fluorided silica-alumina samples were then calcined as follows. About 10 grams of the alumina were placed in a 1.75-inch quartz tube fitted with a sintered quartz disk at the bottom. While the silica was supported on the disk, dry air was blown up through the disk at the linear rate of about 1.6 to 1.8 standard cubic feet per hour. An electric furnace around the quartz tube was used to increase the temperature of the tube at the rate of about 400° C. per hour to a final temperature of about 950° F. At this temperature, the silica-alumina was allowed to fluidize for about three hours in the dry air. Afterward, the silica-alumina was collected and stored under dry nitrogen, and was used without exposure to the atmosphere.

EXAMPLE 4

Preparation of Sulfated Alumina

Ketjen™ L alumina, 652 g, was impregnated to just beyond incipient wetness with a solution containing 137 g of $(NH_4)_2SO_4$ dissolved in 1300 mL of water. This mixture was then placed in a vacuum oven and dried overnight at 110° C. under half an atmosphere of vacuum and then calcined in a muffle furnace at 300° C. for 3 hours, then at 450° C. for 3 hours, after which the activated support was screened through an 80 mesh screen. The support was then activated in air at 550° C. for 6 hours, after which the chemically-treated solid oxide was stored under nitrogen until used.

EXAMPLE 5

General and Specific Preparations of the Metallocenes

General Methods

General preparative methods for forming the first metallocene compounds and the second metallocene compounds can be found in a various references, including: U.S. Pat. Nos. 4,939,217, 5,191,132, 5,210,352, 5,347,026, 5,399,636, 5,401,817, 5,420,320, 5,436,305, 5,451,649, 5,496,781, 5,498,581, 5,541,272, 5,554,795, 5,563,284, 5,565,592, 5,571,880, 5,594,078, 5,631,203, 5,631,335, 5,654,454, 5,668,230, 5,705,579, and 6,509,427; Köppl, A. Alt, H. G. *J. Mol. Catal A*. 2001, 165, 23; Kajigaeshi, S.; Kadowaki, T.; Nishida, A.; Fujisaki, S. *The Chemical Society of Japan*, 1986, 59, 97; Alt, H. G.; Jung, M.; Kehr, G. *J. Organomet. Chem*. 1998, 562, 153–181; Alt, H. G.; Jung, M. *J. Organomet. Chem*. 1998, 568, 87–112; *Journal of Organometallic Chemistry*, 1996, 522, 39–54; Wailes, P. C.; Coutts, R. S. P.; Weigold, H. in Organometallic Chemistry of Titanium, Zironium, and Hafnium, Academic; New York, 1974; and Cardin, D. J.; Lappert, M. F.; and Raston, C. L.; Chemistry of Organo-Zirconium and -Hafnium Compounds; Halstead Press; New York, 1986.

Specific Preparations

All manipulations involving air-sensitive reagents and materials were performed under nitrogen by using Schlenk line or dry box techniques. THF was distilled from potassium. Anhydrous diethyl ether, methylene chloride, pentane and toluene were obtained from Fisher Scientific Company and stored over activated alumina. All solvents were degassed and stored under nitrogen. Dichloromethylphenylsilane, zirconium(IV) chloride (99.5%) and n-butyllithium were purchased from Aldrich and used as received. N-octylmethyldichlorosilane was purchased from Gelest and used as received. Products were analyzed by ¹H NMR (300 MHz, CDCl₃, referenced against the peak of residual CHCl₃ at 7.24 ppm) or ¹³C NMR (75 MHz, CDCl₃, referenced at 77.00 ppm).

Difluoren-9-yl(methyl)octylsilane. BuLi (40 mL, 10 M in hexanes, 400 mmol) was added dropwise to fluorene (66.4 g, 400 mmol) dissolved in THF (500 mL) at −78° C. The resulting mixture was warmed to room temperature slowly and stirred overnight, giving rise to a dark red solution. This solution was added dropwise to methyloctyldichlorosilane (45.4 g, 200 mmol) in THF (50 mL) at room temperature over a period of 4 hours. The resulting mixture was stirred at room temperature overnight, quenched with water and extracted with Et₂O (800 mL). The organic layers were combined, washed with water and then dried over anhydrous Na₂SO₄. Removal of the solvent afforded a reddish oil. The oil was purified by column chromatography on silica gel with 5–10% (V/V) CH$_2$Cl$_2$ in heptane. Pure product (46 g, 47% yield) was obtained as a yellow solid. $^1$H NMR (300 MHz, CDCl$_3$) δ 7.88 (d, J=7.8 Hz, 4H), 7.22–7.48 (m, 12H), 4.14 (s, 2H), 0.84–1.35 (m, 13H), 0.55–0.65 (m, 2H), 0.22–0.33 (m, 2H), −0.36 (s, 3H); $^{13}$C NMR (75 MHz, CDCl$_3$) δ 145.10, 145.06, 140.79, 140.75, 126.18, 126.14, 125.55, 125.52, 124.34, 124.25, 120.08 (2C), 39.70, 33.24, 31.80, 28.90, 28.77, 23.14, 22.63, 14.10, 11.63, −7.12.

Methyloctylsilylbis(η$^5$-fluoren-9-yl)zirconium(IV) dichloride. Difluoren-9-yl(methyl)octylsilane (4.25 g, 8.7 mmol) was dissolved in 50 mL of anhydrous Et$_2$O and cooled to −78° C. under nitrogen. n-BuLi (7 mL, 2.5 M in hexanes, 17.5 mmol) was added dropwise to the ligand solution. The resulting mixture was warmed to room temperature and stirred overnight, giving rise to dark red solution. This solution was added to ZrCl$_4$ (2.03 g, 8.7 mmol) suspended in 50 mL of pentane at 0° C. over approximately 20 min. The resulting mixture was warmed to room temperature and stirred overnight, giving rise to a purple suspension. The solid was collected by filtration, washed with pentane and extracted with 200 mL of CH$_2$Cl$_2$. Removal of the solvent from the CH$_2$Cl$_2$ extract gave a purple solid (4.8 g, 84.9% yield). $^1$H NMR (300 MHz, CDCl$_3$) δ 7.75–7.9 (m, 8H), 7.35 (t, J=7.6 Hz, 4H), 7.01–7.11 (m, 4H), 2.10–2.20 (m, 2H), 1.97–2.10 (m, 2H), 1.76 (quintet, J=7.2 Hz, 2H), 1.65 (s, 3H), 1.30–1.58 (m, 8H), 0.92 (t, J=6.4 Hz, 3H); $^{13}$C NMR (75 MHz, CDCl$_3$) δ 130.59, 130.34, 128.24, 128.13, 127.75, 127.66, 126.02, 125.99, 125.43, 125.36, 124.61 (unresolved 2C), 64.77, 33.65, 31.89, 29.43, 29.19, 22.95, 22.65, 18.26, 14.08, 0.31.

Methylphenylsilylbis(η$^5$-fluoren-9-yl)zirconium(IV) dichloride was prepared is the same manner described herein for methyloctylsilylbis(η$^5$-fluoren-9-yl)zirconium(IV) dichloride, but using dichloromethylphenylsilane as the silane starting material.

Rac-ethan-1,2-diylbis(η$^5$-inden-1-yl)zirconium(IV) dichloride was prepared according to Yang, Q.; Jensen, M. D. *Synlett* 1996, 2, 147, the entirety of which is incorporated herein by reference.

Rac-Me$_2$Si(2-Me-4-PhInd)$_2$ZrCl$_2$, rac-C$_2$H$_4$(2-MeInd)$_2$ZrCl$_2$, rac-Me$_2$Si(Ind)$_2$ZrCl$_2$, rac-Me$_2$Si(2-MeInd)$_2$ZrCl$_2$, rac-Me$_2$Si(3-nPrCp)$_2$ZrCl$_2$, Me$_2$Si(Me$_4$Cp)ZrCl$_2$, and Me$_2$SiCp$_2$ZrCl$_2$ were purchased from Boulder Scientific and used as received.

EXAMPLE 6

General Description of the Polymerization Runs in Table 3

All polymerization runs were conducted in a one-gallon (3.785 liter) stainless steel reactor. This reactor employed an air-operated stirrer with a three bladed propeller and was set to operate at 900 rpm for the duration of a polymerization run. The reactor was also encased in a steel jacket with supply lines leading to a heat exchanger unit that was, in turn, connected to cooling water and a steam line, allowing for temperature control.

Stock solutions of metallocene compounds were typically prepared in 1 mg metallocene per 1 mL toluene concentrations. Exceptions are stock solutions for entries 13 and 14 in Table 3 which were prepared as 1 mg metallocene per 1 mL of 1M TIBA (in hexanes) stock solutions.

A typical polymerization procedure is as follows. The initiation of the charging sequence to the reactor was through an opened charge port while venting with isobutane vapor. One (1) mL of 1M solution of TIBA in hexanes was injected quickly followed by addition of chemically-treated solid oxide in the amount shown in Table 3, followed by both metallocene stock solutions in the amounts desired to achieve the charge indicated in Table 3. The charge port was closed and the amount of 1-hexene indicated in Table 3 and 2 liters of isobutane backed by nitrogen pressure were added. The contents of the reactor were stirred and heated to the desired run temperature, and ethylene was then introduced along with the desired amount of 1-hexene, if used. A mass flow unit allowed the pressure to quickly climb to within 50 psi of the desired run pressure and allowed the smooth transition of ethylene flow until the specified pressure and temperature levels were achieved. These temperature and pressure levels were maintained for the duration of the run. At the completion of the run time the ethylene flow was stopped and the reactor pressure was slowly vented off. When the pressure and temperature were safely low, the reactor was opened and the granular polymer powder collected. Activity was specified as either grams of polymer produced per gram of chemically-treated solid oxide or transition metal charged, per hour. Representative experimental data employing the invention to prepare polyethylene and ethylene-1-hexene copolymers are provided in Table 3.

EXAMPLE 7

Resin Synthesis

The polyethylene resins of the present invention were prepared using the metallocene-based catalyst systems disclosed herein, examples of which are included in Tables 1–3. The resins presented in Tables 1–2 are copolymers of ethylene and 1-hexene comonomer which were copolymerized in the Phillips type slurry-loop pilot plant. Ethylene copolymers were prepared in a continuous particle form process (also known as a slurry process) by contacting the catalyst of the present invention with ethylene and 1-hexene comonomer. The polymerization medium and polymerization temperature are thus selected such that the copolymer is produced in the form of solid particles and is recovered in that form. General polymerization reaction details are as follows.

Ethylene was dried over activated alumina was used as the monomer. Isobutane that had been degassed by fractionation and dried over activated alumina was used as the diluent.

The general preparation of the metallocene solutions was carried out as follows. The amounts of metallocenes, solvents, and alkyls shown in Table 1 were charged, under nitrogen, to a steel vessel, and diluted with isobutane to give a total weight of 40 pounds. These catalysts solutions were then feed to the precontactor as described below.

The polymerization reactor was a liquid-full 15.2 cm diameter pipe loop having a volume of 23 (87 liters) or 27 gallons. The fluorided silica-alumina, the 0.1% triethylaluminum solution in isobutane, the metallocene solution or solutions prepared as indicated above, and a portion of the total isobutane diluent were all fed to the reactor through a precontacting vessel (0.5 or 2.0 Liters), where the three ingredients contacted each other at room temperature for about 10 to about 30 minutes, before entering the reaction zone. The precontactor was a stirred, Autoclave Engineers Magnadrive reactor with a volume of either 0.5 or 2.0 Liters, which fed directly into the loop reactor. The chemically treated solid oxide (CTSO) was added to the precontactor through a 0.35 cc circulating ball-check feeder using a small isobutane flow, as indicated herein. The reactor pressure was about 4 Mpa (about 580 psi). The reactor temperature was varied over a range, from about 65° C. to about 110° C., as indicated. The polymerization reactor was operated to have a residence time of 1.25 hours. At steady-state conditions the total isobutane feed rate was about 46 liters per hour, the ethylene feed rate was about 30 lbs/hr, and the 1-hexene feed rate was varied to control the density of the polymer product. Ethylene concentration in the diluent was from about 14 to about 20 mole percent. Catalyst concentrations in the reactor are such that the CTSO system content typically ranges from 0.001 to about 1 weight percent based on the weight of the reactor contents. Polymer was removed from the reactor at the rate of about 25 lbs per hour and recovered in a flash chamber. A Vulcan dryer was used to dry the polymer under nitrogen at a temperature from about 60° C. to about 80° C.

To prevent static buildup in the reactor, a small amount (<5 ppm relative to diluent) of a commercial antistatic agent sold as Stadis 450 was usually added. The polymer fluff was subsequently extruded off-line into pellets on a Werner & Pfleidder ZSK-40 twin-screw extruder in the absence of any stabilization additives.

For the data presented in Tables 1–2 and Examples 8–14, four separate catalyst systems were employed. As shown in Table 1, the first catalyst system was a single metallocene catalyst, and resins from this catalyst are designated with the prefix "SC" to denote a single catalyst. Tables 1 and 2 also indicates that the next three catalyst were dual-metallocene catalyst, using different pairs of metallocene catalysts which were employed by combining the catalysts in desired ratios in the reactor prior to polymerization. The resins from these dual-metallocene systems are designated with the prefixes "DC-A", "DC-B" and "DC-C" to denote dual-metallocene systems and distinguish the three systems. Further, the resins themselves are labeled numerically thereafter for ease of identification, for example, SC-1, SC-2, DC-A-1, DC-B-1, and so forth. A commercially available HP-LDPE, PE4517, from Chevron Phillips Chemical Co. LP, was used as a control for all the trials.

The basic descriptions in terms of melt index and density for all the experimental resins along with the catalyst system identification are provided in Tables 2 and 3. Generally, the experimental resins ranged in density from about 0.918 to about 0.925 g/cm$^3$ and ranged in MI from about 4 g/10 min to about 26 g/10 mm.

EXAMPLE 8

Single Metallocene Catalyst Resins

As seen in FIGS. 1–4, all the single catalyst-produced resins labeled SC-1 through SC-5 generally exhibited higher extruder pressures, motor loads, and neck-in as compared to the commercially available HP-LDPE control, labeled as PE4517 (from Chevron Phillips Chemical Co. LP). Thus, SC-1 through SC-3 were similar to PE4517 in MI. However, they exhibited almost twice the extrusion pressure and 50% higher motor load as compared to the PE4517 resin. The neck-in of these resins was higher at 300 ft/min line speed and exhibited rupture prior to reaching the 900 ft/min line speeds. The resins SC-4 and SC-5 were higher in MI as compared to PE4517 and as a result their extruder pressures and motor loads were closer to that of PE4517. However, they exhibited higher neck-in at 300 ft/min. Further, SC-4 also exhibited rupture prior to reaching 900 ft/min, whereas SC-5 was able to be drawn down to 900 ft/min line speed as may be seen from FIG. 4. At this higher line speed, however, it had nearly three times the neck-in of PE4517.

While the data plotted in FIG. 5 was limited to 900 ft/min, an attempt was made with all the resins to draw down to 1,800 ft/min, which was the maximum line speed capability of the machine employed. The results of the neck-in at intermediate line speeds (shown graphically in FIG. 5) and the maximum line speed attainable with each resin was tabulated in Table 2. These results for the single catalyst group of resins did not appear to show a consistent trend. Thus, SC-1, SC-2, and SC-3 tore prior to 900 ft/min and SC-4 tore at 1,750 ft/min, whereas SC-5 tore at 1,150 ft/min. While not intending to be bound by theory, it is possible that these results may have, in part, been confounded due to small differences in the levels and sizes of gels, which were present to varying degrees in all these experimental resins. These gels, which are essentially semi-rigid particles in the melt, can possibly initiate edge-tear at high line speeds as the melt curtain thickness decreases.

It is further noted that none of the experimental resins evaluated had any edge-weave or draw resonance up to their respective maximum line speeds. This observation is noted since non-HP-LDPE resins typically suffer from significant edge-weave and draw resonance at higher line speeds. See, for example, E. H. Roberts, P. J. Lucchesi and S. J. Kurtz, "New Process For The Reduction of Draw Resonance in Melt Embossing and Extrusion Coating", SPE ANTEC Conf. Proc., 104 (1985), which is incorporated herein by reference in its entirety.

Thus, these results indicate that these particular single catalyst resins did not provide the optimum balance of extrusion and neck-in characteristics that were comparable to the PE4517 resin as desired. In one aspect, they appeared to show a systematic trade-off with low MI resins having high extruder pressures and motor loads with reasonable neck-in and higher MI resins having lower pressures and motor loads but with much higher neck-in.

EXAMPLE 9

Dual-Metallocene Catalyst Resins

Resins were made using dual-metallocene catalysts, which demonstrate, among other things, the broadening of the molecular weight distribution and enhancement of the shear-thinning response of the resulting resins, as compared to the resins produced from the single metallocene catalysts.

In this Example, three different dual-metallocene catalyst pairs of the present invention were investigated, as recorded in Table 2. The properties of the resins resulting from these dual-metallocene catalysts are illustrated in FIGS. 1–15 and Tables 4–6. The dual-metallocene resins, while showing some differences among them, were generally better in overall performance as compared to the single catalyst resins. For example, comparing the data for the dual-metallocene resins DC-A-1, DC-B-1 and DC-C-1 with that of the single-metallocene resins SC-1, SC-2 and SC-3, which are closest in MI to one another, illustrate these differences. Generally, the dual-metallocene catalyst resins exhibited lower extruder head pressures, lower motor loads, lower neck-in, and better draw-down as seen in FIGS. 1–5, respectively.

The performance of the two resins from system C, namely the DC-C-1 and DC-C-2 resins, was especially noteworthy in comparison to the HP-LDPE control PE4517 resin. Resin DC-C-1, which is nominally the same MI as PE4517, exhibits very comparable, if not better, extruder pressure and motor load characteristics and comparable neck-in at 300 ft/min to the PE4517, as illustrated in FIG. 1–3. However, the DC-C-1 resin did not have good draw-down and tore off at 600 ft/min (see Table 4). Resin DC-C-2, which is higher in MI (~12 MI) than PE4517, exhibited clearly lower extruder pressure, lower motor load, and quite comparable neck-in at both 300 ft/min and 900 ft/min line speeds as compared to the PE4517 resin.

It is possible that a slight adjustment of the MI of resin DC-C-2 from ~12 MI down to ~8–10 MI could reasonably be expected to improve neck-in further, and bring it closer to that of PE4517, with comparable extruder pressure and motor load characteristics as suggested by careful inspection of FIGS. 1–4 together. It was observed that DC-C-2 tore at 1,000 ft/min line speed as compared to PE4517 which did not tear even at the 1,800 ft/min maximum line speed. However, this feature would not be expected to adversely affect its commercial applicability, as commercially-practiced extrusion coating line speeds are typically in the range of about 500–900 ft/min.

EXAMPLE 10

Extrusion Coating Properties

Basic extrusion coating physical properties were tested for all these resins shown in Table 4 and compared to those of the HP-LDPE control resin PE4517. The results of these tests are shown as follows. Elmendorf Tear strengths are illustrated in FIG. 6, Spencer impact strength is illustrated in FIG. 7, burst adhesion is illustrated in FIG. 8, hot tack strength is illustrated in FIG. 9, and ultimate seal strength is illustrated in FIG. 10.

As demonstrated in FIG. 6, the experimental resins prepared according to the Examples were either largely equivalent or better in terms of the MD and TD tear resistance than the PE4517 resin. A comparison of the data in FIG. 6 with that in Table 2 does not appear to indicate any obvious tear property dependence on density or melt index by itself, within or among the different systems investigated.

Figure 7:
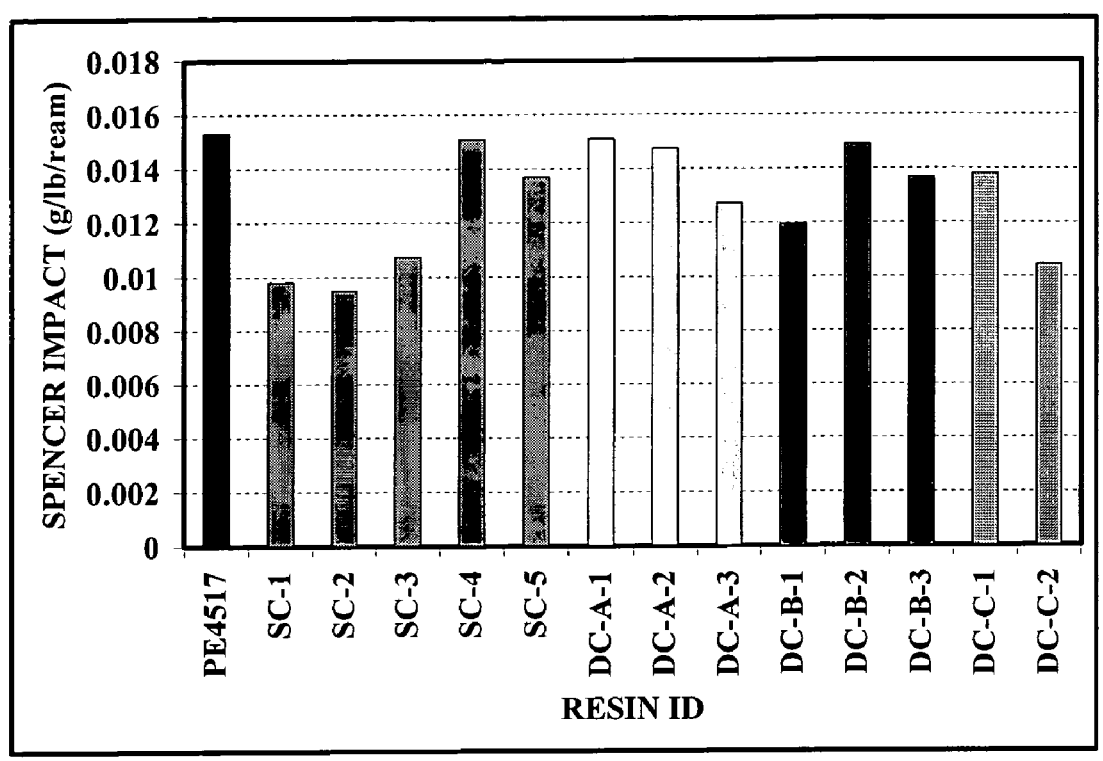
FIG. 7 provides comparative data for the Spencer impact strength of resins or the present invention, tested with Kraft paper substrate.
Figure 8:
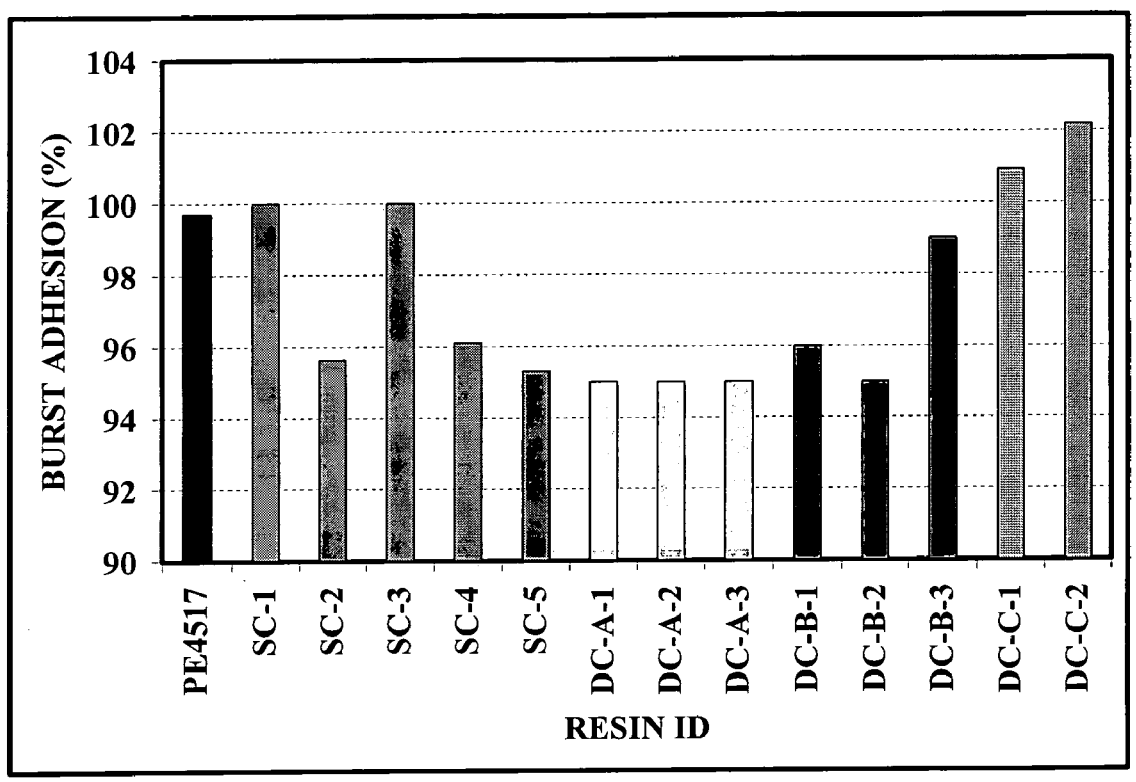
FIG. 8 provides comparative data for the burst adhesion strength of resins of the present invention, tested with Kraft paper substrate.

The Spencer impact strength in FIG. 7 similarly shows largely comparable performance of the experimental resins with that of PE4517. The burst adhesion in FIG. 8 shows some variability but again no apparent trend with either density or melt index.

The hot tack strength data for the experimental resins is shown in FIG. 9. With the possible exception of resin SC-1, which was one of the highest (0.934 g/cm$^3$) density resins prepared according to this invention, the other experimental resins show hot tack strength behavior that appears to be largely comparable to that of PE4517. The data points for PE4517, DC-C-1 and DC-C-2 are connected by lines for easier comparison and show that hot tack initiation temperatures, defined as the temperature at which 1N/25 mm strength is developed, appears to be even slightly lower for DC-C-1 and DC-C-2 than for PE4517. The ultimate seal strength data in FIG. 10 illustrates that by and large the experimental resins exhibit comparable seal initiation temperatures and seal strengths as compared to those of PE4517. A closer comparison of PE4517, DC-C-1 and DC-C-2 further demonstrates that while the ultimate seal strength for PE4517 appears to plateau at around 3.2 lbf/in, those for DC-C-1 and DC-C-2 exhibit generally higher plateau strengths around 4–4.5 lbf/in.

EXAMPLE 11

Molecular Weight and Rheological Characteristics

Absolute molecular weight data from SEC-MALS, showing weight average molecular weight ($M_w$), number average molecular weight ($M_n$), z-average molecular weight ($M_z$) and molecular weight distribution ($M_w/M_n$) are presented in Table 5. The rheological characteristics of the resins of this invention, expressed in terms of the Carreau-Yasuda empirical model parameters, are presented in Table 6. All of the experimental resins shown in Tables 2 and 3, and the HP-LDPE control resin PE4517, were all determined to contain varying degrees of long chain branching from the SEC-MALS data.

In order to maintain visual clarity, SEC-MALS molecular weight and long chain branching data for only one representative resin from each catalyst system, namely A, B, or C, along with the PE4517 resin, is shown in FIGS. 11a and 11b, respectively. As illustrated in FIG. 11a, PE4517 had the greatest polydispersity as compared to the A, B, or C resins of this invention, as seen by the significant "hump" on the high molecular weight end. The experimental resins were all generally much narrower in polydispersity, but also all exhibited a high molecular weight "hump". As illustrated in FIG. 11b, the PE4517 resin was considerably higher in the degree of long chain branching level across the molecular weight range as compared to all the resins of the present invention. The LCB data in FIG. 11b were not discernible below $M_w$<about 1E5 g/mol by the SEC-MALS setup used in this invention due to limits of resolution. Thus while LCB in all the polymers is likely present at lower $M_w$, only the high $M_w$ end of the spectrum can be observed. A linear PE standard is also presented in FIG. 11b, whose LCB level was determined to be essentially zero as expected.

The results of FIGS. 11a and 11b demonstrated that in comparison to the PE4517 resin, the experimental resins generally: 1) are narrower in polydispersity; 2) lack the very high end of the $M_w$; and 3) contain only about one third to one fourth the level of LCB.

Further support to the presence of long chain branching in these polymers comes from the elevated flow activation energies, Ea, shown for select representative resins in Table 6. Linear PE resins generally exhibit flow activation energies in the range of about 28–33 kJ/mol. See: P. Wood-Adams and S. Costeux, "Thermorheological Behavior of Polyethylene: Effects of Microstructure and Long Chain Branching", *Macromol* 34, 6281–6290 (2001), which is incorporated herein by reference in its entirety. The Ea values of closer to 40 kJ/mol exhibited by the select resins in Table 6 indicate the presence of long chain branching. Furthermore, the PE4517 exhibits a fairly high Ea ~54 kJ/mol, consistent with the literature (P. Wood-Adams and S. Costeux, "Thermorheological Behavior of Polyethylene: Effects of Microstructure and Long Chain Branching", *Macromol.* 34, 6281–6290 (2001)). However, while elevated Ea values above ~33 kJ/mol have consistently been associated with the presence of long chain branching, as opposed to a completely linear polymer, the connections between a certain value of Ea and the type or degree of long chain branching are still not clearly established.

The experimental resins were also characterized using Nuclear Magnetic Resonance (NMR). These results appear to show only "Y" type branches, also referred to in the literature as 3-arm star-type branching. In contrast, HP-LDPE is believed to have a more complex, random multi-branched or branch-on-branch "tree-like" long chain branching architecture, as a result of the high-pressure, free-radical polymerization process. See: T. C. B. McLeish, "Towards a Molecular Rehology of LDPE", Xth Intl. Cong. Rheo., Sydney, Vol. 2, 115 (1988); F. Beer, G. Capaccio and L. J. Rose, "High Molecular Weight Tail and Long-Chain Branching in Low-Density Polyethylenes", J. Appl. Polym. Sci., 80, 2815–2822 (2001); and N. J. Inkson, T. C. B.

McLeish, O. G. Harlen and D. J. Groves, "Predicting low density polyethylene melt rheology in elongational and shear flows with "pom-pom" constitutive equations", J. Rheo., 43(4), 873 (1999); each of which is incorporated herein by reference in their entireties. Therefore, the differences among the various resins produced according to the present invention, and the reasons for their observed performance differences, are believed to be due largely to differences in the $M_w$, molecular weight distribution (MWD), and long chain branching levels, rather than the type of long chain branching architecture.

The specifics of the long chain branching architecture, which are still not well-understood or well-characterized, have been shown to affect the shear viscosity and elongational viscosity response of polyethylenes. See: J. Janzen and R. H. Colby, "Diagnosing long-chain branching in polyethylenes", J. Mol. Struct., 485–486, 569–584 (1999); R. G. Larson, "Combinatorial Rheology of Branched Polymer Melts", Macromol., 34, 4556–4571 (2001); and D. J. Lohse et al., "Well-Defined, Model Long Chain Branched Polyethylene. 2. Melt Rheological Behavior", Macromol., 35, 3066–3075 (2002); each of which is incorporated herein by reference in their entireties.

EXAMPLE 12

Motor Load and Extruder Head Pressure

Because the flow in the extruder is largely shear flow, it is reasonable to expect that the motor load and extruder head pressure characteristics to be functions of the shear viscosity. The average shear rate in the extruder was estimated to be about 100 1/s. Therefore, the motor load and extruder pressure drop were examined as a function of the measured shear viscosity at 100 1/s shear rate, the results of which are shown in FIGS. 12a and 12b, respectively. There is a reasonably good correlation of both motor load and extruder pressure with the shear viscosity. The shear viscosity at 100 1/s was based on the rheology data at 190° C., while the extrusion coating was performed at much higher temperatures with melt temperatures close to 320° C. Therefore it is noted that the actual motor load and extruder pressures correlate quite well with the viscosity at 190° C. as evident from FIGS. 12a and 12b. However, despite these temperature differences, it is believed that the correlations in FIG. 12 could be a consequence of the fact that the flow activation energies for the resins of FIGS. 12a and 12b prepared according to this invention were largely similar, varying from about 38 to about 41 kJ/mol as compared to 54 kJ/mol for PE4517. As a result, the relative change in viscosity with temperature from about 190° C. to about 320° C. for all the experimental resins might be expected to be approximately the same and therefore the viscosity data in FIG. 12 at 320° C. would be lower by about the same extent for each resin. A recent report suggested that it may be possible to predict certain extrusion coating processing behaviors at production conditions using rheological measurements conducted at lower deformation rates and lower temperatures. See: N. Toft and M. Rigdahl, "Extrusion Coating with Metallocene-Catalysed Polyethylenes", Int. Poly. Proc., XVII(3), 244–253 (2002); which is incorporated by reference herein in its entirety.

Further examination of the data in FIG. 12 with respect to the four different resin/catalyst systems investigated revealed that the single catalyst resins, at equivalent MI, exhibited higher high-shear viscosities and hence higher motor loads and pressure drops. In contrast, the dual-catalyst resins exhibited lower high-shear viscosities and hence lower motor loads and pressure drops. The data in FIG. 12 thus indicated that the expected extrusion characteristics, namely motor load and head pressure, may be adjusted by controlling the shear flow viscosity behavior at the prevailing processing conditions. Thus, the greater the shear-thinning behavior for a given MI, the lower the expected motor load and head pressure should be.

EXAMPLE 13

Neck-In Behavior

FIG. 13a illustrates the neck-in per side at 300 ft/min, shown on a semi-log plot as a function of the zero shear viscosity estimated as described herein. Thus, 300 ft/min was the lowest line speed chosen because data were available for all resins at this speed. In FIG. 13b, the neck-in per side at 300 ft/min is shown as a function of the Recoverable Shear Parameter (RSP), a useful measure of the polymer melt elasticity, which was determined from the dynamic frequency sweep data at 0.03 1/s frequency, by the method described in A. M. Sukhadia, D. C. Rohlfing, M. B. Johnson and G. L. Wilkes, "A Comprehensive Investigation of the Origins of Surface Roughness and Haze in Polyethylene Blown Films", J. Appl. Polym. Sci., 85, 2396–2411 (2002), which is hereby incorporated by reference in its entirety. Both the zero shear viscosity and RSP values in FIG. 13 were based on rheology data obtained at 190° C. All the resins prepared according to the present invention appeared to fall substantially on a single trendline, with neck-in systematically decreasing as the zero shear viscosity increased (FIG. 13a), or as the melt elasticity increased (FIG. 13b). In contrast to this observed behavior, the PE4517 resin was clearly off the trendline in both cases.

FIG. 5 illustrates the neck-in as a function of increasing line speed, or higher draw-down, and demonstrates that the neck-in of all of the single catalyst resins SC-1 through SC-5 showed either a flat or increased neck-in behavior with increasing line speed. In contrast, the neck-in of PE4517 and each of the dual-metallocene resins, with the exception of resin DC-A-3, showed generally lower neck-in as line speed increased. These data illustrate that the dual-metallocene systems of the present invention generated resin molecular architectures that exhibited strain-hardening responses similar to that observed with HP-LDPE resins.

For conventional HP-LDPE resins such as PE4517, strain-hardening behavior in extension is well established. See: K. Xiao, C. Tzoganakis and H. Budman, "Modification of Rheological Properties of LDPE for Coating Applications", Ind. Eng. Chem. Res., 39, 4928–4932 (2000); and H. M. Laun, H. Schuch, "Transient Elongational Viscosities and Drawability of Polymer Melts", J. Rheo., 33, 119 (1989); both of which are incorporated herein by reference in their entireties. This strain-hardening causes an increased resistance to deformation as draw-down is increased, thereby resulting in a lower neck-in as clearly observed from FIG. 5. On the assumption that the resins of the present invention all exhibit a substantially similar type of LCB architecture as disclosed herein, and furthermore vary in degree of LCB level by only small amounts (see FIG. 11b), it would appear that the differences in the neck-in behavior is considerably influenced by the high $M_w$ fraction. Table 5 illustrates that all the experimental resins actually vary in a narrow range of molecular weight characteristics, primarily in the $M_w$ and $M_z$ characteristics. Specifically, the z-average molecular weight, $M_z$, at constant MI, appears to increase in proceeding from the single catalyst SC system, to the dual catalyst DC-A system, to the dual catalyst DC-B system, to the dual catalyst DC-C system. This observation is seen further by comparing the $M_w$ and $M_z$ data in Table 5 for resins SC-2, DC-A-1, DC-B-1 and DC-C-1, which are all close to ~5 MI, and the data in FIGS. 11a and 11b. Upon closer inspection, it appears that the resin DC-C-1, which had the lowest neck-in among the experimental resins, is actually lower in LCB content compared to DC-A-1 and DC-B-1. However, DC-C-1 is higher in $M_z$ than the other resins of the present invention. Therefore, while not intending to be bound by theory, it is possible that the resins of the present invention exhibit the observed differences in neck-in not as a result of differences in long chain branching type, but differences in the higher $M_w$ fractions. In contrast, the fact that PE4517 appears not to follow the general trends of the experimental resin series with regard to neck-in (FIGS. 13a and 13b) may be attributed to differences in degree as well as the type of long chain branching as disclosed herein.

General support for the possible differences in LCB architecture between the HP-LDPE control resin PE4517 and the resins of the present invention may be found in C. Gabriel and H. Munstedt, "Strain hardening of various polyolefins in uniaxial elongation flow", *J. Rheo.*, 47(3), 619–630, May/June (2003), which is incorporated herein by reference in its entirety. Gabriel and Munstedt identified some consistent correlations between the type of strain hardening behavior, the zero shear viscosity relative to linear polymers and potentially different long chain branching architectures. In particular, they found that linear polyethylenes (absent LCB) exhibited no strain hardening and furthermore satisfied the well-established $\eta_0 \sim (M_w)^{3.4}$ relationship. Polyethylenes with small amounts of LCB exhibited strain hardening behavior that either did not depend on elongational rate or that decreased with increasing elongational rate. These polymers exhibited elevated zero shear viscosities compared to linear polymers of equivalent molecular weight, which was the case for all the experimental polymers of this work. A HP-LDPE, in contrast, exhibited strain hardening behavior that increased with increasing elongational rate and this polymer, as is typically the case for HP-LDPE, exhibited zero shear viscosity that is lower in comparison to a linear PE of the same weight average molecular weight. PE4517, the HP-LDPE used as a comparison for the resins prepared according to this invention, fits this behavior. Since the elongational viscosity at low elongation rates is approximated by $3\eta_0$ (See: C. Gabriel and H. Munstedt, "Strain hardening of various polyolefins in uniaxial elongation flow", J. Rheo., 47(3), 619–630, May/June (2003); and H. Munstedt and H. M. Laun, "Elongational properties and molecular structure of polyethylene melts", Rheol. Acta., 20(3), 211, May/June (1981); each of which is incorporated by reference herein in its entirety), we might reasonably expect that the elongational viscosity of the polymers prepared according to this invention would rank in the same order as the zero shear viscosity. In other words, the abscissa in FIG. 13a could be considered as a reasonable proxy for the elongational viscosity as well. Thus, the neck-in for the resins of this invention decreases as the elongational viscosity increases. Furthermore, the PE4517 likely exhibits much lower neck-in compared to the experimental resins at equivalent elongational viscosity (FIG. 13a) due to its greater strain-hardening behavior that increases with increasing line speed (elongational rate). Further, the significance of the high molecular mass component in enhancing strain-hardening behavior was also shown clearly in C. Gabriel and H. Munstedt, J. Rheo., May/June (2003) cited herein, which could readily explain the differences observed within the experimental series here.

EXAMPLE 14

Draw-Down Ability

The maximum line speed attainable with each resin is shown in FIG. 14 as a function of the low shear viscosity at 0.03 l/s frequency, obtained from the dynamic frequency sweep data at 190° C. A rough trend is observed of decreasing maximum line speed achieved with increasing low shear viscosity. Note that 1800 ft/min was the maximum line speed capability and therefore draw-down failure is higher than that value. Although this particular trend is not particularly strong, the increase in draw-down ability with decreasing shear viscosity has been noted. See: N. Toft and M. Rigdahl, "Extrusion Coating with Metallocene-Catalysed Polyethylenes", Int. Poly. Proc., XVII(3), 244–253 (2002); which is incorporated by reference herein in its entirety. The PE4517 response is different from that of the resins prepared according to the present invention, as indicated in FIG. 14.

TABLE 1

Conditions used to produce the catalyst solutions for the preparation of the resins of the present invention.

| Resin ID | High Mw Producing Metallocene No. 1 | Amount (grams) | Solvent | Amount (grams) | Pretreatment Metal Alkyl | Amount (grams) | 1-Hexene (grams) |
|---|---|---|---|---|---|---|---|
| SC-1 | 1 | 2.05 | Toluene | 3175 | 93 wt % TEA | 33.4 | 0 |
| SC-2 | 1 | 2 | Toluene | 3100 | 93 wt % TEA | 34 | 0 |
| SC-3 | 1 | 2.05 | Toluene | 3175 | 93 wt % TEA | 33.4 | 0 |
| SC-4 | 1 | 1.0 | heptane | 2432 | 93 wt % TEA | 20.9 | 103 |
| SC-5 | 1 | 1.0 | heptane | 2432 | 93 wt % TEA | 20.9 | 103 |
| DC-A-1 | 1 | 1.029 | Toluene | 3146 | 93 wt % TEA | 17 | 0 |
| DC-A-2 | 1 | 1.029 | Toluene | 3146 | 93 wt % TEA | 17 | 0 |
| DC-A-3 | 1 | 1.015 | Toluene | 2421 | 93 wt % TEA | 17 | 0 |
| DC-B-1 | 3 | 1.02 | Toluene | 2461 | 93 wt % TEA | 12.5 | 110 |
| DC-B-2 | 3 | 1.02 | Toluene | 2461 | 93 wt % TEA | 12.5 | 110 |
| DC-B-3 | 3 | 1.02 | Toluene | 2461 | 93 wt % TEA | 12.5 | 110 |
| DC-C-1 | 4 | 2.00 | heptane | 1817 | 93 wt % TEA | 33.4 | 140 |
| DC-C-2 | 4 | 2.00 | heptane | 1817 | 93 wt % TEA | 33.4 | 140 |

TABLE 1-continued

Conditions used to produce the catalyst solutions for the preparation of the resins of the present invention.

| Resin ID | Low Mw Producing Metallocene No. 2 | Amount (grams) | Solvent | Amount (grams) | Metal Alkyl | Pretreatment Amount (grams) | 1-Hexene (grams) |
|---|---|---|---|---|---|---|---|
| SC-1 | — | | | | | | |
| SC-2 | — | | | | | | |
| SC-3 | — | | | | | | |
| SC-4 | — | | | | | | |
| SC-5 | — | | | | | | |
| DC-A-1 | 2 | 0.25 | Toluene | 3163 | 0 | 0 | 0 |
| DC-A-2 | 2 | 0.25 | Toluene | 3163 | 0 | 0 | 0 |
| DC-A-3 | 2 | 1.01 | Toluene | 3193 | 0 | 0 | 0 |
| DC-B-1 | 2 | 1.02 | Toluene | 3003 | 0 | 0 | 0 |
| DC-B-2 | 2 | 1.02 | Toluene | 3003 | 0 | 0 | 0 |
| DC-B-3 | 2 | 1.02 | Toluene | 3003 | 0 | 0 | 0 |
| DC-C-1 | 2 | 1.03 | Heptane | 2285 | 0 | 0 | 0 |
| DC-C-2 | 2 | 1.03 | Heptane | 2285 | 0 | 0 | 0 |

Metallocene 1 is rac-$C_2H_4(\eta^5$-Ind$)_2$ZrCl$_2$
Metallocene 2 is rac-Me$_2$Si$(\eta^5$-n-PrCp$)_2$ZrCl$_2$
Metallocene 3 is rac-Me$_2$Si$(\eta^5$-Ind$)_2$ZrCl$_2$
Metallocene 4 is Me(octyl)Si$(\eta^5$-Flu$)_2$ZrCl$_2$

TABLE 2

Non-limiting examples of the catalysts, polymerization conditions, and resulting resin properties.

| Resin ID | PE4517 | SC-1 | SC-2 | SC-3 | SC-4 | SC-5 | DC-A-1 | DC-A-2 |
|---|---|---|---|---|---|---|---|---|
| Trial No. | | 1 | 1 | 1 | 3 | 3 | 2 | 2 |
| Catalyst System | Commercial HP-LDPE | Single | Single | Single | Single | Single | Dual-A | Dual-A |
| Density (g/cm3) | 0.923 | 0.934 | 0.924 | 0.924 | 0.918 | 0.918 | 0.925 | 0.925 |
| MI (g/10 min) | 5.1 | 3.8 | 4.6 | 5.0 | 7.3 | 9.1 | 6.6 | 14.0 |
| Metallocene | | 1 | 1 | 1 | 1 | 1 | 1 + 2 | 1 + 2 |
| Solid Acid | | FSA | FSA | FSA | FSA | FSA | FSA | FSA |
| Pretreatment AlR$_3$ (Al:Zr) | | TEA(15) | TEA(15) | TEA(15) | TEA(16) | TEA(16) | TEA(17)/none | TEA(17)/none |
| Olefin (Ole:Al) | | Toluene | Toluene | Toluene | 1-hexene | 1-hexene | none/none | none/none |
| Metallocene to Reactor (ppm) | | 0.40 | 0.40 | 0.41 | 0.58 | 0.54 | .40 + .18 | .30 + .19 |
| Autoclave Residence Time (min) | | | | | 5.52 | 5.51 | | |
| Cocatalyst Type | | TEA | TEA | TEA | TEA | TEA | TEA | TEA |
| (ppm) | | 10.86 | 11.31 | 11.12 | 21.74 | 21.70 | 12.39 | 12.32 |
| Rx Temp (° F.) | | 194.8 | 194.9 | 194.9 | 175.3 | 175.5 | 187.0 | 186.9 |
| Ethylene (mol %) | | 14.36 | 14.01 | 14.11 | 14.35 | 14.17 | 14.14 | 13.83 |
| 1-Hexene (mol %) | | 2.38 | 3.45 | 3.45 | 1.94 | 2.29 | 2.22 | 2.31 |
| C6=/C2= Mole Ratio | | 0.17 | 0.25 | 0.24 | 0.14 | 0.16 | 0.16 | 0.17 |
| H$_2$ (FRC) | | 23 | 3 | 3.5 | .002 mole % | .012 mole % | 0 | 0 |
| C2= Feed Rate (lb/hr) | | | | | 29.92 | 29.88 | 29.11 | 29.09 |
| 1-Hexene Feed Rate (lb/hr) | | 2.64 | 4.38 | 4.36 | 6.36 | 7.16 | 5.05 | 5.26 |
| Total iC4 Flow Rate (lb/hr) | | | | | 56.55 | 56.79 | 55.06 | 54.91 |
| C4H6 Flow Rate (lb/hr) | | | | | 0.43 | 0.22 | | |
| Solids Conc. wt. % | | | | | 27.60 | 25.50 | 29.40 | 29.20 |
| PTO Solids Level vol. % | | | | | 68.07 | 72.33 | 57.83 | 56.53 |
| Polymer Production (lb/hr) | | | | | 26.47 | 25.33 | 26.72 | 26.53 |
| Pellet HLMI (dg/10 min) | | 152.89 | 127.72 | 131.67 | 208.06 | 255.73 | 224.46 | 400.97 |
| Pellet MI (dg/10 min) | | 3.80 | 4.64 | 5.01 | 7.29 | 9.13 | 6.62 | 14.00 |
| Pellet HLMI/MI | | 40 | 28 | 26 | 29 | 28 | 34 | 29 |
| Fluff HLMI (dg/10 min) | | 180.95 | 146.89 | 153.87 | 236.00 | 272.61 | 266.45 | 437.04 |
| Fluff MI (dg/10 min) | | 4.66 | 6.04 | 6.51 | 8.57 | 10.52 | 8.30 | 15.80 |
| Fluff HLMI/MI | | 39 | 24 | 24 | 28 | 26 | 32 | 28 |
| Density (pellets) (g/cc) | | 0.9348 | 0.9237 | 0.9240 | 0.9179 | 0.9182 | 0.9246 | 0.9250 |
| Mass Balance Productivity (lb/lb) | 2923 | 4071 | 4071 | 2055 | 3548 | 5097 | 5097 | |
| Ash Productivity (lb/lb) | 1408 | 1408 | 1351 | 2469 | 2155 | 6757 | 6579 | |
| Ash (wt %) | 0.071 | 0.071 | 0.074 | 0.0405 | 0.0464 | 0.0148 | 0.0152 | |

TABLE 2-continued

Non-limiting examples of the catalysts, polymerization conditions, and resulting resin properties.

| | Resin ID | | | | | |
|---|---|---|---|---|---|---|
| | DC-A-3 | DC-B-1 | DC-B-2 | DC-B-3 | DC-C-1 | DC-C-2 |
| | Trial No. | | | | | |
| | 2 | 2 | 2 | 2 | 3 | 3 |
| | Catalyst System | | | | | |
| | Dual-A | Dual-B | Dual-B | Dual-B | Dual-C | Dual-C |
| Density (g/cm3) | 0.925 | 0.926 | 0.923 | 0.923 | 0.925 | 0.922 |
| MI (g/10 min) | 23.1 | 8.3 | 16.7 | 25.5 | 5.5 | 12.3 |
| Metallocene | 1 + 2 | 3 + 2 | 3 + 2 | 3 + 2 | 4 + 2 | 4 + 2 |
| Solid Acid | FSA | FSA | FSA | FSA | FSA | FSA |
| Pretreatment   $AlR_3$ (Al:Zr) | TEA(17)/none | TEA(12)/none | TEA(12)/none | TEA(12)/none | TEA(17)/none | TEA(17)/none |
| Olefin (Ole:Al) | none/none | 1-hexene/none | 1-hexene/none | 1-hexene/none | 1-hexene/none | 1-hexene/none |
| Metallocene to Reactor (ppm) | .27 + .19 | .25 + .24 | .27 + .24 | .21 + .25 | .92 + .27 | .76 + .27 |
| Autoclave Residence Time (min) | | | | | 14.55 | 15.13 |
| Cocatalyst   Type | TEA | TEA | TEA | TEA | TEA | TEA |
| (ppm) | 12.37 | 11.63 | 12.08 | 12.11 | 13.13 | 13.07 |
| Rx Temp (° F.) | 186.9 | 185.0 | 185.3 | 185.1 | 175.2 | 175.1 |
| Ethylene (mol %) | 13.27 | 14.47 | 14.26 | 14.02 | 13.61 | 13.73 |
| 1-Hexene (mol %) | 2.37 | 2.69 | 3.38 | 3.30 | 1.40 | 1.51 |
| C6=/C2= Mole Ratio | 0.18 | 0.19 | 0.24 | 0.24 | 0.10 | 0.11 |
| $H_2$ (FRC) | 0 | 0 | 0 | 0 | 0 | 0 |
| C2= Feed Rate (lb/hr) | 29.09 | 26.42 | 28.14 | 28.87 | 30.04 | 30.01 |
| 1-Hexene Feed Rate (lb/hr) | 5.34 | 5.31 | 5.90 | 6.23 | 4.61 | 5.01 |
| Total iC4 Flow Rate (lb/hr) | 54.99 | 55.08 | 56.17 | 56.29 | 56.69 | 56.56 |
| C4H6 Flow Rate (lb/hr) | | | | | | |
| Solids Conc. wt. % | 30.50 | 29.60 | 28.80 | 28.60 | 28.00 | 29.60 |
| PTO Solids Level vol. % | 55.52 | 62.50 | 80.00 | 77.50 | 51.25 | 59.58 |
| Polymer Production (lb/hr) | 27.81 | 26.11 | 26.39 | 26.61 | 26.08 | 27.63 |
| Pellet HLMI (dg/10 min) | 585.82 | 274.42 | 432.46 | 569.66 | 196.63 | 292.91 |
| Pellet MI (dg/10 min) | 23.05 | 8.34 | 16.16 | 25.54 | 5.48 | 12.28 |
| Pellet HLMI/MI | 25 | 33 | 27 | 22 | 36 | 24 |
| Fluff HLMI (dg/10 min) | 635.38 | 348.52 | 485.88 | 640.31 | 299.28 | 480.23 |
| Fluff MI (dg/10 min) | 26.17 | 11.69 | 21.48 | 28.35 | 10.60 | 18.40 |
| Fluff HLMI/MI | 24 | 30 | 23 | 23 | 28 | 26 |
| Density (pellets) (g/cc) | 0.9248 | 0.9255 | 0.9234 | 0.9234 | 0.9263 | 0.9217 |
| Mass Balance Productivity (lb/lb) | 5097 | N/A | N/A | N/A | 3249 | 3249 |
| Ash Productivity (lb/lb) | 7194 | 5682 | 6579 | 6024 | 4348 | 4762 |
| Ash (wt %) | 0.0139 | 0.0176 | 0.0152 | 0.0166 | 0.023 | 0.021 |

Metallocene 1 is rac-$C_2H_4(\eta^5$-Ind$)_2ZrCl_2$
Metallocene 2 is rac-$Me_2Si(\eta^5$-n-PrCp$)_2ZrCl_2$
Metallocene 3 is rac-$Me_2Si(\eta^5$-Ind$)_2ZrCl_2$
Metallocene 4 is Me(octyl)Si(($\eta^5$-Flu$)_2ZrCl_2$
FSA is Fluorided Davison MS 13–110 silica/alumina; activated at 950 F.

TABLE 3

Non-limiting examples of the catalysts, polymerization conditions, and resulting resin properties.

| Run No. | Cat A | Cat B | Cat. A Wt (mg) | Cat B Wt (mg) | CTSO | support wt(mg) | cocat. (ml) | Ethyene (psig) | Time (min) | Temp (C) | Comon. Type | Comon. Wt(g) |
|---|---|---|---|---|---|---|---|---|---|---|---|---|
| 1 | 1 | 2 | 0.1 | 0.4 | FSA | 100 | TEA (1) | 450 | 30 | 80 | C6 | 35 |
| 2 | 1 | 2 | 0.03 | 0.2 | FSA | 200 | TEA (1) | 550 | 30 | 90 | C6 | 25 |
| 3 | 3 | 2 | 0.3 | 0.5 | FSA | 100 | TEA (1) | 450 | 30 | 80 | C6 | 50 |
| 4 | 3 | 2 | 0.75 | 0.5 | FSA | 100 | TEA (1) | 450 | 30 | 80 | C6 | 50 |
| 5 | 4 | 5 | 0.3 | 1 | FSA | 100 | TEA (1) | 550 | 30 | 90 | C6 | 20 |
| 6 | 4 | 5 | 0.5 | 1 | FSA | 100 | TEA (1) | 550 | 30 | 90 | C6 | 20 |
| 7 | 6 | 2 | 0.3 | 0.1 | FSA | 200 | TEA (1) | 550 | 30 | 90 | C6 | 10 |
| 8 | 6 | 2 | 1.2 | 0.1 | FSA | 200 | TEA (1) | 550 | 30 | 90 | C6 | 10 |
| 9 | 7 | 2 | 0.125 | 0.2 | FSA | 100 | TEA (1) | 450 | 30 | 80 | C6 | 50 |
| 10 | 7 | 2 | 0.125 | 0.32 | FSA | 100 | TEA (1) | 450 | 30 | 80 | C6 | 50 |
| 11 | 7 | 8 | 0.1 | 2 | FSA | 200 | TEA (1) | 550 | 30 | 90 | C6 | 20 |
| 12 | 7 | 8 | 0.3 | 1.2 | FSA | 200 | TEA (1) | 450 | 30 | 80 | C6 | 50 |
| 13 | 4 | 8 | 0.06 | 2 | FSA | 200 | TIBA (1) | 400 | 30 | 90 | C6 | 20 |
| 14 | 4 | 8 | 0.03 | 1 | FSA | 200 | TIBA (1) | 400 | 30 | 90 | C6 | 20 |

TABLE 3-continued

Non-limiting examples of the catalysts, polymerization conditions, and resulting resin properties.

| Run No. | Solid PE (g) | Productivity g/g | Activity (g/g/hr) | Support Activity (g/g/hr) | MI | HLMI | HLMI/MI | density | Mw | Mn | Mw\Mn |
|---|---|---|---|---|---|---|---|---|---|---|---|
| 1 | 127 | 253720 | 507440 | 2537 | 0.28 | 13 | 46 | 0.9142 | 196.4 | 21.2 | 9.254 |
| 2 | 199 | 863391 | 1726782 | 1985 | 18.9 | 487 | 24 | 0.9244 | 80.94 | 15.6 | 5.195 |
| 3 | 338 | 423100 | 846200 | 6769.6 | 19.4 | 267 | 14 | 0.9337 | 49.1 | 17.1 | 2.877 |
| 4 | 220 | 175816 | 351632 | 4395 | 0.87 | 38 | 44 | 0.9284 | 104.8 | 25.5 | 4.114 |
| 5 | 414 | 318769 | 637538 | 8288 | 1.92 | 40 | 21 | 0.9464 | | | |
| 6 | 288 | 191753 | 383506 | 5752 | 0.77 | 24 | 31 | 0.9447 | | | |
| 7 | 213 | 532225 | 1064450 | 2128 | 10.2 | 276 | 27 | | | | |
| 8 | 169 | 129761 | 259523 | 1686 | 0.26 | 46 | 180 | | | | |
| 9 | 266 | 818400 | 1636800 | 5319 | 4.17 | 120 | 29 | 0.9309 | 95.63 | 19 | 5.045 |
| 10 | 390 | 875280 | 1750561 | 7790 | 17.3 | 345 | 20 | 0.9318 | 67.51 | 17.7 | 3.806 |
| 11 | 236 | 112290 | 224580 | 2358 | 0.13 | 37 | 278 | | | | |
| 12 | 331 | 220373 | 440746 | 3305 | 0 | 0 | | 0.9479 | 246.2 | 77.7 | 3.167 |
| 13 | 67.53 | | 65562 | 675.3 | 0.1 | 46 | 316 | 0.94 | | | |
| 14 | 89 | | 178000 | 0.89 | 1.3 | 142 | 111 | 0.9401 | | | |

Catalyst 1 is rac-Me$_2$Si(2-Me-4-PhInd)$_2$ZrCl$_2$
Catalyst 2 is rac-Me$_2$Si(3-n-PrCp)$_2$ZrCl$_2$
Catalyst 3 is rac-C$_2$H$_4$(2-MeInd)$_2$ZrCl$_2$
Catalyst 4 is rac-Me$_2$Si(Ind)$_2$ZrCl$_2$
Catalyst 5 is Me$_2$Si(Me$_4$Cp)$_2$ZrCl$_2$
Catalyst 6 is Me(Ph)Si(Flu)$_2$ZrCl$_2$
Catalyst 7 is rac-Me$_2$Si(2-MeInd)$_2$ZrCl$_2$
Catalyst 8 is Me$_2$SiCp$_2$ZrCl$_2$
FSA is Fluorided Davison MS 13–110 silica/alumina; activated at 950 F.

TABLE 4

Comparison of neck-in as a function of line speed and maximum line speed.

| Resin ID | Neck-in @ 300 ft/min (in/side) | Neck-in @ 500 ft/min (in/side) | Neck-in @ 700 ft/min (in/side) | Neck-in @ 900 ft/min (in/side) | Maximum Line Speed (ft/min) |
|---|---|---|---|---|---|
| PE4517 | 2.72 | 2.25 | 2.25 | 2.10 | 1800 |
| SC-1 | 5.19 | 5.31 | — | — | 500 |
| SC-2 | 5.25 | 5.34 | 5.38 | — | 700 |
| SC-3 | 5.69 | 5.81 | 5.88 | — | 700 |
| SC-4 | 5.00 | 4.94 | — | — | 1150 |
| SC-5 | 5.60 | 5.57 | 5.93 | 5.63 | 1750 |
| DC-A-1 | 5.00 | 5.06 | 4.93 | 4.84 | 1000 |
| DC-A-2 | 6.43 | 6.50 | 6.25 | 6.19 | 1800 |
| DC-A-3 | 7.38 | 7.94 | 7.81 | 8.00 | 1800 |
| DC-B-1 | 4.38 | 4.25 | 4.06 | 3.89 | 1200 |
| DC-B-2 | 5.31 | 5.09 | 4.56 | 4.50 | 1800 |
| DC-B-3 | 6.44 | 6.31 | 6.13 | 5.75 | 1800 |
| DC-C-1 | 2.80 | 2.70 | — | — | 600 |
| DC-C-2 | 3.69 | 3.47 | 3.38 | 3.28 | 1000 |

TABLE 5

Absolute molecular weight data from SEC-MALS showing weight average molecular weight (Mw), number average molecular weight (Mn), polydispersity (Mw/Mn) and z-average molecular weight (Mz).

| Resin ID | Mw (kg/mol) | Mn (kg/mol) | Mw/Mn | Mz (kg/mol) |
|---|---|---|---|---|
| PE4517 | 286 | 14 | 20 | 2047 |
| SC-1 | 121 | 16 | 8 | 628 |
| SC-2 | 108 | 25 | 4 | 505 |
| SC-3 | — | — | — | — |
| SC-4 | 93 | 16 | 6 | 422 |
| SC-5 | 90 | 16 | 6 | 391 |
| DC-A-1 | 112 | 16 | 7 | 657 |
| DC-A-2 | 85 | 16 | 5 | 517 |
| DC-A-3 | — | — | — | — |
| DC-B-1 | 123 | 14 | 9 | 860 |
| DC-B-2 | 101 | 15 | 7 | 797 |
| DC-B-3 | 87 | 15 | 6 | 712 |
| DC-C-1 | 112 | 16 | 7 | 903 |
| DC-C-2 | 92 | 17 | 5 | 780 |

TABLE 6

Rheological characteristics showing Eta(0), the zero shear viscosity; Tau Eta, the characteristic melt relaxation time; 'a', the breadth parameter; RSP, the recoverable shear parameter; and Ea, the Flow Activation Energy.

| Resin ID | Eta(0) (Pa · s) | Tau Eta (s) | 'a' | RSP * 1000 | Ea (kJ/mol) |
|---|---|---|---|---|---|
| PE4517 | 3.30E+03 | 6.66E−02 | 0.392 | 103 | 54.2 |
| SC-1 | 7.92E+03 | 3.71E−02 | 0.249 | 198 | — |
| SC-2 | 3.52E+03 | 8.32E−03 | 0.285 | 110 | 39.9 |
| SC-3 | 2.94E+03 | 7.12E−03 | 0.294 | 99 | 38.5 |
| SC-4 | 1.97E+03 | 4.11E−03 | 0.286 | 90 | — |
| SC-5 | 1.53E+03 | 5.23E−03 | 0.323 | 71 | — |
| DC-A-1 | 3.59E+03 | 2.03E−02 | 0.278 | 144 | 41.2 |
| DC-A-2 | 1.18E+03 | 8.43E−03 | 0.334 | 76 | — |
| DC-A-3 | 6.18E+02 | 4.64E−03 | 0.367 | 47 | — |
| DC-B-1 | 1.10E+04 | 3.69E−02 | 0.174 | 296 | 40.9 |
| DC-B-2 | 2.28E+03 | 1.10E−02 | 0.221 | 185 | — |
| DC-B-3 | 1.07E+03 | 6.40E−03 | 0.254 | 131 | — |
| DC-C-1 | 1.32E+09 | 2.03E−04 | 0.033 | 492 | — |
| DC-C-2 | 1.59E+06 | 1.46E−06 | 0.046 | 393 | — |

We claim:

1. A catalyst composition comprising the contact product of at least one first metallocene compound, at least one second metallocene compound, at least one chemically-treated solid oxide, and at least one organoaluminum compound, wherein:
   a) the at least one first metallocene compound is selected from an ansa-metallocene having the following formula:

$(X^1)(X^2)(X^3)(X^4)M^1$,           i)

wherein $(X^1)$ and $(X^2)$ are jointly selected from a fluorenyl and a cyclopentadienyl, a fluorenyl and an indenyl, or two fluorenyls, any one of which can be substituted, unsubstituted, partially saturated, or any combination thereof; or $rac\text{-}(X^1)(X^2)(X^1)(X^4)M^1$,           ii)

wherein $(X^1)$ and $(X^2)$ are jointly selected from two indenyls, any one of which can be substituted, unsubstituted, partially saturated, or any combination thereof;
   wherein $M^1$ is selected from Ti, Zr, or Hf;
   wherein $(X^1)$ and $(X^2)$ are connected by a substituted or unsubstituted bridging group comprising:
   i) one atom selected from carbon, silicon, germanium, or tin, bonded to both $(X^1)$ and $(X^2)$; or
   ii) two contiguous carbon atoms in a chain, one end of which is bonded to $(X^1)$ and the other end of which is bonded to $(X^2)$; and
   wherein $(X^3)$; $(X^4)$; each substituent on the substituted cyclopentadienyl, the substituted indenyl, and the substituted fluorenyl; and each substituent on the substituted bridging group is independently selected from a hydrocarbyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, $-SO_2X$, $-OAlX_2$, $-OSiX_3$, $-OPX_2$, $-SX$, $-OSO_2X$, $-AsX_2$, $-As(O)X_2$, or $-PX_2$, wherein X is selected independently from halide, H, $NH_2$, OR, or SR, wherein R is a hydrocarbyl, or a substituted derivative thereof, any of which having from 1 to about 20 carbon atoms; a halide; or hydrogen;

b) the at least one second metallocene compound is an ansa-metallocene having the following formula:

$(X^5)(X^6)(X^7)(X^8)M^2$, wherein $M^2$ is selected from Ti, Zr, or Hf;
   wherein $(X^5)$ and $(X^6)$ are respectively a substituted cyclopentadienyl;
   wherein $(X^5)$ and $(X^6)$ are connected by a substituted or unsubstituted bridging group comprising:
   i) one atom selected from carbon, silicon, germanium, or tin, bonded to both $(X^5)$ and $(X^6)$; or
   ii) two contiguous carbon atoms in a chain, one end of which is bonded to $(X^5)$ and the other end of which is bonded to $(X^6)$; and
   wherein $(X^5)$ and $(X^6)$ are each optionally substituted with up to four substituents in addition to the bridging group;
   wherein $(X^7)$; $(X^8)$; each substituent on the substituted cyclopentadienyl; and each substituent on the substituted bridging group is independently selected from a hydrocarbyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, $-SO_2X$, $-OAlX_2$, $-OSiX_3$, $-OPX_2$, $-SX$, $-OSO_2X$, $-AsX_2$, $-As(O)X_2$, or $-PX_2$, wherein X is selected independently from halide, H, $NH_2$, OR, or SR, wherein R is a hydrocarbyl, or a substituted derivative thereof, any of which having from 1 to about 20 carbon atoms; a halide; or hydrogen; and c) the at least one chemically-treated solid oxide comprises a solid oxide treated with an electron-withdrawing anion.

2. The catalyst composition of claim 1, wherein the at least one organoaluminum compound has the following formula:

$Al(X^9)_n(X^{10})_{3-n}$;

wherein $(X^9)$ is a hydrocarbyl having from 1 to about 20 carbon atoms; $(X^{10})$ is selected from alkoxide or aryloxide having from 1 to about 20 carbon atoms, halide, or hydride; and n is a number from 1 to 3, inclusive.

3. The catalyst composition of claim 1, wherein:
   the solid oxide is selected from silica, alumina, silica-alumina, aluminum phosphate, heteropolytungstates, titania, zirconia, magnesia, boria, zinc oxide, mixed oxides thereof, or mixtures thereof; and
   the electron-withdrawing anion is selected from fluoride, chloride, bromide, phosphate, triflate, bisulfate, sulfate, or any combination thereof.

4. The catalyst composition of claim 1, wherein:
   a) the at least one first metallocene compound is selected from an ansa-metallocene having the following formula:

$(X^1)(X^2)(X^3)(X^4)M^1$,           i)

wherein $(X^1)$ and $(X^2)$ are jointly selected from a fluorenyl and a cyclopentadienyl, a fluorenyl and an indenyl, or two fluorenyls, any one of which can be substituted, unsubstituted, partially saturated, or any combination thereof; or $rac\text{-}(X^1)(X^2)(X^3)(X^1)M^1$,           ii)

wherein (X¹) and (X²) are jointly selected from two indenyls, any one of which can be substituted, unsubstituted, partially saturated, or any combination thereof;

wherein M¹ is selected from Zr or Hf;

wherein (X¹) and (X²) are connected by a bridging group selected from >CR¹₂, >SiR¹₂, or —CR¹₂CR¹₂—, wherein R¹ in each instance is independently selected from a linear, branched, substituted, or unsubstituted hydrocarbyl group, any one of which having from 1 to about 20 carbon atoms; or hydrogen;

wherein any substituent on (X¹), (X²), or R¹ is independently selected from a hydrocarbyl group, an oxygen group, a sulfur group, or a nitrogen group, any of which having from 1 to about 20 carbon atoms; a halide; or hydrogen; and wherein (X³) and (X⁴) are independently selected from alkoxide or aryloxide having from 1 to about 20 carbon atoms, halide, or hydride; and b) the at least one second metallocene compound is an ansa-metallocene having the following formula:

(X⁵)(X⁶)(X⁷)(X⁸)Zr, wherein (X⁵) and (X⁶) are respectively a substituted cyclopentadienyl;

wherein (X⁵) and (X⁶) are connected by a bridging group selected from >CR²₂, >SiR²₂, or —CR²₂CR²₂—, wherein R² in each instance is independently selected from a linear, branched, substituted, or unsubstituted hydrocarbyl group, any one of which having from 1 to about 20 carbon atoms; or hydrogen;

wherein (X⁵) and (X⁶) are each optionally substituted with up to four substituents in addition to the bridging group;

wherein any substituent on (X⁵), (X⁶), or R² is independently selected from a hydrocarbyl group, an oxygen group, a sulfur group, or a nitrogen group, any of which having from 1 to about 20 carbon atoms; a halide; or hydrogen; and wherein (X⁷) and (X⁸) are independently selected from alkoxide, aryloxide, or amide having from 1 to about 20 carbon atoms, halide, or hydride.

5. The catalyst composition of claim 1, wherein the at least one first metallocene compound is an ansa-metallocene having the following formula:

(X¹)(X²)(X³)(X⁴)M¹, wherein M¹ is selected from Zr or Hf;

wherein (X¹) and (X²) are jointly selected from a fluorenyl and a cyclopentadienyl or two fluorenyls, any one of which can be substituted or unsubstituted;

wherein (X¹) and (X²) are connected by a bridging group selected from >CR¹₂, >SiR¹₂, or —CR¹₂CR¹₂—, wherein R¹ in each instance is independently selected from a linear, branched, substituted, or unsubstituted hydrocarbyl group, any one of which having from 1 to about 20 carbon atoms; halide; or hydrogen;

wherein any substituent on (X¹), (X²), or R¹ is independently selected from a hydrocarbyl group, an oxygen group, a sulfur group, a nitrogen group, any one of which having from 1 to about 20 carbon atoms; or hydrogen; and wherein (X³) and (X⁴) are independently selected from alkoxide or aryloxide having from 1 to about 20 carbon atoms, halide, or hydride.

6. The catalyst composition of claim 1, wherein the at least one first metallocene compound is an ansa-metallocene having the following formula:

rac-(X¹)(X²)(X¹)(X⁴)Zr;

wherein (X¹) and (X²) are jointly selected from two indenyls, any one of which can be substituted or unsubstituted;

wherein (X¹) and (X²) are connected by a bridging group selected from >CR¹₂, >SiR¹₂, or —CR¹₂CR¹₂—, wherein R¹ in each instance is independently selected from a linear, branched, substituted, or unsubstituted hydrocarbyl group, any one of which having from 1 to about 20 carbon atoms; or hydrogen;

wherein any substituent on (X¹), (X²), or R¹ is independently selected from a hydrocarbyl group, an oxygen group, a sulfur group, a nitrogen group, any one of which having from 1 to about 20 carbon atoms; or hydrogen; and wherein (X³) and (X⁴) are independently selected from alkoxide or aryloxide having from 1 to about 20 carbon atoms, halide, or hydride.

7. The catalyst composition of claim 1, wherein the at least one first metallocene compound is selected from a compound of the following formula:

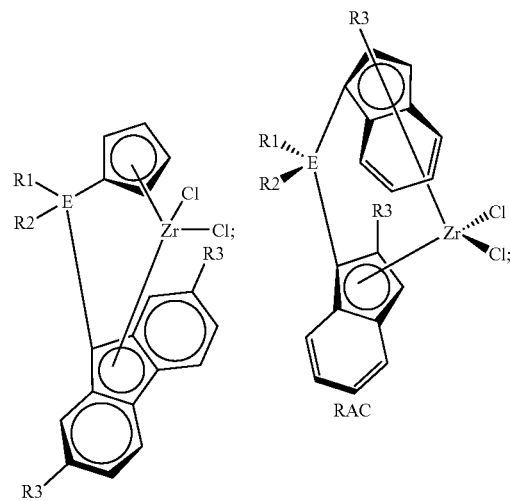

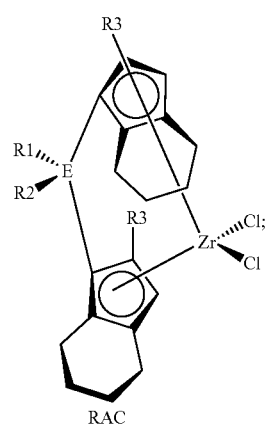

RAC

-continued
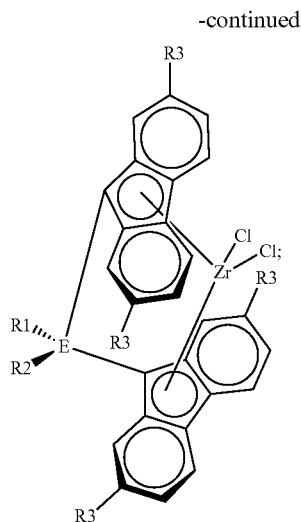
or any combination thereof;
wherein E is selected from C, Si, Ge, or Sn; and wherein R1, R2, and R3, in each instance, is independently selected from H or a hydrocarbyl group having from 1 to about 20 carbon atoms.
8. The catalyst composition of claim 1, wherein the at least one first metallocene compound is selected from:
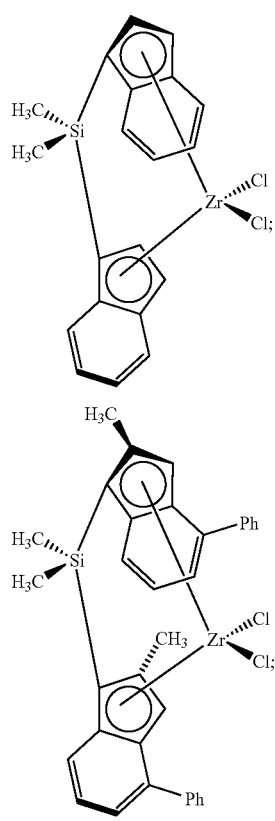
-continued
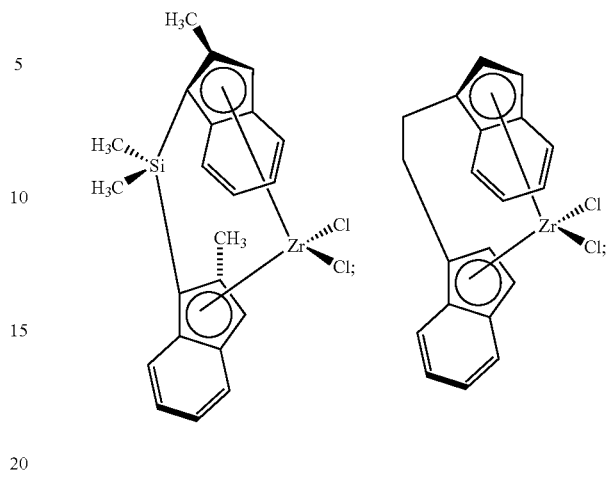
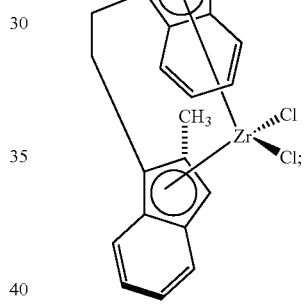
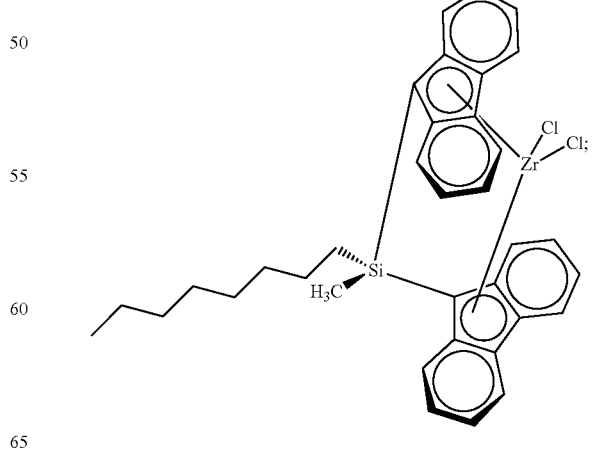

-continued
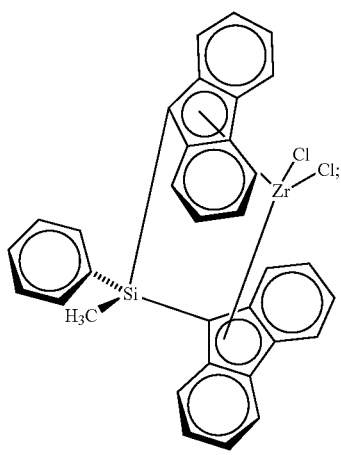
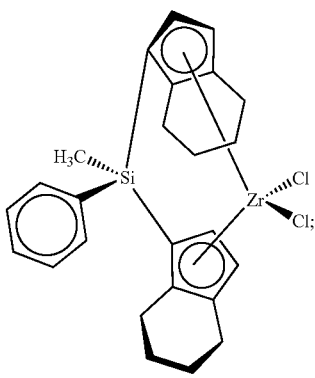
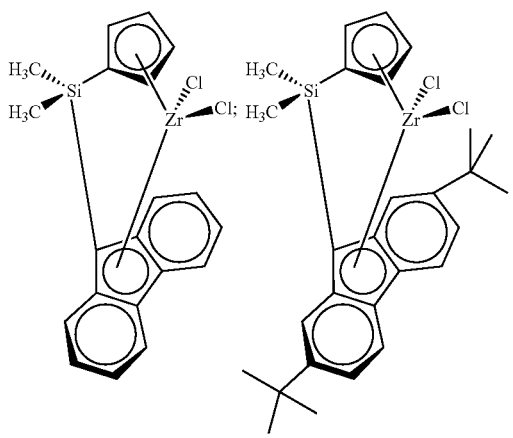
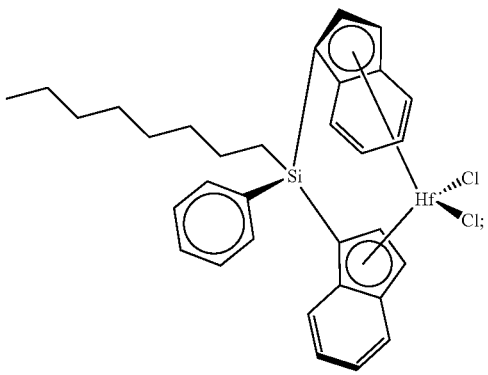
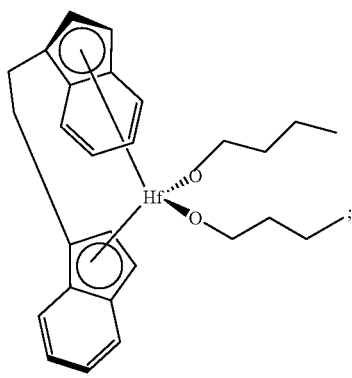
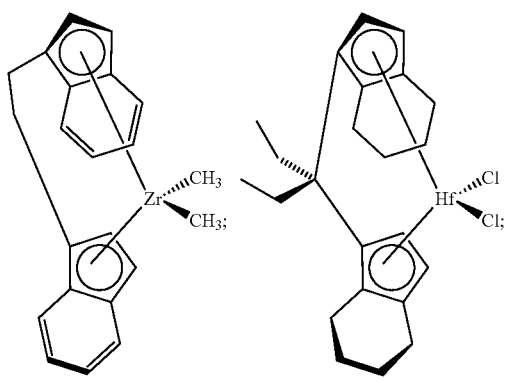
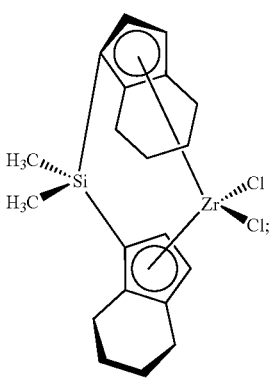

-continued

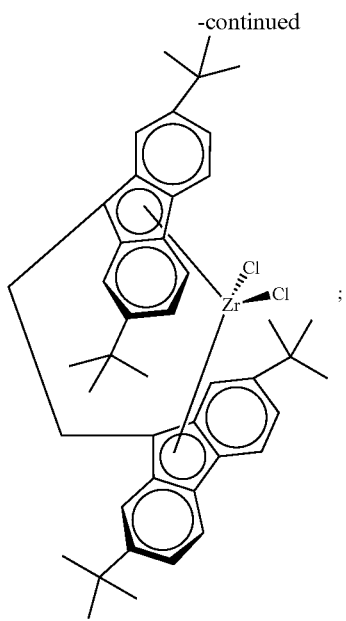

or any combination thereof.

9. The catalyst composition of claim 1, wherein the at least one first metallocene compound is selected from:

2-($\eta^5$-cyclopentadienyl)-2-($\eta^5$-fluoren-9-yl)hex-5-ene zirconium(IV) dichloride, [($\eta^5$-C$_5$H$_4$)CCH$_3$(CH$_2$CH$_2$CH=CH$_2$)($\eta^5$-9-C$_{13}$H$_9$)]ZrCl$_2$;

2-($\eta^5$-cyclopentadienyl)-2-($\eta^5$-2,7-di-tert-butylfluoren-9-yl)hex-5-ene zirconium(IV) dichloride, [($\eta^5$-C$_5$H$_4$)CCH$_3$(CH$_2$CH$_2$CH=CH$_2$)($\eta^5$-9-C$_{13}$H$_7$-2,7-($^t$Bu$_2$)]ZrCl$_2$;

2-($\eta^5$-cyclopentadienyl)-2-($\eta^5$-fluoren-9-yl)hept-6-ene zirconium(IV) dichloride, [($\eta^5$-C$_5$H$_4$)CCH$_3$(CH$_2$CH$_2$CH$_2$CH=CH$_2$)($\eta^5$-9-C$_{13}$H$_9$)]ZrCl$_2$;

2-($\eta^5$-cyclopentadienyl)-2-($\eta^5$-2,7-di-tert-butylfluoren-9-yl)hept-6-ene zirconium(IV) dichloride, [($\eta^5$-C$_5$H$_4$)CCH$_3$(CH$_2$CH$_2$CH$_2$CH=CH$_2$)($\eta^5$-9-C$_{13}$H$_7$-2,7-$^t$Bu$_2$)]ZrCl$_2$;

1-($\eta^5$-cyclopentadienyl)-1-($\eta^5$-fluoren-9-yl)-1-phenyl-pent-4-ene zirconium(IV) dichloride, [($\eta^5$-C$_5$H$_4$)C(C$_6$H$_5$)(CH$_2$CH$_2$CH=CH$_2$)($\eta^5$-9-C$_{13}$H$_9$)]ZrCl$_2$;

1-($\eta^5$-cyclopentadienyl)-1-($\eta^5$-2,7-di-tert-butyl fluoren-9-yl)-1-phenylpent-4-ene zirconium(IV) dichloride, [($\eta^5$-C$_5$H$_4$)C(C$_6$H$_5$)(CH$_2$CH$_2$CH=CH$_2$)($\eta^5$-9-C$_{13}$H$_7$-2,7-$^t$Bu$_2$)]ZrCl$_2$;

1-($\eta^5$-cyclopentadienyl)-1-($\eta^5$-fluoren-9-yl)-1-phenyl-hex-5-ene zirconium(IV) dichloride, [($\eta^5$-C$_5$H$_4$)C(C$_6$H$_5$)(CH$_2$CH$_2$CH$_2$CH=CH$_2$)($\eta^5$-9-C$_{13}$H$_9$)]ZrCl$_2$;

1-($\eta^5$-cyclopentadienyl)-1-($\eta^5$-2,7-di-tert-butylfluoren-9-yl)-1-phenylhex-5-ene zirconium(IV) dichloride, [($\eta^5$-C$_5$H$_4$)C(C$_6$H$_5$)(CH$_2$CH$_2$CH$_2$CH=CH$_2$)($\eta^5$-9-C$_{13}$H$_7$-2,7-$^t$Bu$_2$)]ZrCl$_2$;

or any combination thereof.

10. The catalyst composition of claim 1, wherein the at least one second metallocene compound is an ansa-metallocene having the following formula:

(X$^5$)(X$^6$)(X$^7$)(X$^8$)Zr, wherein (X$^5$) and (X$^6$) are respectively a substituted cyclopentadienyl;

wherein (X$^5$) and (X$^6$) are connected by a bridging group selected from >CR$^2_2$, >SiR$^2_2$, or —CR$^2_2$CR$^2_2$—, wherein R$^2$ in each instance is independently selected from a linear, branched, substituted, or unsubstituted hydrocarbyl group, any one of which having from 1 to about 20 carbon atoms; or hydrogen;

wherein (X$^5$) and (X$^6$) are each optionally substituted with up to four substituents in addition to the bridging group;

wherein any substituent on (X$^5$), (X$^6$), or R$^2$ is independently selected from a hydrocarbyl group, an oxygen group, a sulfur group, a nitrogen group, any one of which having from 1 to about 20 carbon atoms; or hydrogen; and wherein (X$^7$) and (X$^8$) are independently selected from alkoxide or aryloxide having from 1 to about 20 carbon atoms, halide, or hydride.

11. The catalyst composition of claim 1, wherein the at least one second metallocene compound is selected from a compound of the following formula:

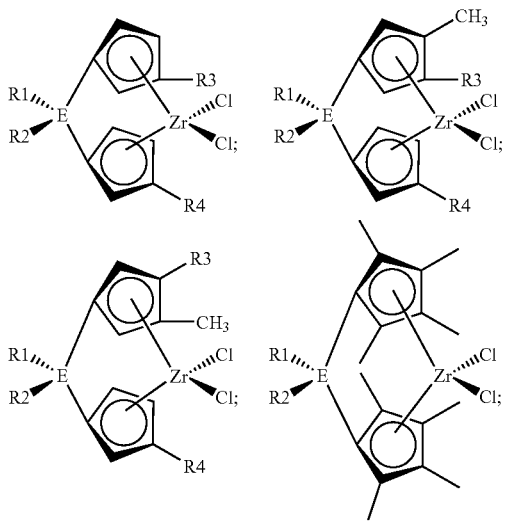

or any combination thereof;

wherein E is selected from C, Si, Ge, or Sn; and wherein R1, R2, R3, and R4, in each instance, is independently selected from H or a hydrocarbyl group having from 1 to about 20 carbon atoms.

12. The catalyst composition of claim 1, wherein the at least one second metallocene compound is selected from:

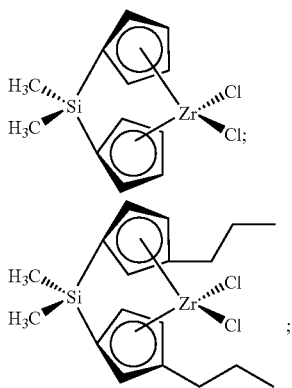

-continued

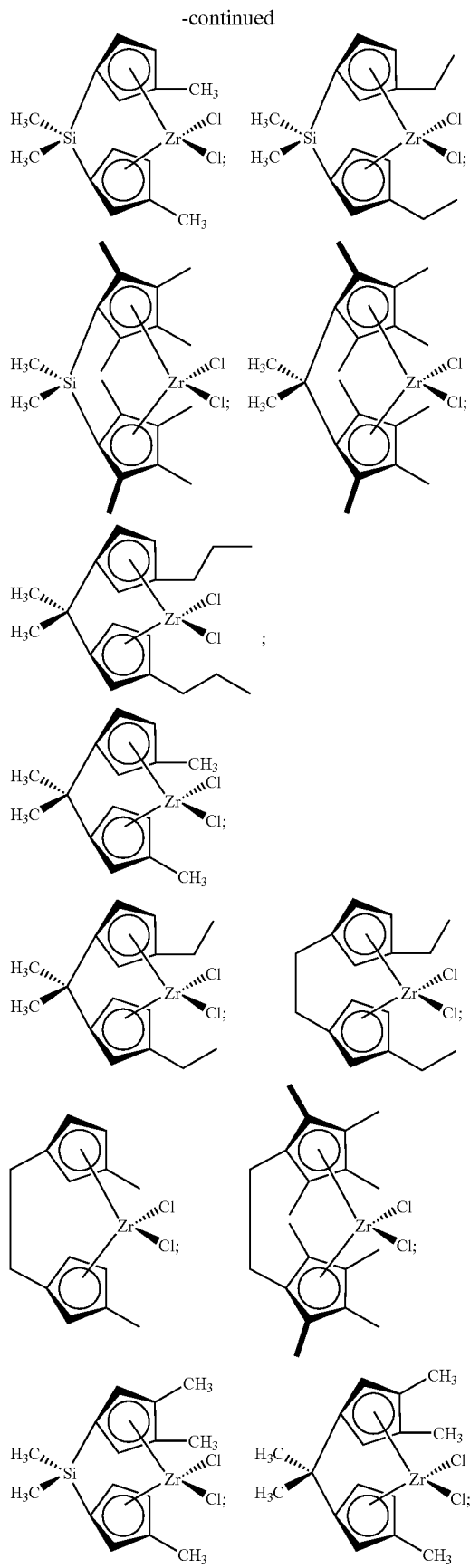

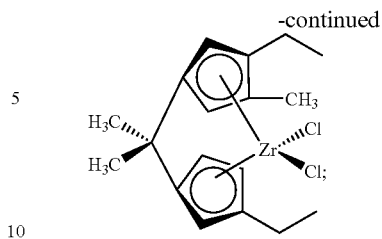

or any combination thereof.

13. The catalyst composition of claim 1, wherein:
a) the at least one first metallocene compound is selected from rac-$C_2H_4(\eta^5$-Ind$)_2$ZrCl$_2$, rac-Me$_2$Si($\eta^5$-Ind)$_2$ZrCl$_2$, Me(octyl)Si($\eta^5$-Flu)$_2$ZrCl$_2$, rac-Me$_2$Si($\eta^5$-2-Me-4-PhInd)$_2$ZrCl$_2$, rac-$C_2H_4(\eta^5$-2-MeInd)$_2$ZrCl$_2$, Me(Ph)Si($\eta^5$-Flu)$_2$ZrCl$_2$, or any combination thereof,
b) the at least one second metallocene compound is selected from rac-Me$_2$Si($\eta^5$-3-n-PrCp)$_2$ZrCl$_2$, Me$_2$Si($\eta^5$-Me$_4$Cp)$_2$ZrCl$_2$, Me$_2$Si($\eta^5$-Cp)$_2$ZrCl$_2$, or any combination thereof;
c) the at least one chemically-treated solid oxide is selected from fluorided alumina, chlorided alumina, sulfated alumina, fluorided silica-alumina, or any combination thereof; and
d) the at least one organoaluminum compound is selected from triethylaluminum or triisobutylaluminum.

14. The catalyst composition of claim 1, wherein the at least one chemically-treated solid oxide is selected from fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, or any combination thereof.

15. The catalyst composition of claim 1, wherein the at least one chemically-treated solid oxide further comprises a metal or metal ion.

16. The catalyst composition of claim 15, wherein the at least one chemically-treated solid oxide is selected from zinc-impregnated chlorided alumina, zinc-impregnated fluorided alumina, zinc-impregnated chlorided silica-alumina, zinc-impregnated fluorided silica-alumina, zinc-impregnated sulfated alumina, or any combination thereof.

17. The catalyst composition of claim 1, wherein the at least one chemically-treated solid oxide further comprises a metal or metal ion selected from zinc, nickel, vanadium, silver, copper, gallium, tin, tungsten, molybdenum, or any combination thereof.

18. The catalyst composition of claim 1, wherein the weight ratio of the at least one organoalumium compound to the at least one chemically-treated solid oxide is from about 10:1 to about 1:1,000.

19. The catalyst composition of claim 1, wherein the at least one organoaluminum compound is selected from trimethylaluminum, triethylaluminum, tri-n-propylaluminum, diethylaluminum ethoxide, tri-n-butylaluminum, disobutylaluminum hydride, triisobutylaluminum, diethylaluminum chloride, or any combination thereof.

20. The catalyst composition of claim 1, further comprising a cocatalyst selected from at least one aluminoxane, at least one organozinc compound, at least one organoboron compound, at least one ionizing ionic compound, or any combination thereof.

21. The catalyst composition of claim 1, further comprising a cocatalyst selected from at least one aluminoxane compound, wherein the aluminoxane comprises
a cyclic aluminoxane having the formula:

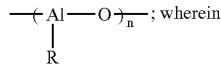; wherein

R is a linear or branched alkyl having from 1 to 10 carbon atoms, and n is an integer from 3 to about 10;
a linear aluminoxane having the formula:

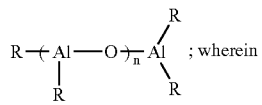; wherein

R is a linear or branched alkyl having from 1 to 10 carbon atoms, and n is an integer from 1 to about 50;
a cage aluminoxane having the formula $R^t_{5m+\alpha}R^b_{m-\alpha}Al_{4m}O_{3m}$, wherein m is 3 or 4 and $\alpha$ is $=n_{Al(3)}-n_{O(2)}+n_{O(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms; or
any combination thereof.

22. The catalyst composition of claim 21, wherein the molar ratio of the aluminum in the aluminoxane to the combined at least one first metallocene compound and at least one second metallocene compound in the catalyst composition is from about 1:10 to about 100,000:1.

23. The catalyst composition of claim 21, wherein the aluminoxane compound is selected from methylaluminoxane, ethylaluminoxane, n-propylaluminoxane, iso-propylaluminoxane, n-butylaluminoxane, t-butylaluminoxane, sec-butylaluminoxane, isobutylaluminoxane, 1-pentylaluminoxane, 2-pentylaluminoxane, 3-pentylaluminoxane, isopentylaluminoxane, neopentylaluminoxane, or a combination thereof.

24. The catalyst composition of claim 1, further comprising a cocatalyst selected from at least one organozinc compound, wherein the organozinc compound has the following formula:

$Zn(X^{13})(X^{14})$;

wherein $(X^{13})$ is a hydrocarbyl having from 1 to about 20 carbon atoms; $(X^{14})$ is selected from a hydrocarbyl, an alkoxide or an aryloxide having from 1 to about 20 carbon atoms, halide, or hydride.

25. The catalyst composition of claim 1, further comprising a cocatalyst selected from at least one organozinc compound, wherein the organozinc compound is selected from dimethylzinc, diethylzinc, dipropylzinc, dibutylzinc, dineopentylzinc, di(trimethylsilylmethyl)zinc, or any combination thereof.

26. The catalyst composition of claim 1, further comprising a cocatalyst selected from at least one organoboron compound, wherein the organoboron compound is selected from tris(pentafluorophenyl)boron, tris[3,5-bis(trifluoromethyl)phenyl]boron, N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, or a combination thereof.

27. The catalyst composition of claim 26, wherein the molar ratio of the organoboron compound to the combined at least one first metallocene compound and at least one second metallocene compound in the catalyst composition is from about 0.1:1 to about 10:1.

28. The catalyst composition of claim 1, further comprising a cocatalyst selected from at least one ionizing ionic compound, wherein the ionizing ionic compound is selected from tri(n-butyl)ammonium tetrakis(p-tolyl)borate, tri(n-butyl)ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl) ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis(trifluoromethyl)phenyl]borate, triphenylcarbenium tetrakis(pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, tropylium tetrakis(pentafluorophenyl)borate, lithium tetrakis(pentafluorophenyl)borate, lithium tetrakis(phenyl)borate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetrakis(phenyl) borate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetrakis(phenyl)borate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, tri(n-butyl)ammonium tetrakis(p-tolyl)aluminate, tri(n-butyl)ammonium tetrakis(m-tolyl)aluminate, tri(n-butyl)ammonium tetrakis(2,4-dimethylphenyl)aluminate, tri(n-butyl)ammonium tetrakis(3,5-dimethylphenyl)aluminate, tri(n-butyl) ammonium tetrakis(pentafluorophenyl)aluminate, N,N-dimethylanilinium tetrakis(p-tolyl)aluminate, N,N-dimethylanilinium tetrakis(m-tolyl)aluminate, N,N-dimethylanilinium tetrakis(2,4-dimethylphenyl)aluminate, N,N-dimethylanilinium tetrakis(3,5-dimethylphenyl)aluminate, N,N-dimethylanilinium tetrakis (pentafluorophenyl) aluminate, triphenylcarbenium tetrakis(p-tolyl)aluminate, triphenylcarbenium tetrakis(m-tolyl)aluminate, triphenylcarbenium tetrakis(2,4-dimethylphenyl)aluminate, triphenylcarbenium tetrakis(3,5-dimethylphenyl)aluminate, triphenylcarbenium tetrakis(pentafluorophenyl)aluminate, tropylium tetrakis(p-tolyl)aluminate, tropylium tetrakis(m-tolyl)aluminate, tropylium tetrakis(2,4-dimethylphenyl)aluminate, tropylium tetrakis(3,5-dimethylphenyl)aluminate, tropylium tetrakis(pentafluorophenyl)aluminate, lithium tetrakis(pentafluorophenyl)aluminate, lithium tetrakis(phenyl)aluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetrakis(phenyl)aluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetrakis (phenyl)aluminate, potassium tetrakis(p-tolyl)aluminate, potassium tetrakis(m-tolyl)aluminate, potassium tetrakis(2,4-dimethylphenyl)aluminate, potassium tetrakis (3,5-dimethylphenyl)aluminate, potassium tetrafluoroaluminate, or any combination thereof.

29. A composition of matter comprising at least one first metallocene compound, at least one second metallocene compound, at least one chemically-treated solid oxide, and at least one organoaluminum compound, wherein:

a) the at least one first metallocene compound is selected from an ansa-metallocene having the following formula:

$$(X^1)(X^2)(X^3)(X^4)M^1, \qquad \text{i)}$$

wherein $(X^1)$ and $(X^2)$ are jointly selected from a fluorenyl and a cyclopentadienyl, a fluorenyl and an indenyl, or two fluorenyls, any one of which can be substituted, unsubstituted, partially saturated, or any combination thereof; or $$\text{rac-}(X^1)(X^2)(X^3)(X^4)M^1, \qquad \text{ii)}$$

wherein $(X^1)$ and $(X^2)$ are jointly selected from two indenyls, any one of which can be substituted, unsubstituted, partially saturated, or any combination thereof;

wherein $M^1$ is selected from Ti, Zr, or Hf;
wherein $(X^1)$ and $(X^2)$ are connected by a substituted or unsubstituted bridging group comprising:
   i) one atom selected from carbon, silicon, germanium, or tin, bonded to both $(X^1)$ and $(X^2)$; or
   ii) two contiguous carbon atoms in a chain, one end of which is bonded to $(X^1)$ and the other end of which is bonded to $(X^2)$; and
wherein $(X^3)$; $(X^4)$; each substituent on the substituted cyclopentadienyl, the substituted indenyl, and the substituted fluorenyl; and each substituent on the substituted bridging group is independently selected from a hydrocarbyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, —$SO_2X$, —$OAlX_2$, —$OSiX_3$, —$OPX_2$, —SX, —$OSO_2X$, —$AsX_2$, —$As(O)X_2$, or —$PX_2$, wherein X is selected independently from halide, H, $NH_2$, OR, or SR, wherein R is a hydrocarbyl, or a substituted derivative thereof, any of which having from 1 to about 20 carbon atoms; a halide; or hydrogen;

b) the at least one second metallocene compound is an ansa-metallocene having the following formula:

$$(X^5)(X^6)(X^7)(X^8)M^2, \qquad$$

wherein $M^2$ is selected from Ti, Zr, or Hf;

wherein $(X^5)$ and $(X^6)$ are respectively a substituted cyclopentadienyl;
wherein $(X^5)$ and $(X^6)$ are connected by a substituted or unsubstituted bridging group comprising:
   i) one atom selected from carbon, silicon, germanium, or tin, bonded to both $(X^5)$ and $(X^6)$; or
   ii) two contiguous carbon atoms in a chain, one end of which is bonded to $(X^5)$ and the other end of which is bonded to $(X^6)$; and
wherein $(X^5)$ and $(X^6)$ are each optionally substituted with up to four substituents in addition to the bridging group;
wherein $(X^7)$; $(X^8)$; each substituent on the substituted cyclopentadienyl; and each substituent on the substituted bridging group is independently selected from a hydrocarbyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, —$SO_2X$, —$OAlX_2$, —$OSiX_3$, —$OPX_2$, —SX, —$OSO_2X$, —$AsX_2$, —$As(O)X_2$, or —$PX_2$, wherein X is selected independently from halide, H, $NH_2$, OR, or SR, wherein R is a hydrocarbyl, or a substituted derivative thereof, any of which having from 1 to about 20 carbon atoms; a halide; or hydrogen;

c) the at least one chemically-treated solid oxide comprises a solid oxide treated with an electron-withdrawing anion; and d) the at least one organoaluminum compound has the following formula:

$$Al(X^9)_n(X^{10})_{3-n};$$

wherein $(X^9)$ is a hydrocarbyl having from 1 to about 20 carbon atoms; $(X^{10})$ is selected from alkoxide or aryloxide having from 1 to about 20 carbon atoms, halide, or hydride; and n is a number from 1 to 3, inclusive.

30. A method of making a catalyst composition comprising contacting at least one first metallocene compound, at least one second metallocene compound, at least one chemically-treated solid oxide, and at least one organoaluminum compound, wherein:

a) the at least one first metallocene compound is selected from an ansa-metallocene having the following formula:

$$(X^1)(X^2)(X^3)(X^4)M^1, \qquad \text{i)}$$

wherein $(X^1)$ and $(X^2)$ are jointly selected from a fluorenyl and a cyclopentadienyl, a fluorenyl and an indenyl, or two fluorenyls, any one of which can be substituted, unsubstituted, partially saturated, or any combination thereof; or $$\text{rac-}(X^1)(X^2)(X^3)(X^4)M^1, \qquad \text{ii)}$$

wherein $(X^1)$ and $(X^2)$ are jointly selected from two indenyls, any one of which can be substituted, unsubstituted, partially saturated, or any combination thereof;

wherein $M^1$ is selected from Ti, Zr, or Hf;
wherein $(X^1)$ and $(X^2)$ are connected by a substituted or unsubstituted bridging group comprising:
   i) one atom selected from carbon, silicon, germanium, or tin, bonded to both $(X^1)$ and $(X^2)$; or
   ii) two contiguous carbon atoms in a chain, one end of which is bonded to $(X^1)$ and the other end of which is bonded to $(X^2)$; and wherein $(X^3)$; $(X^4)$; each substituent on the substituted cyclopentadienyl, the substituted indenyl, and the substituted fluorenyl; and each substituent on the substituted bridging group is independently selected from a hydrocarbyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, —$SO_2X$, —$OAlX_2$, —$OSiX_3$, —$OPX_2$, —SX, —$OSO_2X$, —$AsX_2$, —As(O)$X_2$, or —$PX_2$, wherein X is selected independently from halide, H, $NH_2$, OR, or SR, wherein R is a hydrocarbyl, or a substituted derivative thereof, any of which having from 1 to about 20 carbon atoms; a halide; or hydrogen;

b) the at least one second metallocene compound is an ansa-metallocene having the following formula:

$(X^5)(X^6)(X^7)(X^8)M^2$, wherein $M^2$ is selected from Ti, Zr, or Hf;

wherein $(X^5)$ and $(X^6)$ are respectively a substituted cyclopentadienyl;

wherein $(X^5)$ and $(X^6)$ are connected by a substituted or unsubstituted bridging group comprising:
 i) one atom selected from carbon, silicon, germanium, or tin, bonded to both $(X^5)$ and $(X^6)$; or
 ii) two contiguous carbon atoms in a chain, one end of which is bonded to $(X^5)$ and the other end of which is bonded to $(X^6)$; and wherein $(X^5)$ and $(X^6)$ are each optionally substituted with up to four substituents in addition to the bridging group;

wherein $(X^7)$; $(X^8)$; each substituent on the substituted cyclopentadienyl; and each substituent on the substituted bridging group is independently selected from a hydrocarbyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, —$SO_2X$, —$OAlX_2$, —$OSiX_3$, —$OPX_2$, —SX, —$OSO_2X$, —$AsX_2$, —As(O)$X_2$, or —$PX_2$, wherein X is selected independently from halide, H, $NH_2$, OR, or SR, wherein R is a hydrocarbyl, or a substituted derivative thereof, any of which having from 1 to about 20 carbon atoms; a halide; or hydrogen;

c) the at least one chemically-treated solid oxide comprises a solid oxide treated with an electron-withdrawing anion; and d) the at least one organoaluminum compound has the following formula:

$Al(X^9)_n(X^{10})_{3-n}$;

wherein $(X^9)$ is a hydrocarbyl having from 1 to about 20 carbon atoms; $(X^{10})$ is selected from alkoxide or aryloxide having from 1 to about 20 carbon atoms, halide, or hydride; and n is a number from 1 to 3, inclusive.

* * * * *

UNITED STATES PATENT AND TRADEMARK OFFICE
CERTIFICATE OF CORRECTION

PATENT NO. : 7,041,617 B2  Page 1 of 1
APPLICATION NO. : 10/755083
DATED : May 9, 2006
INVENTOR(S) : Michael Jensen et al.

It is certified that error appears in the above-identified patent and that said Letters Patent is hereby corrected as shown below:

column 4, line 51 change "Futher" to --Further--
column 8, line 33 change "Theological" to --Rheological--
column 25, line 30 change "Zironium" to --zirconium--
column 26, line 5 change "Futher" to --Further--
column 30, line 30 and 31 change "Choriding" to --Chloriding--
column 30, line 44, change "the the" to --the--
column 31, line 35, change "immediately" to --immediately--
column 32, line 53, change "disobutyl" to --diisobutyl--
column 46, line 38 change "theological" to --rheological--
column 56, line 35 change "Zironium" to --zirconium--
column 58, line 8 delete "along with the desired amount of 1-hexene, if used"
column 62, line 63 change "Rehology" to --Rheology--

Claim 18, column 84, line 54 change "organoalumium" to --organoaluminum--
Claim 19, column 84, line 60 change "disobutyl" to --diisobutyl--

Signed and Sealed this

Nineteenth Day of September, 2006

JON W. DUDAS
*Director of the United States Patent and Trademark Office*